United States Patent
Miyazaki et al.

(10) Patent No.: US 6,766,332 B2
(45) Date of Patent: Jul. 20, 2004

(54) ELECTRONIC IMAGE DISPLAY DEVICE AND PRINTING SYSTEM THEREFOR

(75) Inventors: Takao Miyazaki, Saitama (JP); Keiji Tsubota, Saitama (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 322 days.

(21) Appl. No.: 09/978,941

(22) Filed: Oct. 18, 2001

(65) Prior Publication Data

US 2002/0059322 A1 May 16, 2002

(30) Foreign Application Priority Data

Oct. 19, 2000 (JP) ........................................ 2000-319819
Nov. 22, 2000 (JP) ........................................ 2000-355324
Dec. 13, 2000 (JP) ........................................ 2000-379260

(51) Int. Cl.[7] ........................ G06F 17/30; G06F 13/00; H04N 7/18; H05K 9/00
(52) U.S. Cl. ...................... 707/102; 707/104; 725/105; 345/519; 348/64; 361/816
(58) Field of Search ........................... 725/105; 386/52; 345/519; 348/64; 361/816; 707/102, 104

(56) References Cited

U.S. PATENT DOCUMENTS

| 4,888,648 A | * | 12/1989 | Takeuchi et al. | ............. 386/52 |
|---|---|---|---|---|
| 4,977,483 A | * | 12/1990 | Perretta | ...................... 361/816 |
| 5,940,121 A | * | 8/1999 | Mcintyre et al. | ............. 348/64 |
| 5,978,016 A | * | 11/1999 | Lourette et al. | ............. 348/64 |
| 6,111,586 A | * | 8/2000 | Ikeda et al. | ................. 345/619 |
| D446,809 S | * | 8/2001 | Parker | ......................... D19/26 |
| 6,567,983 B1 | * | 5/2003 | Shiimori | ..................... 725/105 |

FOREIGN PATENT DOCUMENTS

| JP | 11-167594 | 6/1999 |
|---|---|---|
| JP | 2000-148976 | 5/2000 |

* cited by examiner

Primary Examiner—Frantz Coby
(74) Attorney, Agent, or Firm—McGinn & Gibb, PLLC

(57) ABSTRACT

There is disclosed an album type image display device. The image display device reads out album data, including image data and album manager data for arranging images in a style of an album, from a memory card and displays an electronic album page by page on the basis of the album data. When a second set of electronic images are read out from a second memory card while successive two pages of the electronic album are displayed, additional pages having the second set of electronic images pasted thereon are interposed between the displayed two pages. Upon pressing an automatic play button, the image display device starts displaying respective pages of the electronic album turn by turn in a predetermined sequence. A respective page is displayed for a time that is determined based on a data volume of that page.

42 Claims, 40 Drawing Sheets

FIG.36

[PRINT DATA 1]

| | | |
|---|---|---|
| \<PRINT AREA\> | S 1 = 1 | ( 1 : PAGE, 0 : FRAME) |
| \<CAPTION PRINT\> | S 2 = 1 | ( 1 : YES, 0 : NO) |
| \<CAPTION LOCATION\> | S 3 = 2 | (1:TOP, 2:BOTTOM, 3:LEFT, 4:RIGHT, 5:PAGE) |
| \<BOTH-SIDE PRINT\> | S 4 = 0 | ( 1 : YES, 0 : NO) |
| \<BINDING MARGIN\> | S 5 = 1 | ( 1 : RIGHT, 0 : LEFT) |
| \<PAGE SERIAL NO.\> | PAGE=3 | |
| \<FRAME No.\> | PICTURE=ALL | |
| \<NUMBER COPY\> | SHEET=3 | |

---

[PRINT DATA 2]

| | | |
|---|---|---|
| \<PRINT AREA\> | S 1 = 0 | ( 1 : PAGE, 0 : FRAME) |
| \<CAPTION PRINT\> | S 2 = 1 | ( 1 : YES, 0 : NO) |
| \<CAPTION LOCATION\> | S 3 = 2 | (1:TOP, 2:BOTTOM, 3:LEFT, 4:RIGHT, 5:PAGE) |
| \<BOTH-SIDE PRINT\> | | ( 1 : YES, 0 : NO) |
| \<BINDING MARGIN\> | | ( 1 : RIGHT, 0 : LEFT) |
| \<PAGE SERIAL NO.\> | | |
| \<FRAME No.\> | PICTURE=9 | |
| \<NUMBER COPY\> | SHEET=3 | |

---

[PRINT DATA 3]

| | | |
|---|---|---|
| \<PRINT AREA\> | S 1 = 1 | ( 1 : PAGE, 0 : FRAME) |
| \<CAPTION PRINT\> | S 2 = 1 | ( 1 : YES, 0 : NO) |
| \<CAPTION LOCATION\> | S 3 = 2 | (1:TOP, 2:BOTTOM, 3:LEFT, 4:RIGHT, 5:PAGE) |
| \<BOTH-SIDE PRINT\> | S 4 = 1 | ( 1 : YES, 0 : NO) |
| \<BINDING MARGIN\> | S 5 = 0, 1 | ( 1 : RIGHT, 0 : LEFT) |
| \<PAGE SERIAL NO.\> | PAGE=2, 3 | |
| \<FRAME No.\> | PICTURE=ALL | |
| \<NUMBER COPY\> | SHEET=1 | |

<PRINTING PROCESS BASED ON PRINT DATA>

ELECTRONIC IMAGE DISPLAY DEVICE AND PRINTING SYSTEM THEREFOR

BACKGROUND OF THE INVENTION

1. Field of the Invention

The present invention relates an album type electronic image display device that displays images in an album style wherein the images look like pictures mounted on pages of an album. The present invention also relates to a printing system for the album type electronic image display device.

2. Background Arts

Such an album type electronic image display device has been disclosed for example in Japanese Laid-open Patent Application No. 2000-148976. Since the images are displayed as pasted on respective pages of an album, the user can enjoy observing the images while changing the pages turn by turn. The album type electronic image display device is handy for observing images recorded on a memory card by an electronic still camera.

However, the conventional album type electronic image display device still has some inconveniences. The conventional image display device is incapable of inserting other images into an electronic album once the album has been produced by the image display device from images read out from a memory card. Therefore, it is impossible to unite those images into an album which are stored in different memory cards. The conventional image display device cannot copy data of one memory card onto another memory card, so it is inconvenient for regulating image data.

Furthermore, the conventional image display device requires a manual operation every time to turn the page. This is inconvenient when the user is observing all pages of an album having a large volume, or when a group of persons will observe an album on the image display device.

On the other hand, a printing system has been disclosed in Japanese Laid-open Patent Application No. 11-167594. In the printing system, a customer having a terminal apparatus, such as a personal computer with a display device, selects images to print, and edits or synthesizes the images on the terminal apparatus. Thereafter, the customer produces a print data file from processed image data and print order data such as the frame serial numbers of these images, the number of copies to print, and the like. In response to the print data file being forwarded to a photofinisher, the photofinisher prints out the images in accordance with the processed image data and the print order data.

This printing system is advantageous both for the customer and for the photofinisher because the customer can designate printing conditions of each image while checking the finish on the terminal apparatus, so the subsequent prints mostly satisfy the customer's expect. The photofinisher need not asking the details of the expected finish, but just have to make prints according to the print data file from the customer.

It is desirable to provide such a printing system for the above mentioned album type image display device, that can print the images on recording sheets in the same manner as displayed on the album type image display device, so that a hard copy of the electronic album may be produced just by filing the printed recording sheets.

For this purpose, however, the images should be printed page by page on opposite sides of the recording sheets, and also a gutter margin should be provided on each page such that the gutter margins are located alternately on the left or the right of the pages between the odd pages and the even pages. In the conventional album type image display device, the users have manually to designate both-side printing and gutter margin locations all by themselves. When ordering printing through the above described conventional printing system, the customers have to inform the photofinisher of the gutter margin locations of the respective pages.

SUMMARY OF THE INVENTION

In view of the foregoing, an object of the present invention is to provide an electronic image display device for displaying images in a style of an album, that permits inserting or adding images from an external memory into an electronic album as displayed on the image display device.

Another object of the present invention is to provide an electronic image display device for displaying images in a style of an album, that facilitates uniting a plurality of electronic albums into an electronic album.

Still another object of the present invention is to provide an album type image display device for displaying images in a style of an album, that can display an electronic album while turning pages automatically.

A further object of the present invention is to provide an album type image display device that can display or reproduce captions previously assigned to selected images of an electronic album while displaying the selected images.

Another object of the present invention is to provide a printing system for an album type image display device that permits printing designated pages of an electronic album on recording sheets while providing binding margins automatically in appropriate locations.

To achieve the above objects, according to an aspect of the present invention, an electronic image display device comprises:

an image input device for reading out electronic images from an external memory; an image processing device for pasting the electronic images on respective pages of an electronic album; a display section for displaying the electronic album at least one page at a time; an internal memory for storing the electronic album containing the electronic images; and a mode selection device for setting the image display device to a data holding mode wherein the internal memory holds previously stored electronic images even while a second set of electronic images are read out from a second external memory and are written on the internal memory, so the image processing device may insert the second set of electronic images into the electronic album in the data holding mode.

According to a preferred embodiment, the image processing device pastes the electronic images on the respective pages in accordance with album manager data, and a combination of the electronic images and the album manager data constitute the electronic album. If electronic images are read out from an external memory without album manager data, the image processing device pastes the electronic images on the respective pages in accordance with a predetermined format for an electronic album, and produces album manager data according to the predetermined format, the image display device revises the album manager data on the internal memory each time the electronic album is modified. If the second set of electronic images are accompanied by second album manager data when being read out from the second external memory, the album manager data of the previously stored electronic album is revised on the basis of the second album manager data.

According to another preferred embodiment, the display section is able to display successive two pages of the electronic album at a time, and the second set of electronic images are interposed as additional pages between successive two pages which are displayed on the display section when the second set of electronic images are read out from the second external memory in the data holding mode.

According to a second aspect of the present invention, an electronic image display device comprises:

an image processing device for pasting electronic images on respective pages of an electronic album; a display section for displaying the electronic album at least one page at a time; and a manually operated mode selection device for setting the image display device at an automatic play mode wherein the pages displayed on the display section are automatically turned over in a predetermined sequence.

According to a preferred embodiment, the electronic image display device further comprises a device for calculating an individual page display time for a respective page of the electronic album on the basis of a data volume of the respective page, and making the respective page displayed for a time determined based on the individual page display time in the automatic play mode. Where the electronic images include still images and movies, a respective one of the movies is automatically played while the page containing the movie is displayed in the automatic play mode, and wherein play times for those movies contained in the respective page are taken into account as the data volume.

According to a third aspect of the present invention, an electronic image display device comprises:

an image processing device for pasting electronic images on respective pages of an electronic album; a display section for displaying the electronic album at least one page at a time; a device for causing the display section to display characters in addition to selected ones of the electronic images, the characters being previously assigned to the selected electronic images; a reproduction device for reproducing sounds that are previously recorded in association with selected ones of the electronic images; and a discrimination device for discriminating one electronic image from others among those displayed concurrently on the display section, while characters or sounds relating to the one electronic image are being displayed or reproduced.

According to a preferred embodiment, the display section doubles as a touch panel for permitting designating an appropriate electronic image among those displayed on the display section by touching the appropriate electronic image, and wherein characters or sounds relating to the designated electronic image are displayed or reproduced while the designated electronic image is discriminated by the discrimination device.

A printing system according to the present invention consists of an electronic image display device for displaying images in a style of an album, and a printer for making hard copies of images as displayed on the image display device, wherein the image display device comprises:

an image processing device for pasting electronic images on respective pages of an electronic album; a display section for displaying the electronic album at least one page at a time; a manual operation device for designating printing conditions for the electronic images, the printing conditions including at least a page serial number of a designated page, a print area to print from the designated page, and the requisite number of copies to make from the print area; a print data setup device that automatically sets up margin conditions for the designated page when an entire area of the designated page is selected as the print area, such that a binding margin is located on an appropriate side of the designated page, and produces print data representative of the printing conditions and the margin conditions; and a data output device for outputting the print data and album data of the electronic album; and wherein the printer prints an individual image frame or the entire area of the designated page on a recording sheet in accordance with the print data, while providing a binding margin in the case where the entire area of the designated page is printed.

According to a preferred embodiment of the printing system, both-side printing to print two successive pages on opposite sides of a respective recording sheet may be designated as one of the printing conditions through the manual operation device, and if the both-side printing is designated, the print data setup device sets up the margin conditions such that a binding margin of a first page is located back to back with a binding margin of a second page that is to be printed on the opposite side to the first page, and wherein the printer prints the respective pages on the opposite sides of respective recording sheets in accordance with the print data.

It is preferable to distribute the print data and the album data to appropriate one of a plurality of printers in accordance with the printing conditions designated by the print data.

BRIEF DESCRIPTION OF THE DRAWINGS

The above and other objects and advantages of the present invention will become apparent from the following detailed description of the preferred embodiments when read in association with the accompanying drawings, which are given by way of illustration only and thus are not limiting the present invention. In the drawings, like reference numerals designate like or corresponding parts throughout the several views, and wherein:

FIG. 36 is an explanatory diagram illustrating an example of a print data file;

DETAILED DESCRIPTION OF THE EMBODIMENTS

Figure 1A:
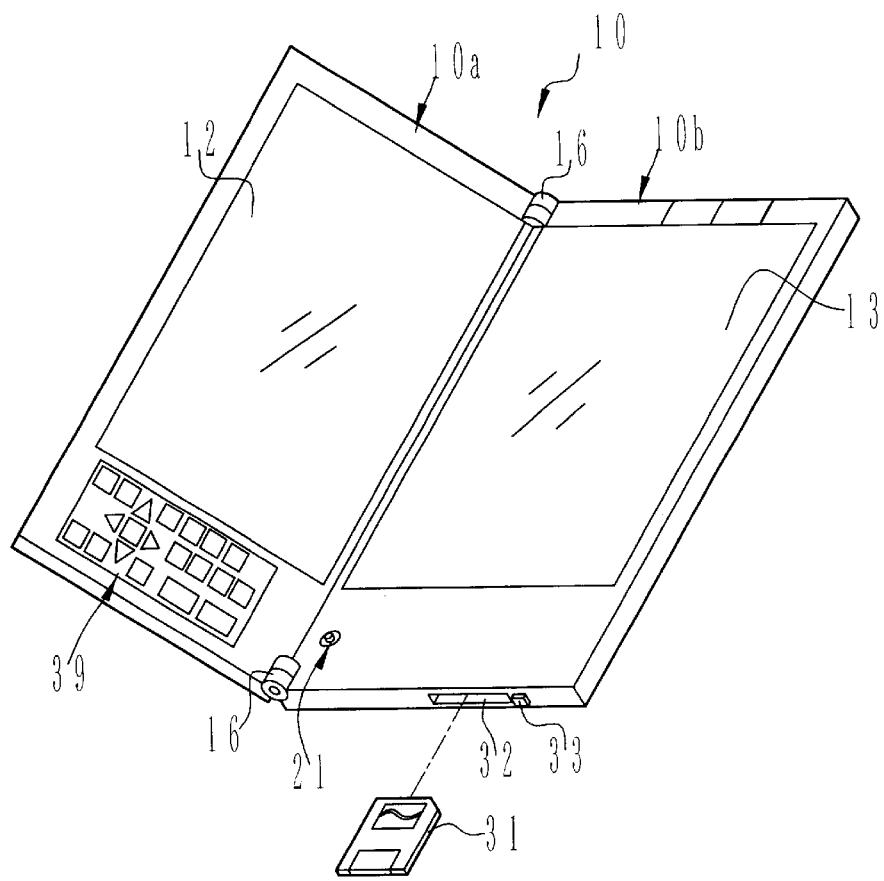
FIG. 1A is a perspective view illustrating an album type electronic image display device according to a first embodiment of the present invention, in its open active position.
Figure 1B:
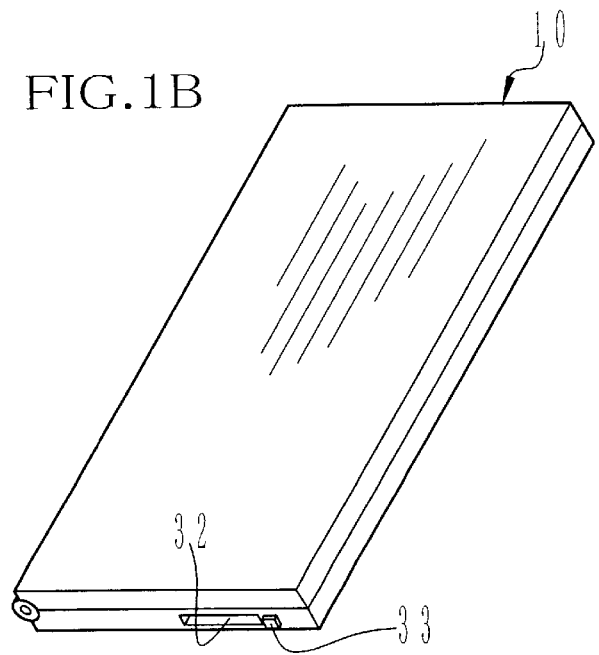
FIG. 1B is a perspective view illustrating the album type electronic image display device of the first embodiment in its closed inactive position.

FIGS. 1A and 1B show a portable album type electronic image display device 10, hereinafter called an electronic album display device, according to a first embodiment of the present invention. The electronic album display device 10 consists of a left-hand body 10*a* and a right-hand body 10*b*, each of which is provided with a display panel 12 or 13. The display panels 12 and 13 are liquid crystal display panels in this embodiment. The electronic album display device 10 is powered by a removably attachable battery or may be powered from a network power source through an AC adapter.

The left- and right-hand bodies 10*a* and 10*b* are coupled to each other through a hinge 16, so the bodies 10*a* and 10*b* may flap between an open position as shown in FIG. 1A and a closed position as shown in FIG. 1B. The display panels 12 and 13 are arranged side by side in the open position, just like the pages of an album in spread. A power switch 21 is mounted on the right-hand body 10b below the display panel 13. The power switch 21 is turned on in the open position, and is turned off in the closed position as it is pushed by the left-hand body 10a.

A card slot 32 for accepting a memory card 31, like a Smart Media (a trade name), is provided in a bottom end of the right-hand body 10b. Inside the card slot 32 is disposed a card reader 92 (see FIG. 11) as an input device for reading out image files from the memory card 31. The image files stored in the memory card 31 includes image data of those images which are photographed by an electronic still camera or the like. Designated by 33 is a take-out button for taking the memory card 31 out of the card slot 32.

Figure 2:
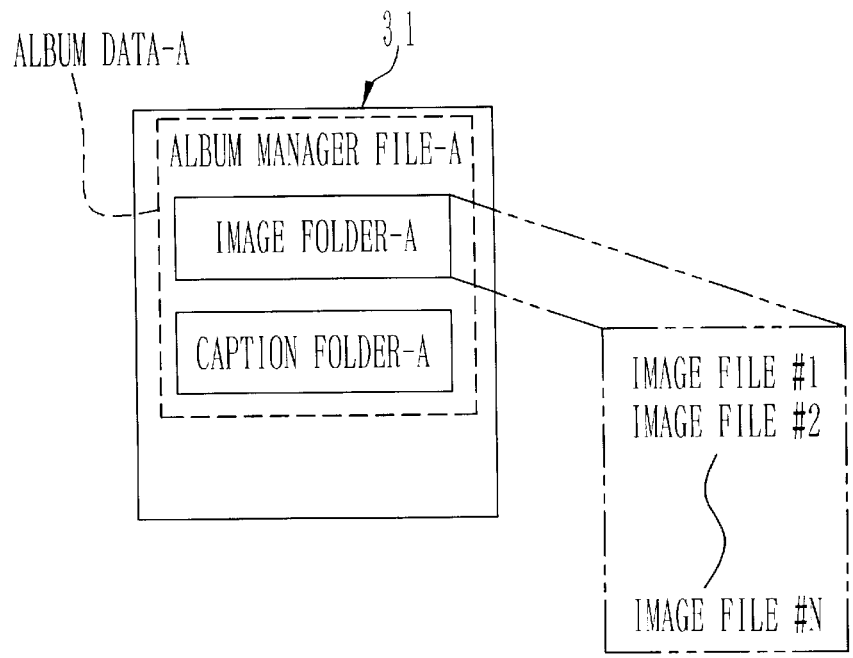
FIG. 2 is a conceptual diagram illustrating album data stored in a memory card.

As shown in FIG. 2, respective image files #1~#N are stored in an image folder-A that is provided in the memory card 31. An album manager file-A contains managing data for displaying the image files #1 to #n as an album. The managing data includes positioning data for each image, such as the assigned page number, the pasting position on the page, the image size and the image angle, as well as page managing data, including the total pages of the album, and page formats of respective pages of the album. Hereinafter, a combination of the image files #1 to #n and the album manager file-A for these image files #1 to #n will be referred to as album data-A, and an electronic album displayed on the basis of the album data-A will be called an album-A.

When the memory card 31 is set in the card slot 32, the electronic album display device 10 reads out the album data-A. The display panels 12 and 13 display two successive pages 34 and 35 at a time, e.g. the third and fourth pages in FIG. 3. Images Pic.1 to Pic.N corresponding to the image files #1 to #N (N=a variable integer) are displayed on the respective pages in such arrangements that are designated by the album manager file-A, constituting the album-A. Although it is not shown in the drawings, serial numbers of the images are displayed under the respective images.

Figure 3:
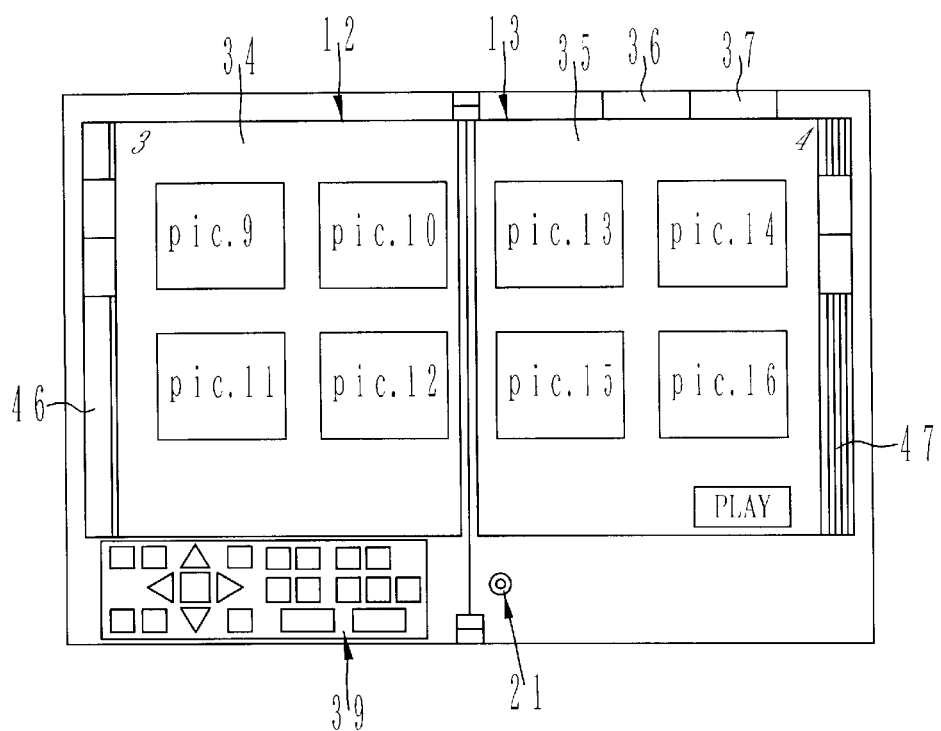
FIG. 3 is an explanatory diagram illustrating an example of a pair of regular format pages displayed on display panels of the album type electronic image display device.
Figure 4A:
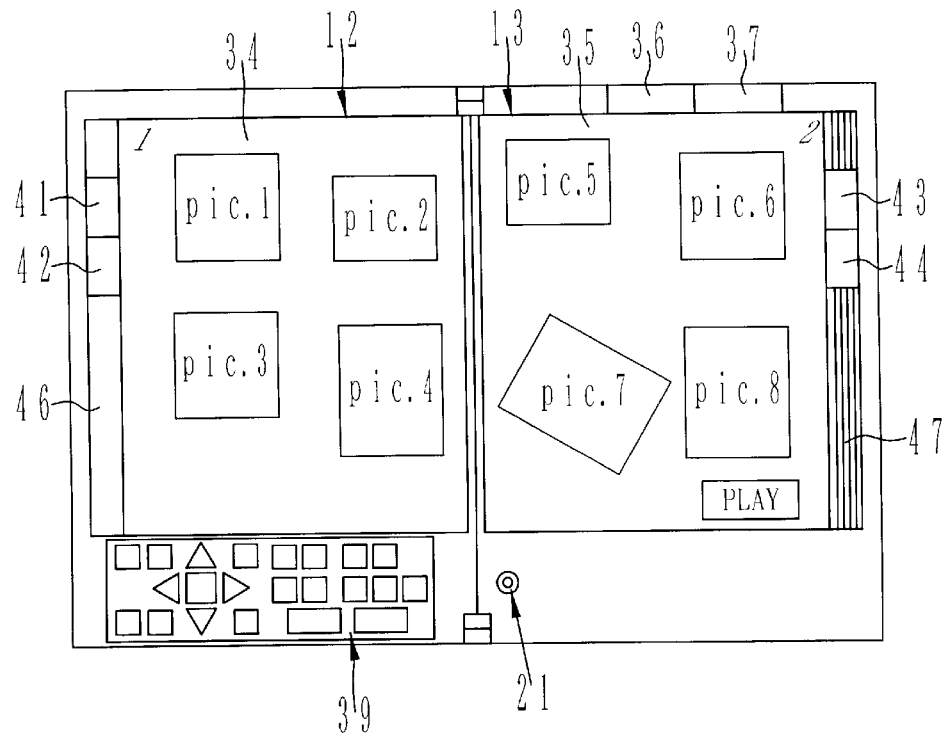
FIGS. 4A and 4B are explanatory diagrams illustrating examples of free format pages displayed on the display panels of the album type electronic image display device.
Figure 4B:
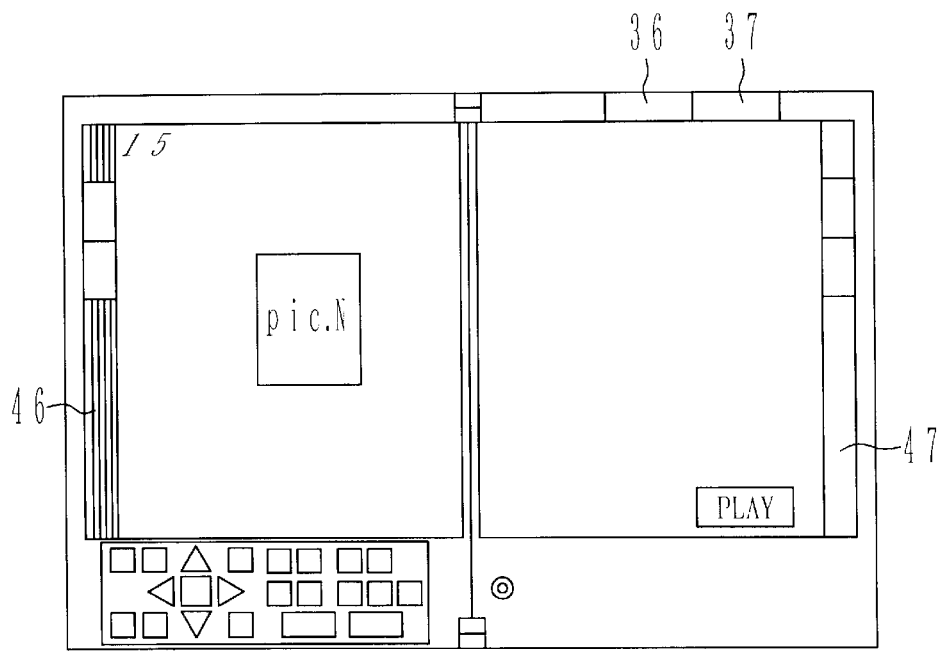

FIG. 3 shows an image arrangement on a regular format page. Beside the regular format page, an free format page is available as shown in FIGS. 4A and 4B. On the regular format page, the images are pasted in predetermined cells whose position, size and number are predetermined within a respective page. In the example shown in FIG. 3, at most four images may be displayed on one page.

On the other hand, the free format page is not provided with such predetermined cells, so the number of images and the positions and sizes of the images may be individually determined on each page, as shown for example in FIGS. 4A and 4B. Furthermore, the angle of the individual images may also be modified, as shown for example by a seventh image Pic.7 in FIG. 4A.

Since the memory card 31 does not store any album manager file when the memory card 31 is set in the electronic album display device 10 for the first time, the electronic album display device 10 reads all the image files contained in the image folder, and produces a new album manager file for these image files, and writes the newly produced album manager file on the memory card 31. The album manager file stores image layout data and page management data so that the images read out from the memory card 31 are displayed in a manner as pasted in the regular format pages. Since the number of cells per one regular format page is previously set up, the total number of pages is determined by the number of read image files. Instead of using the regular format page, it is possible to produce an free format page, and paste the images in appropriate positions on the free format page.

If there are more than one set of album data stored in a memory card, album manager files for the respective sets of the album data are first read out from the memory card, to display an index of album titles on the display panels 12 and 13. Upon selecting one of the album titles, the album data of the selected album is read out to display the images.

Figure 5:
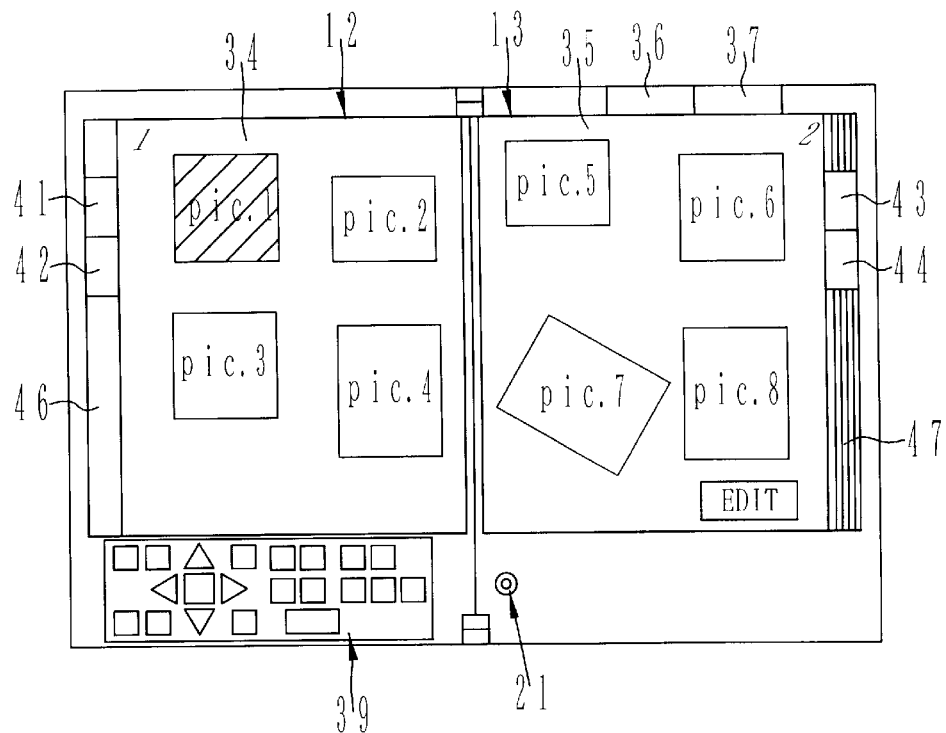
FIG. 5 is an explanatory diagram illustrating an example of display condition on the display panels in an edition mode of the album type electronic image display device.

The electronic album display device 10 may be switched over between a play mode and an edit mode by operating mode selection buttons 36 and 37 on the right-hand body 10b. In the play mode, the images are merely displayed on the display panels 12 and 13, and indicia "Play" is displayed on the display panel 13 in the play mode, as shown in FIGS. 3 and 4. In the edit mode, the image may be copied or moved from one page to another, or may be modified in size and the like, by operating on an operation panel 39. In the edit mode, indicia "Edit" is displayed in place of the indicia "Play", as shown in FIG. 5.

Designated by 41, 42, 43 and 44 are page turning buttons. The buttons 36, 37, 41 to 44 are touch buttons. Upon the page turning button 41 being touched, the preceding two pages are displayed on the display panels 12 and 13. As for the example shown in FIG. 3, the first and second pages are displayed in place of the third and fourth pages when the page turning button 41 is pressed while the third and fourth pages are displayed. Upon the page turning button 43 being touched, the following two pages are displayed. Thus, the user may observe the images page after page, just like turning each leaf of the real album. It is possible to change the pages one page after another in response to the page turning button 41 or 43. In that case, the page displayed on the right-hand display panel 13, e.g. the fourth page in FIG. 3, is shifted to the left-hand display panel 12 in response to the page turning button 41, and the next page, i.e. the fifth page in this instance, is displayed on the display panel 13.

The button 42 is a rapid review button, and the button 44 is a cue button. Indicators 46 and 47 are provided along outer vertical edges of the display panels 12 and 13, for visually indicating the amount of those pages before the presently displayed pages, and the amount of those pages after the presently displayed pages, respectively. The indicators 46 and 47 are each divided into a number of vertically extending elongated LCD segments. The number of active LCD segments of the indicator 46 varies with the amount of the preceding pages, whereas the number of active LCD segments of the indicator 47 varies with the amount of the following pages.

Figure 6:
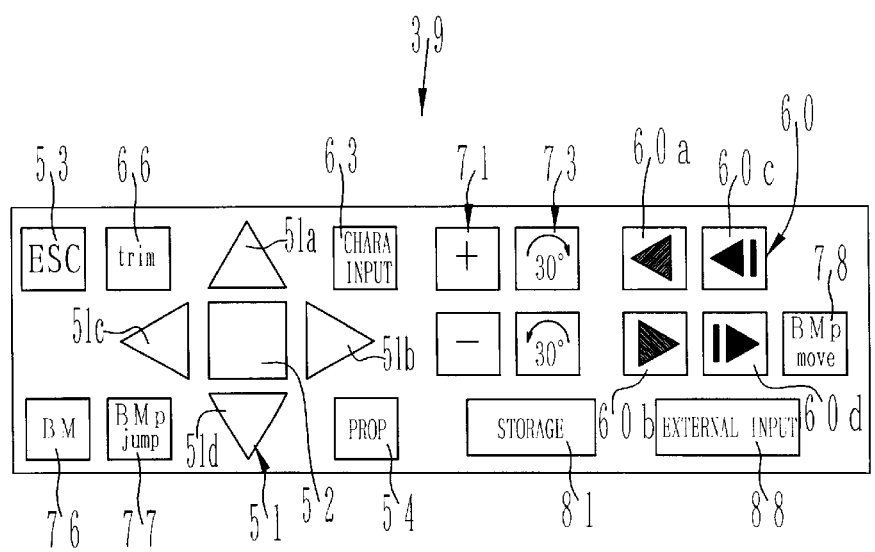
FIG. 6 is a top plan view of an operation panel provided on the album type electronic image display device.

As shown in FIG. 6, a variety of operation buttons are provided on the operation panel 39. Shift buttons 51, consisting of four shift buttons 51a, 51b, 51c and 51d, are used for many purposes, for example, for moving a cursor on the display panel, or for selecting an item from among a menu list. Immediately after the electronic album display device 10 is switched to the edit mode, the cursor is placed on the lowest numbered image among the displayed images, i.e. the image Pic.1 in FIG. 5. As the cursor is placed, the image is displayed in a different tone or color from other images, e.g. in a grayish tone, to distinguish the pointed image from other images.

Pressing on the button 51a or 51b causes the cursor to move to the lower numbered image, whereas pressing on the button 51c or 51d causes the cursor to move to the higher numbered image. When the button 51a or 51b is pressed when the cursor is placed on the lowest numbered image of the displayed pages, the entire page containing the lowest numbered image is selected. By pressing the button 51a or 51b once more, the highest numbered image of the displayed pages is selected then. On the contrary, when the button 51*c* or 51*d* is pressed when the cursor is placed on the highest numbered image of the displayed pages, the entire page containing the highest numbered image is selected. By pressing the button 51*c* or 51*d* once more, the lowest numbered image of the displayed pages is selected then. The selection is made effective by pressing on an enter button 52.

Figure 7A:
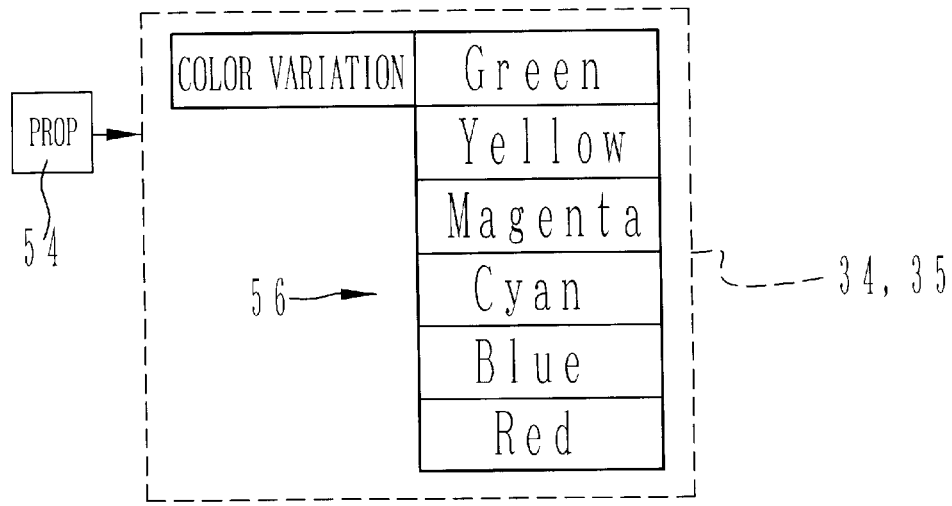
FIGS. 7A and 7B are explanatory diagrams illustrating a color menu and a main menu respectively, which are displayed upon a property button being operated.

An escape button 53 is used for canceling the operation on the operation panel 39. A property button 54 is used for modifying the background color of the pages, the priority of displaying the images, and so on. For example, when the property button 54 is pressed while one of the pages 34 and 35 is selected, a color menu 56 with a list of color options appears on that page, as shown in FIG. 7A, so the user may select a color for the background from the color option list by placing the cursor on that color.

Figure 7B:
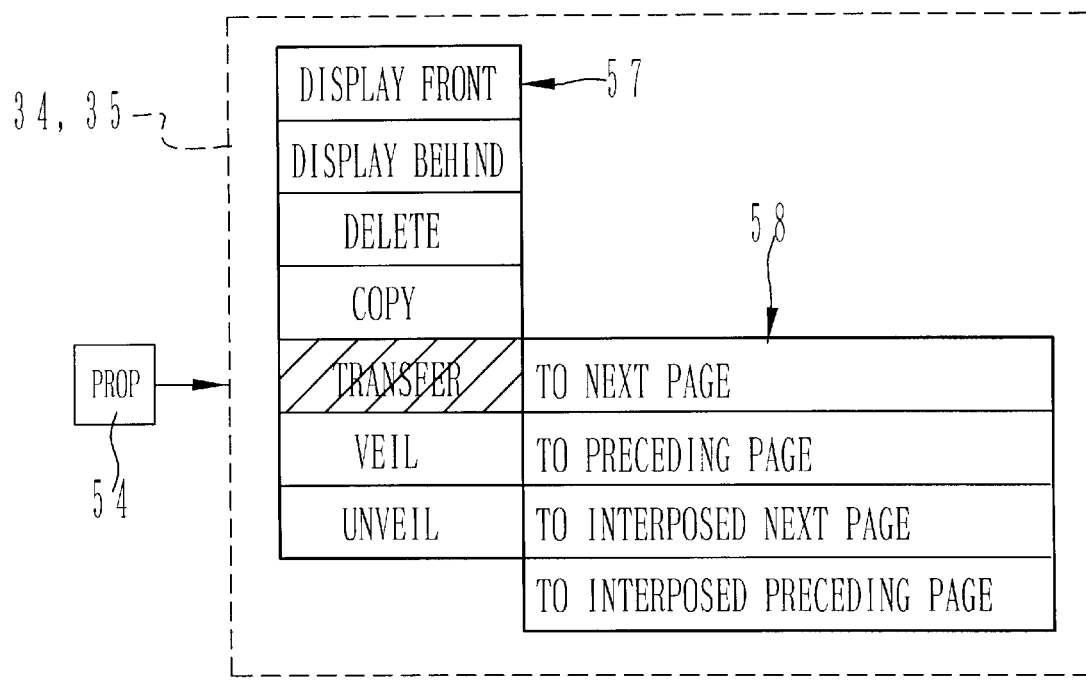

When the property button 54 is pressed while an image is selected, a main menu 57 including several editorial items is displayed on the page 34 or 35 that has the selected image, as shown in FIG. 7B. The items "Display Front" and "Display Behind" are for displaying the selected image before or behind another image when these two images overlap. When the item "Delete" is selected, the image selected at that time is deleted. The item "Copy" is for copying the selected image. The item "Veil" is for making the selected image invisible for a while without deleting that image. The item "Unveil" is for unveiling the veiled image, i.e., for making it visible again. The veiled image may be selected by the cursor.

The item "Transfer" is for transferring the selected image to another page. When the item "Copy" or "Transfer" is selected, an input box is displayed, so the page the copy of the selected image is to be pasted thereon, or the page the selected image is to be transferred thereto may be designated by entering the number of that page in the input box. The position of the selected image may be changed within the same page by operating the button 51*a* to 51*d* after selecting that image.

When the item "Transfer" is selected, a sub menu 58 is displayed in addition to the main menu 57, as shown in FIG. 7B. The sub menu 58 includes a list of those pages which are likely to be designated as the goal page to which the image is transferred. The sub menu 58 includes a command "Transfer to the preceding page" and a command "Transfer to the next page", which are used for designating the preceding page or the next page respectively. The sub menu 58 also includes commands "Transfer to an interposed next page" and "Transfer to an interposed preceding page", upon which a page is interposed before or behind the presently selected page, and the selected image is transferred to the interposed page. It is to be noted that the same sub menu 58 is displayed also when the item "Copy" is selected. Thus, the sub menu 58 makes it more convenient to designate the goal page.

Because the frequency of making the image transfer operation is assumed to be pretty high in editing the album, the operation panel 39 is provided with specific image transfer buttons 60*a*, 60*b*, 60*c* and 60*d*. These image transfer buttons 60*a*, 60*b*, 60*c* and 60*d* have functions corresponding to the four items of the sub menu 58, and facilitate the image transfer operation.

If the image is to be pasted on or transferred to the free format page, the positions of the previously existing images and the added image are automatically adjusted so as to avoid overlapping the added image with the previously existing images or make the overlap as least as possible. In any case, the images are prevented from being covered up with other images, so that the user can trace all the images. In a case where the overlap area comes to be more than a predetermined ratio to the image area, a page is automatically interposed, and the additional image is pasted on the newly interposed page.

Figure 8A:
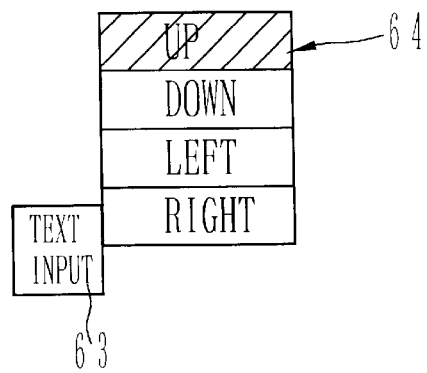
FIGS. 8A, 8B and 8C are explanatory diagrams illustrating a caption input operation on the album type electronic image display device.
Figure 8B:
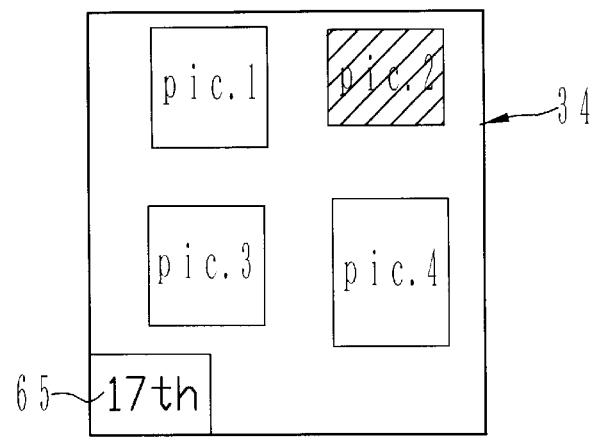
Figure 8C:
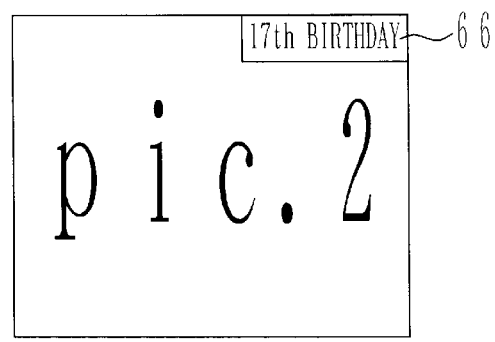

A caption button 63 is used for writing a caption, such as a title or a memo, in the album. Upon the caption button 63 being pressed, a location list 64 appears on the selected page 34 or 45, as shown in FIG. 8A, to select the location of the caption on the page. After the location is selected, a caption display box 66 is displayed on the selected location, e.g. on the upper right corner of the selected image, as shown in FIG. 8C. Thereafter, a caption input box 65 appears on a lower left corner of the display panel 12. The caption input box 65 functions as a touch panel that recognizes a character when it is written thereon by a pen or a finger, and converts the hand-written character into a character code. On the basis of the character code, the electronic album display device 10 displays the entered character in the caption display box 66. Thus, a caption is entered by writing characters one by one on the caption input box 65. It is possible to provide the electronic album display device 10 with a voice recognition device for entering a voice explanation of the image.

A trimming button 66 is used for trimming the selected image to display a fragment of the selected image. A magnification button 71 is used for enlarging or reducing the selected image while maintaining the same aspect ratio. If the enlarged image partly extends beyond one display panel 12 or 13, the extended part may be displayed on the other display panel. The turn-around button 73 is for turning around the image. The selected image is turned around by a predetermined angle, e.g. 30 degrees, at every operation on the turn-around button 73.

A book mark setting button 76 is for setting a bookmark on an appropriate page. The page attached with a bookmark will be called up by pressing on a book mark jump button 77. Data of the marked page is registered in the album manager file. A bookmark movement button 78 is for moving an image to the marked page.

Figure 9:
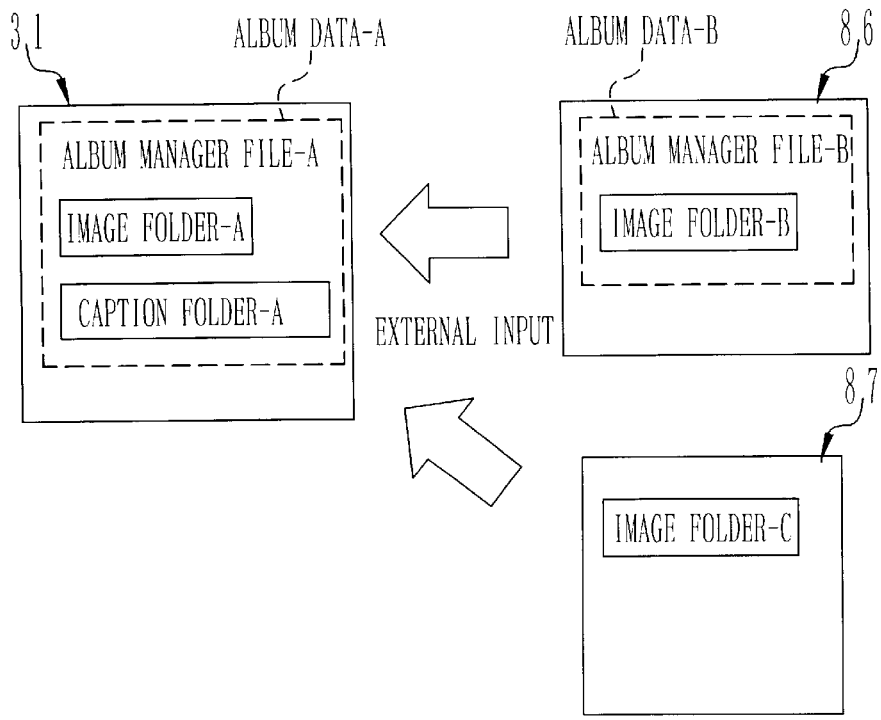
FIG. 9 is an explanatory diagram illustrating an operation for inserting external image files into the album data presently read into the album type electronic image display device.

Besides the above described album editing operations, the electronic album display device 10 is capable of adding images from an external device into a set of images contained in the album data that is already read in the electronic album display device 10. For instance, as shown in FIG. 9, even while the electronic album display device 10 has already read the album data-A from the memory card 31, the electronic album display device 10 can read second album data-B from another memory card 86, and interpose images of an image folder-B of the album data-B in appropriate positions between the images of the album data-A.

To read external images, an external input button 88 is to be pressed in the edit mode. Then, the electronic album display device 10 displays a message "Set the memory card storing the images to read". Thereafter when the user removes the previously set memory card 31 and sets the memory card 86, the album data-B is read into a RAM 96 of the electronic album display device 10 (see FIG. 11) in addition to the previously read album data-A. Upon the external input button 88 being pressed, the electronic album display device 10 is switched to a data holding mode where data written in the RAM 96 is held. Thus, the album data-A does not vanish from the electronic album display device 10 even when the memory card 31 is removed.

As for a memory card 87 that stores only an image folder-C and does not store an album manager file, the electronic album display device 10 produces an album manager file for the image folder-C after it reads out the image folder-C from the memory card 87.

Figure 10A:
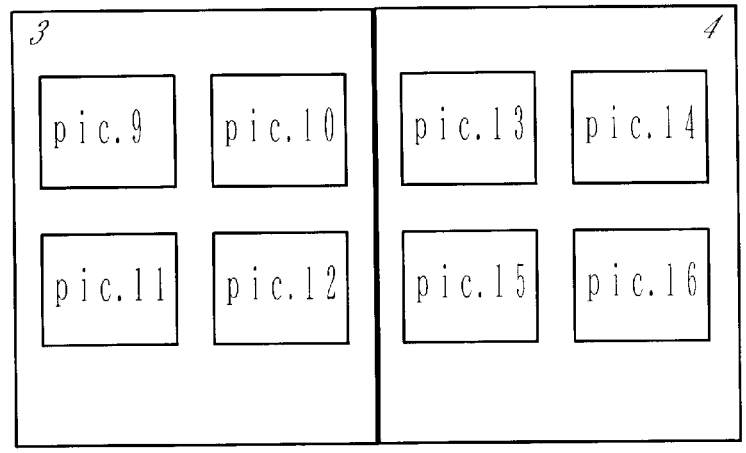
FIGS. 10A and 10B are explanatory diagrams illustrating an example of how the external image files are inserted into the album already existing in the album type electronic image display device.
Figure 10B:
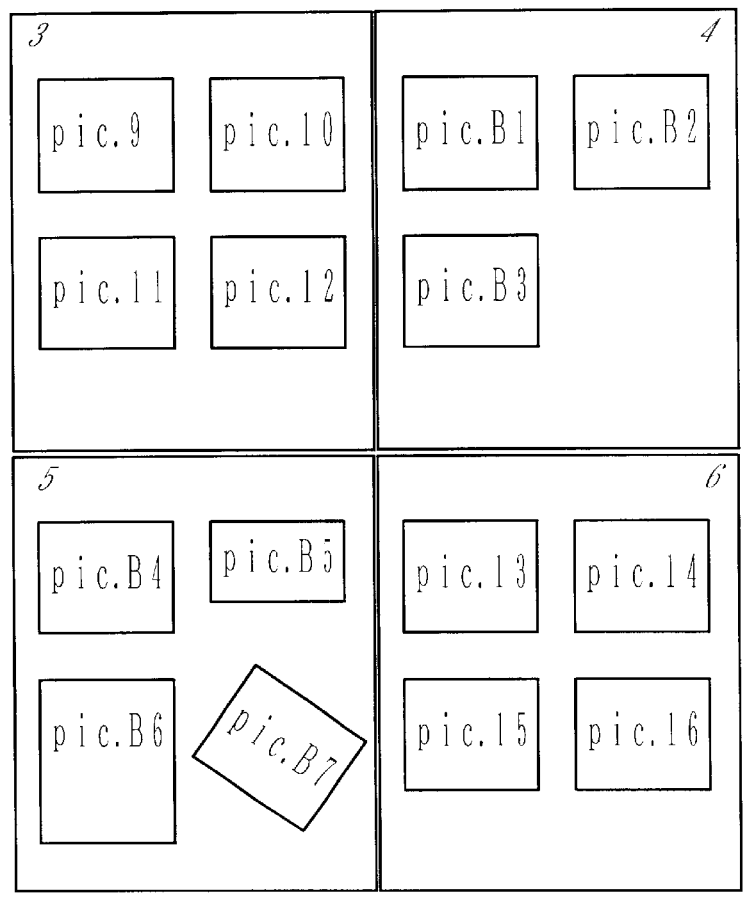

To designate the position where the album data-B is to be interposed, the user displays a couple of successive pages on the display panels 12 and 13. Thereafter when the enter button 52 is pressed, images contained in the album data-B are interposed between the displayed pages. For example, when the album data-B is to be interposed between the third and fourth pages of the album-A, the third and fourth pages are displayed on the display panels 12 and 13, as shown in FIG. 10A. In the instance shown in FIG. 10B, the album data-B contains seven images Pic.B1 to Pic.B7, and the images Pic.B1 to Pic.B3 are pasted on a regular format page that is newly interposed as the fourth page, whereas the images Pic.B4 to Pic.B7 are pasted on an free format page that is newly interposed as the new fifth page. As a result, the sixth and following pages come to contain the images that are previously contained in the fourth and following pages of the album-A. The page layout of the images of the album-A is maintained unchanged after the insertion of the album data-B.

Concurrently with the insertion of the album data-B, data of the album manager file-B is taken over by the album manager file-A. That is, the image files contained in the image folder-B are now managed by the revised album manager file-A, together with the image files of the image folder-A. At that time, the file names of the image files that have previously been managed by the album manager file-B are also revised so as to facilitate management by the album manager file-A. In this way, image files stored in a number of memory cards may be united into an electronic album that is managed by a common album manager file.

To store the revised album data-A, that is produced from the original album data-A and the album data-B in this instance, a storage button 81 is to be pressed. Upon the storage button 81 being pressed, a message box for designating a memory location appears on the display panel 12 or 13. For example, the message box displays a message "Write the album data on the set memory card? If not, replace the set memory card with another memory card." If the revised album data-A is to be written on the set memory card, e.g. the memory card 87 in this instance, the user presses the enter button 52. If not, the user replaces the memory card 87 with another, and then presses the enter button 52.

The message box for designating the memory location is displayed whenever the storage button 81 is pressed, even if the album data is not edited. In that case, the album data may be duplicated by setting a different memory card from that previously stores the album data. If the set memory card already stores such an album manager file or an image folder that has the same title as that of the album data to be newly stored, a warning is displayed on the electronic album display device 10, to notify that the already stored data of the same name will be rewritten as new one if the user press the enter button 52. Thus, the data already stored in the memory card is prevented from being rewritten unexpectedly. Such a warning may be given as a voice message.

Figure 11:
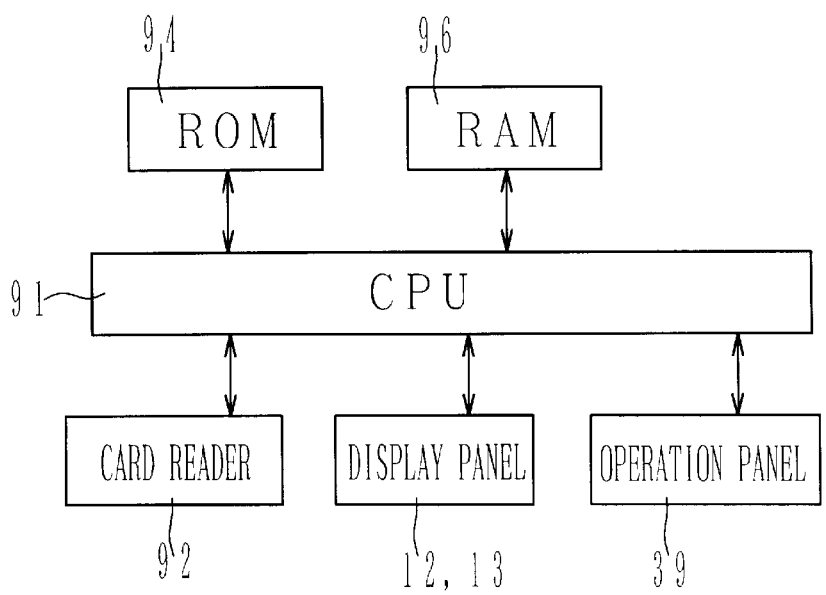
FIG. 11 is a block diagram illustrating an electric structure of the album type electronic image display device.

FIG. 11 schematically shows an electric structure of the electronic album display device 10. The display panels 12 and 13, the operation panel 39, a card reader 92, a ROM 94, and the RAM 96 are connected to a CPU 91. The CPU 91 controls the overall operation of the electronic album display device 10 in accordance with commands entered through the operation panel 39. The ROM 94 previously stores programs necessary for displaying images in a manner similar to an album. The RAM 96 temporarily stores the album manager files and the image files as they are read out from the memory card 31, and also functions as a work memory used for executing the programs. The CPU 91 revises the album data as stored in the RAM 96 in accordance with applied editions on the album, e.g. when the image is deleted or moved inside the album. The CPU 91 also processes the image data when some images are inserted from an external device, e.g. a second memory card, into the presently entered album. The display panels 12 and 13 not only serve as display devices, but also serve as touch panels through which commands may be input in the CPU 91.

Figure 12A:
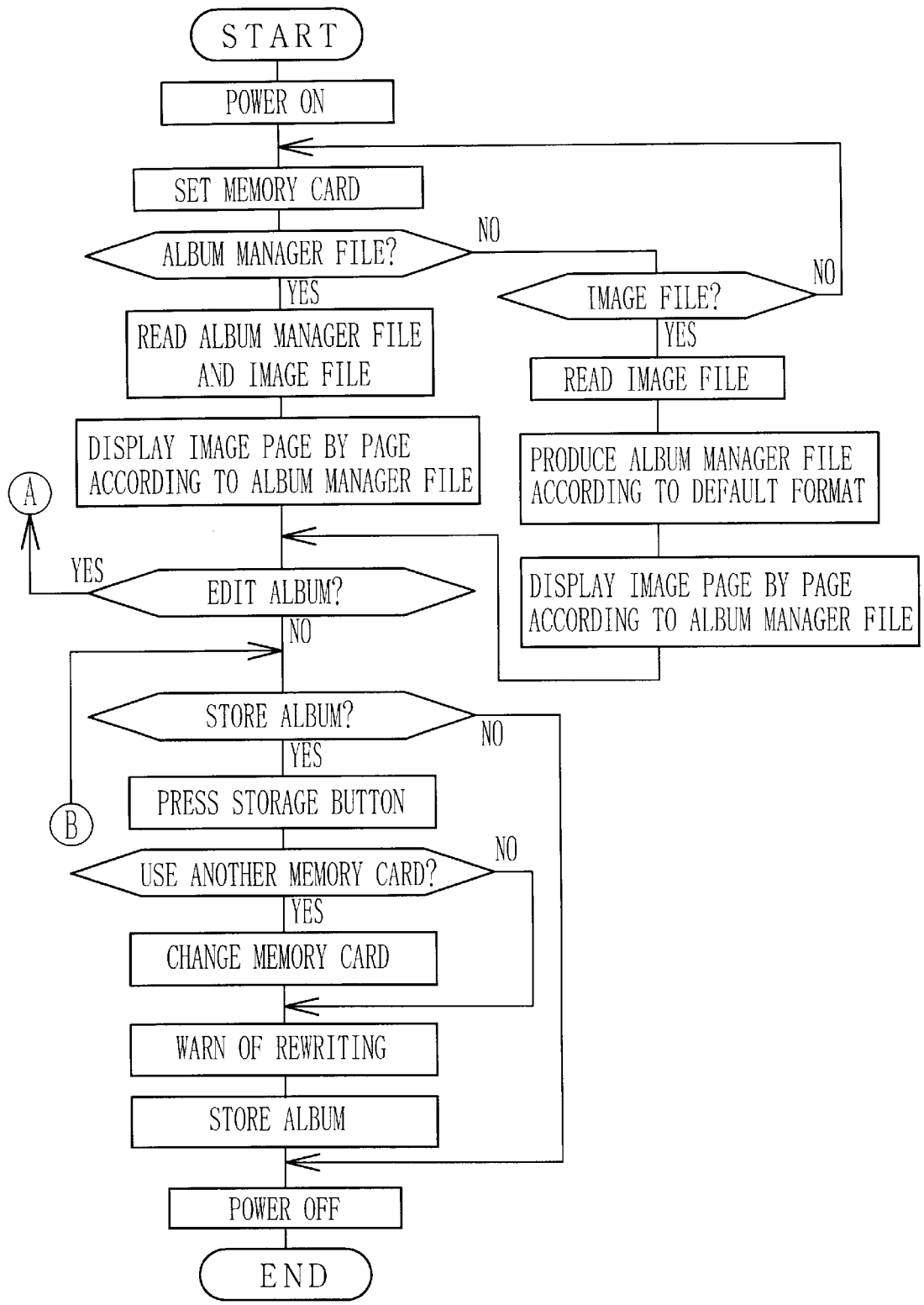
FIG. 12 is a flow chart illustrating the overall operation of the album type electronic image display device.
Figure 12B:
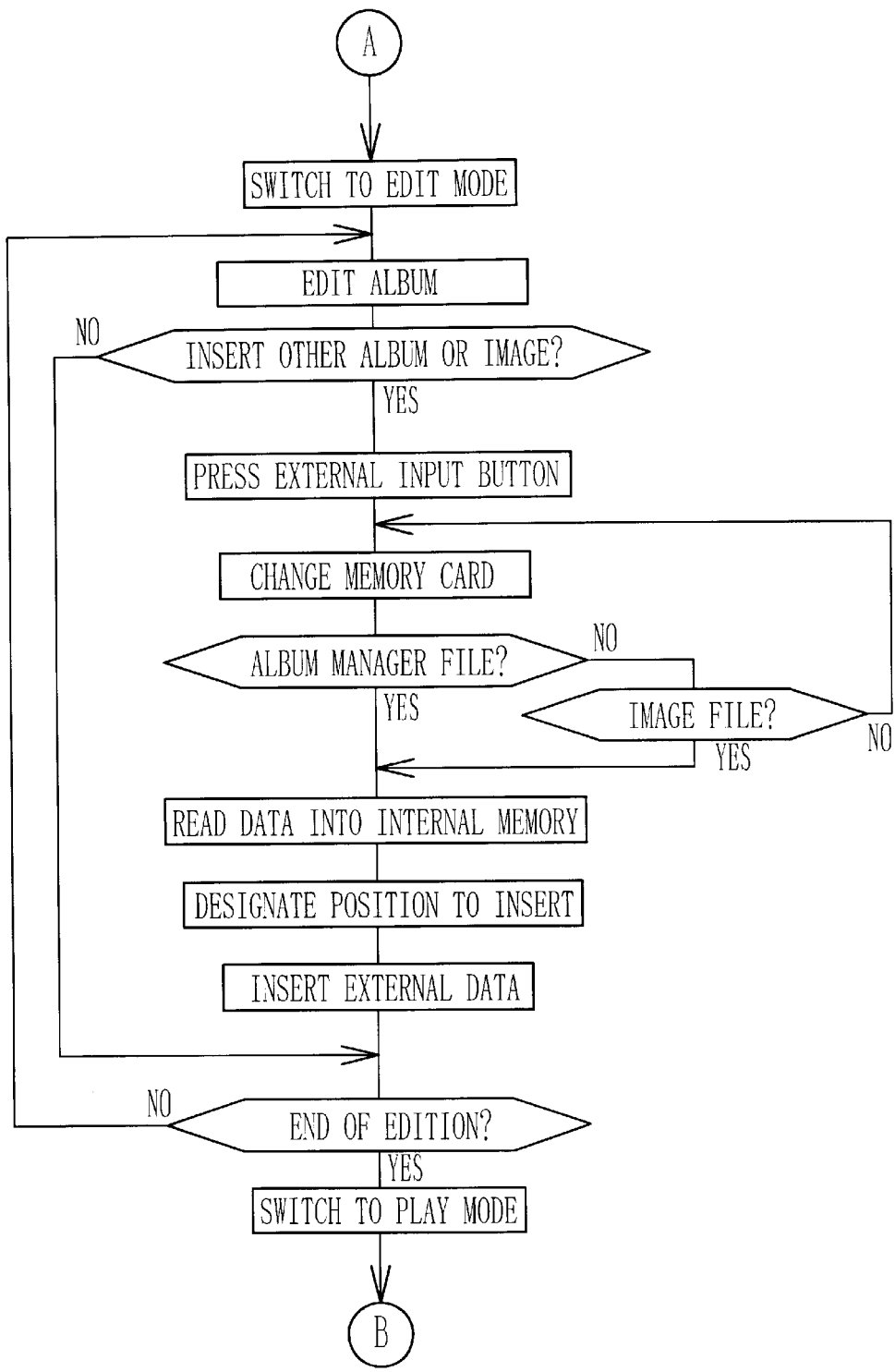

Now the overall operation of the electronic album display device 10 having the above described structures will be described with reference to the flowcharts of FIGS. 12A and 12B.

The power switch 21 is turned on upon the left- and right-hand bodies 10a and 10b being flapped open. By setting the memory card 31 in the card slot 32, the CPU 91 checks through the card reader 92 if there is an album manager file in the memory card 31.

Since there is the album manager file-A in the memory card 31, the CPU 91 reads out the album data-A including the album manager file-A, and writes it on the RAM 96. Then, in accordance with the data stored in the album manager file-A, the images Pic.1 to Pic.N are displayed on the display panels 12 and 13 in the form of a pair of pages at a time. The electronic album display device 10 is initially set to the play mode, so the user observe the images while operating the page turning buttons 41 to 44.

By pressing the edit mode selection button 37, the electronic album display device 10 is switched to the edit mode. Then, the displayed images may be edited in size, position and so forth by operating on the operation panel 39, in a manner as set forth above. The CPU 91 revises the album manager file-A by recording data relating to the applied edition on the RAM 96.

To add other images to the images as read out from the memory card 31, the user presses the external input button 88, and sets another memory card, e.g. the memory card 86, in place of the memory card 31. Because the album data-B stored in the memory card 86 includes the album manager file-B, the CPU 91 reads out the album data-B including the album manager file-B and write it on the RAM 96. Since the electronic album display device 10 is switched to the data holding mode when the external input button 88 is pressed, the already existing album data-A is not replaced by the album data-B.

As for a memory card that does not store an album manager file, like the memory card 87, the CPU 91 merely reads the image files and produces a new album manager file. The images of the newly read album data are pasted on the regular format pages. The respective pages containing the newly read images are interposed between two successive pages of the album-A by displaying these pages on the display panels 12 and 13 and pressing the enter button 52. Also, the album manager file-A is revised on the basis of the album manager file-B. When the interposition of the new pages is accomplished, images of the revised album-A including the interposed pages are displayed on the display panels 12 and 13.

By operating on the play mode selection button 36, the edition mode is terminated, and the electronic album display device 10 is switched to the play mode. To transfer the revised album data-A from the RAM 96 to an external memory, the user presses the storage button 81. If the revised album data-A is to be written on the memory card 31, the user sets the memory card 31 in the card slot 32 and press the enter button 52. Then, the warning is displayed to notify that the album data-A is already stored in the memory card 31 and will be replaced by the revised album data-A unless the command is canceled. The user presses the enter button 52 again to replace the album data-A with the revised one. To avoid rewriting the former album data-A, the user sets another memory card in place of the memory card 31.

To copy the album data, the user sets a memory card storing the album data in the card slot 32, so the album data is read out and stored in the RAM 96. Thereafter the user presses the storage button 81, and sets a second memory card in the card slot 32. By pressing the enter button 52 then, the album data stored in the RAM 96 is written on the second memory card.

Figure 13:
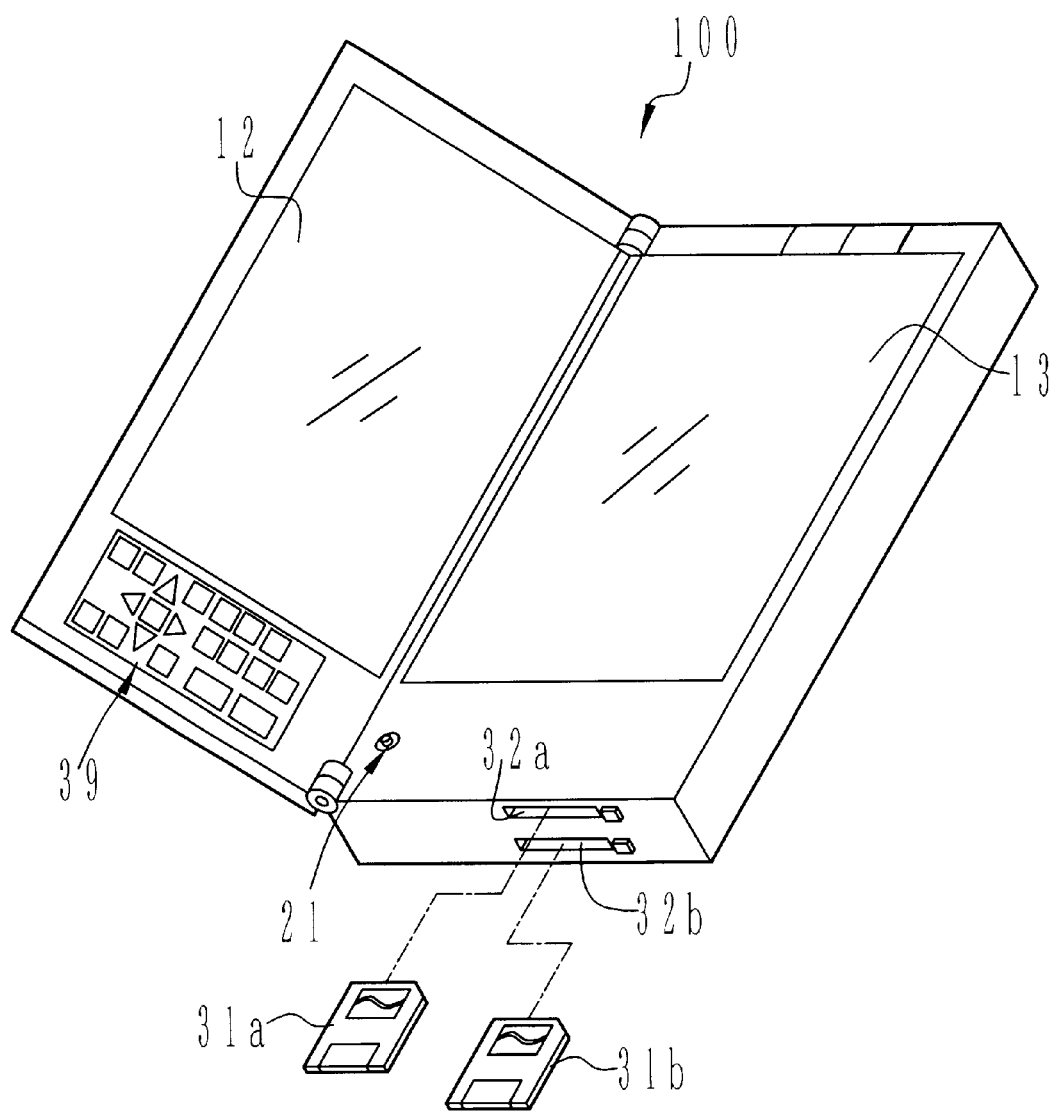
FIG. 13 is a perspective view of an album type electronic image display device according to a second embodiment of the present invention.

According to a second embodiment of the present invention shown in FIG. 13, an album type electronic image display device 100 is provided with two card slots 32a and 32b for permitting insertion of two memory cards 31a and 31b at a time. A card reader 92 is disposed inside each of the card slots 32a and 32b. The second embodiment is convenient because it is unnecessary to remove the memory card 31a or 31b and set the other memory card 31b or 31a when reading out album data from these memory cards 31a and 31b, or copying the album data between these memory cards 31a and 31b.

Although all pages of the album data-B are interposed between the pages of the album data-A in the above embodiment, the electronic image display device of the present invention may be configured to be capable of designating pages or images of an album to be inserted into another album.

It is also possible to designate the electronic image display device to read merely the image files regardless of whether there is an album manager file for these image files, and paste all the read images on regular format pages. In that case, a new album manger file is produced for the read image files.

Figure 14A:
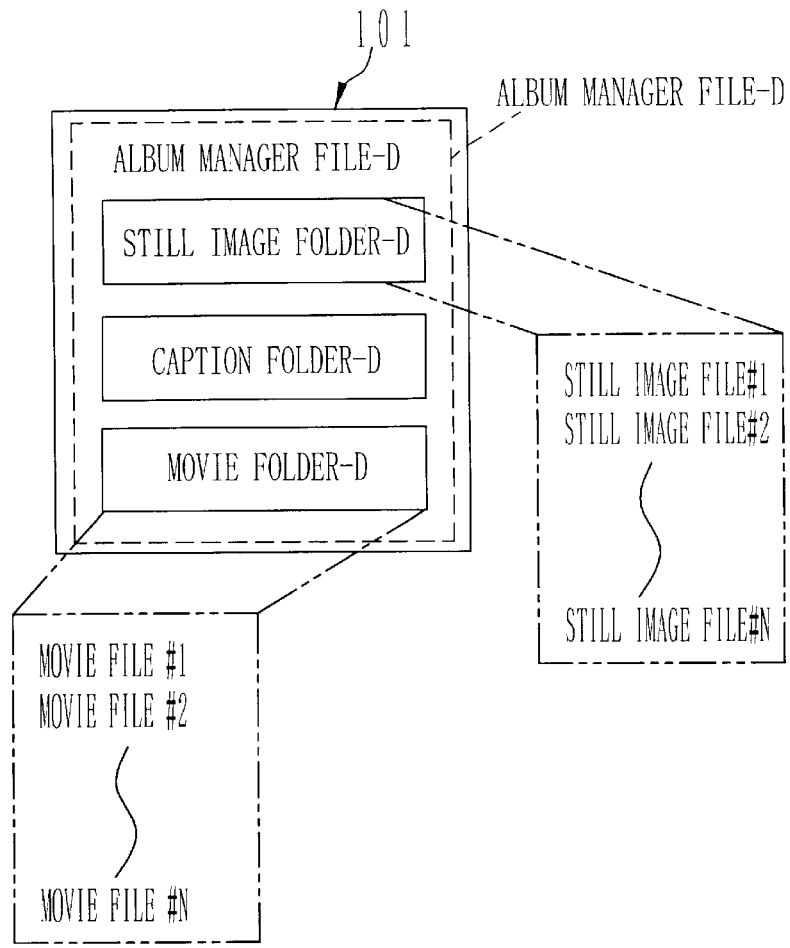
FIG. 14A is a conceptual diagram illustrating album data stored in a memory card, wherein the album data is stored in a movie image folder and a still image folder.

Although the album type electronic image display devices of the above embodiments merely display still images, the electronic album display device may be provided with a device for reproducing movies besides still images. In that case, as shown in FIG. 14A, a memory card 101 for use with the album type electronic image display device stores still image files #1 to #N in a still image folder-D and movie files #1 to #N in a movie folder-D. The still image files #1 to #N and the movie files #1 to #N are managed commonly by an album manager file-D that stores a screen size of the movies and their display positions. Since some of recent electronic still cameras are provided with a device for photographing movies in addition to a device for photographing still images, this embodiment is preferable as it permits managing the movies and the still images together as an electronic album.

Figure 14B:
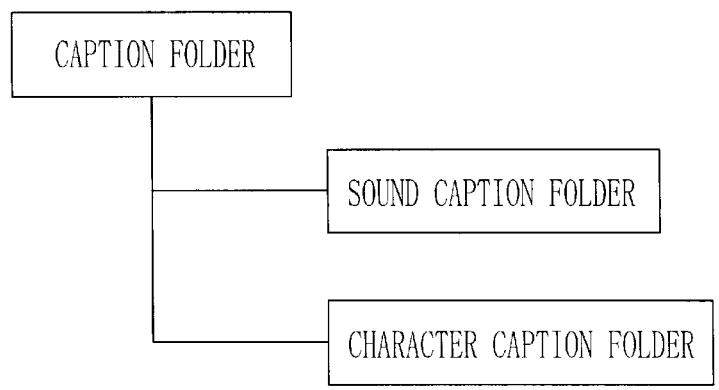
FIG. 14B is a conceptual diagram illustrating a caption folder having a sound caption folder for storing sounds and a character caption folder for storing characters.

Since it is usual for electronic cameras to record voices or sounds simultaneously with photographing the movies, the memory card 101 stores the sounds recorded with the movies along with the still and movie files. For this purpose, a caption folder-D of the memory card 101 includes a sound caption folder and a character caption folder, as shown in FIG. 14B. The character caption folder stores character codes of those characters which are entered as captions for still images through the character input process in the edit mode of the electronic image display device. The sound caption folder stores the sounds as recorded with the movies, and also voices and sounds which are recorded as captions and back ground music in association with the still images through a sound recorder of the electronic still camera.

Figure 15A:
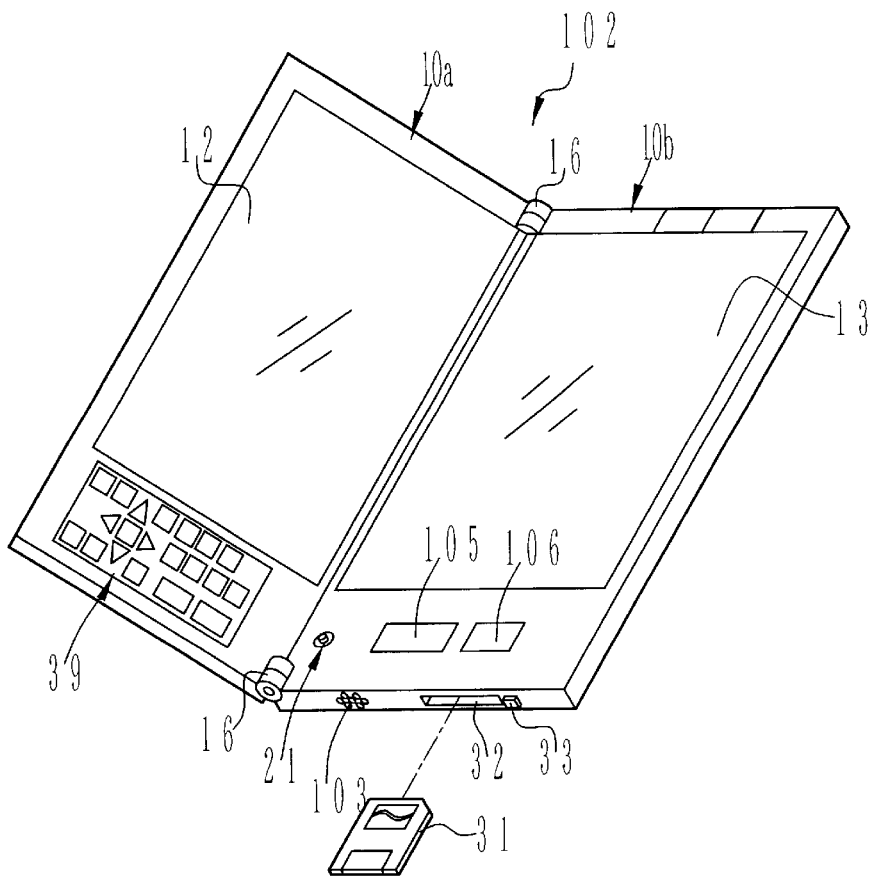
FIG. 15A is a perspective view illustrating an album type electronic image display device according to a third embodiment of the present invention, in its open active position.
Figure 15B:
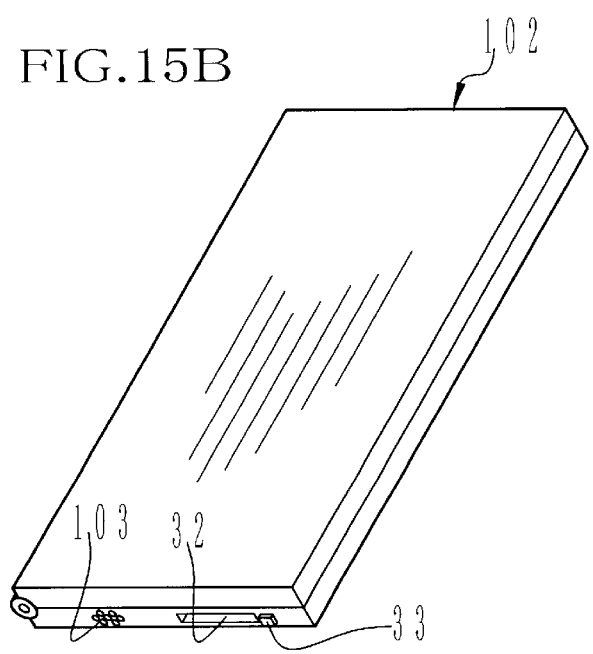
FIG. 15B is a perspective view illustrating the album type electronic image display device of the third embodiment in its closed inactive position.

FIGS. 15A and 15B show an album type electronic image display device or electronic album 102 according to a third embodiment of the present invention. The electronic album display device 102 is adapted to display movies, and is provided with a speaker 103 for reproducing the sounds and the voices as recorded on a memory card 101 in association with still image files and movie files. The electronic album display device 102 has the same fundamental structures as the electronic image display device 10 of the first embodiment, so the like parts are designated by the same reference numerals, and the detailed description of these equivalent parts are omitted in the description of the third embodiment in order to avoid redundancy.

When the memory card 101 is put in a card slot 32 of the electronic album display device 102, the electronic album display device 102 reads out data from the still image folder-D, the movie folder-D and the caption folder-D of the memory card 101. When an album manager file-D for correlating and managing the data of these folders is also stored in the memory card 101, the electronic album display device 102 first reads out the album manager file-D, and pastes still images Pic.1 to Pic.N of the still image files #1 to #N and movies Movie.1 to Movie.N of the movie files #1 to #N on respective pages in accordance with the album manager file-D. If the memory card 101 does not store such an album manager file-D, the electronic album display device 102 pastes the images sequentially on regular format pages and produces the album manager file-D. The album manager file-D and the data stored in the still image folder-D, the movie folder-D and the caption folder-D will be called album data-D as a whole, and an electronic album displayed on the basis of the album data-D will be called an album-D.

If there are more than one set of album data stored in a memory card, album manager files for the respective sets of the album data are first read out from the memory card, to display an index of album titles on the display panels 12 and 13. Upon selecting one of the album titles, the album data of the selected album is read out to display the images.

Figure 16:
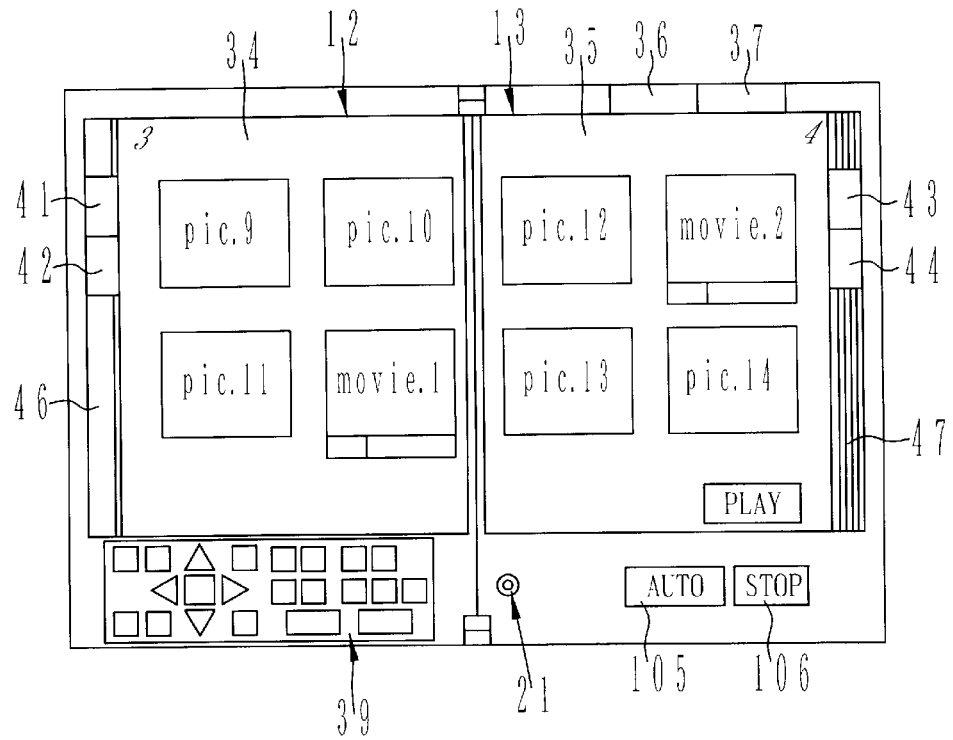
FIG. 16 is an explanatory diagram illustrating an example of a pair of regular format pages displayed in a play mode on display panels of the album type electronic image display device of the third embodiment.
Figure 17:
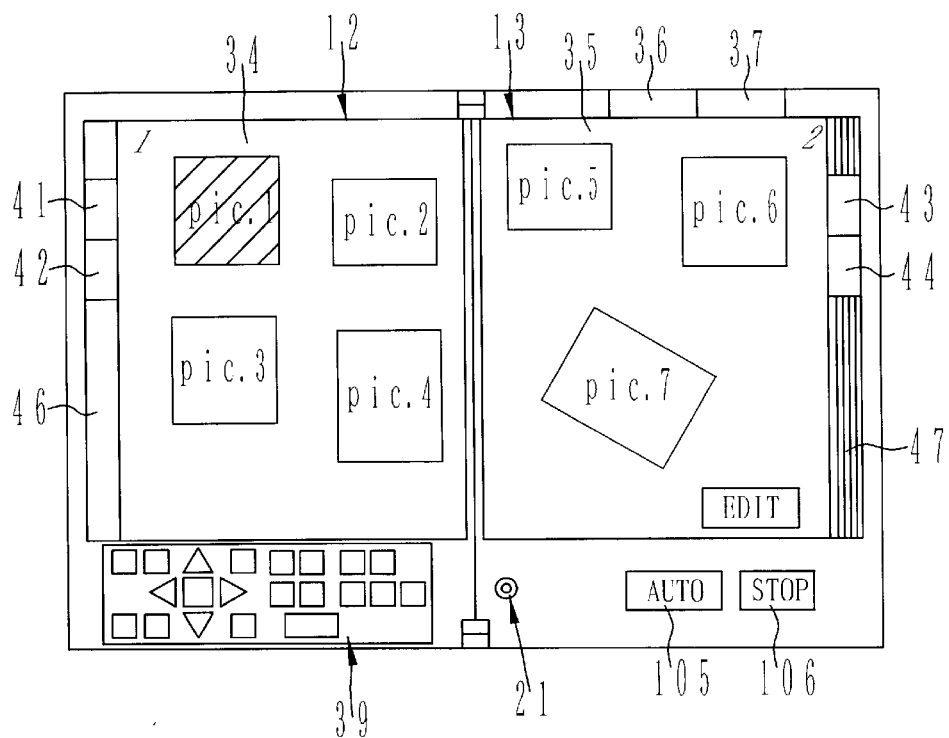
FIG. 17 is an explanatory diagram illustrating an example of a pair of free format pages displayed in an edition mode on the display panels of the album type electronic image display device of the third embodiment.

As shown in FIG. 16, display panels 12 and 13 display two successive pages 34 and 35 at a time, pages 3 and 4 in this instance. FIG. 16 shows an image arrangement on a regular format page. On the regular format page, the images are pasted in predetermined cells whose position, size and number are predetermined within a respective page. In the example shown in FIG. 16, at most four images may be displayed on one page. Beside the regular format page, an free format page is available. The free format page is not provided with such predetermined cells, so the number of images and the positions and sizes of the images may be individually determined on each page, as shown in FIG. 17. Furthermore, the angle of the individual images may also be modified, as shown for example by a seventh image Pic.7 in FIG. 17.

The electronic album display device 102 may be switched over between a play mode and an edit mode by operating mode selection buttons 36 and 37 on the right-hand body 10b. In the play mode, the images are merely displayed on the display panels 12 and 13, and indicia "Play" is displayed on the display panel 13 in the play mode, as shown in FIG. 16. In the edit mode, indicia "Edit" is displayed in place of the indicia "Play", as shown in FIG. 17. In the edit mode, the images may be copied or moved from one page to another, or may be modified in size, angle and so on by operating buttons on an operation panel 39 in the same way as described with respect to the first embodiment. The operation panel 39 may have the same structure as shown in FIG. 6. Furthermore, the user may enter a character caption for any of the images, including the movies, in the same way as described with respect to the first embodiment. The image selected in the edit mode is displayed in a different color, e.g. as a gray tone image, as shown with respect to the first image Pic.1 in FIG. 17.

According to the third embodiment, the play mode includes a standard play mode and an automatic play mode. When a power switch 21 is turned on or when the play mode selection button 36 is pressed, the electronic album display device 102 is initially set to the standard play mode. In the standard play mode, the displayed pages 34 and 35 are turned by manually operating page turning buttons 41 to 44 which are provided as touch buttons on left and right end portions of the display panels 12 and 13, as shown in FIG. 16. By pressing an automatic play button 105 that is disposed below the display panel 13, the electronic album display device 102 is switched to the automatic play mode. In the automatic play mode, every page of the album is automatically displayed sequentially from the first page to the last page. When all the pages of the album have been displayed, the electronic album display device 102 automatically returns to the standard play mode.

To stop the automatic play for a moment, the user presses the automatic play button 105. By pressing the automatic play button 105 during the temporary stop, the automatic play restarts. A stop button 106 is provided for interrupting the automatic play mode and resetting to the standard play mode.

Figure 18:
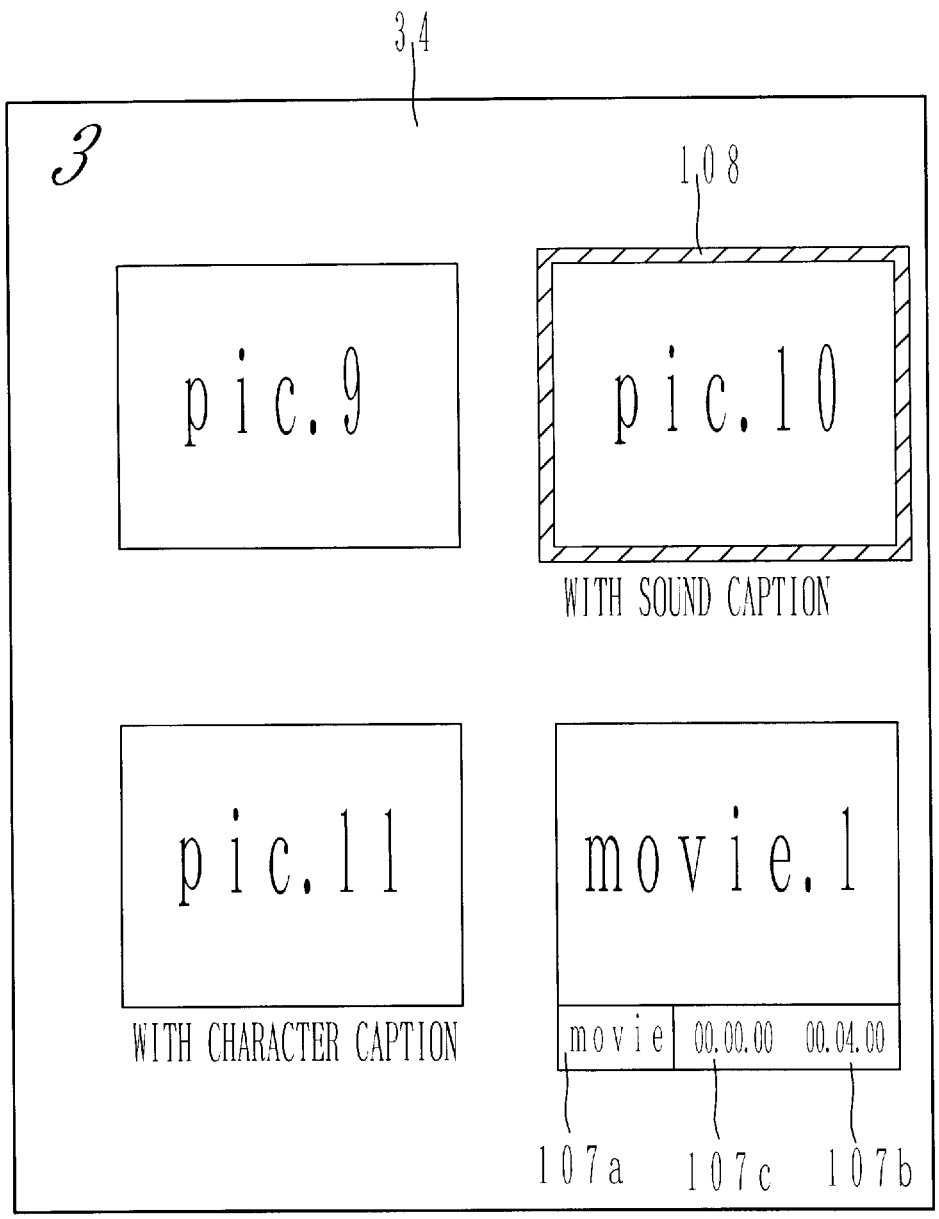
FIG. 18 is an explanatory diagram illustrating a display condition where one of images contained in a page is selected on the display panel.

When the displayed page 34 or 35 contains the movie, an indicia 107a indicating the image as a movie, e.g. "movie", is displayed under that image, as shown with respect to the movie Movie.1 in FIG. 18. Beside the indicia "movie" 107a, a total play time 107b and a present play time 107c of that movie are displayed in the scale of "hour. minute. second". In the instance shown in FIG. 18, the total play time of the movie Movie.1 is 4 minutes, so the total play time is displayed as "00. 04. 00". To start playing the movie in the standard play mode, the user touches a portion of the movie on the display panel 12 of 13 with a finger or a touch pen. Then, the numerical values of the present play time start changing correspondingly. In the automatic play mode, the movies begin to play in a predetermined sequence, as set forth in detail later.

If a sound caption or a character caption is assigned to the displayed still image, a corresponding indicia is displayed under that still image, as shown with respect to tenth and eleventh still images Pic.10 and Pic.11 in FIG. 18. By touching such a still image with the finger or the touch pen in the standard play mode, the assigned sound caption is reproduced through the speaker 103, or the assigned character caption is displayed in association with that image. When one of the displayed images is selected in this way, a discrimination frame 108 is displayed around the selected image, as shown with respect to the still image Pic.10. The discrimination frame 108 may twinkle to make the selected image more distinctive. By touching the selected image again, the movie stops playing, or the reproduction of the sound caption is terminated, or the character caption disappears. It is to be noted that the image selected in the edit mode may be indicated by the discrimination frame 108 in the same way as in the play mode, or it is possible to display the discrimination frame 108 around the image selected in the edit mode in addition to displaying that image in the gray color.

Figure 19A:
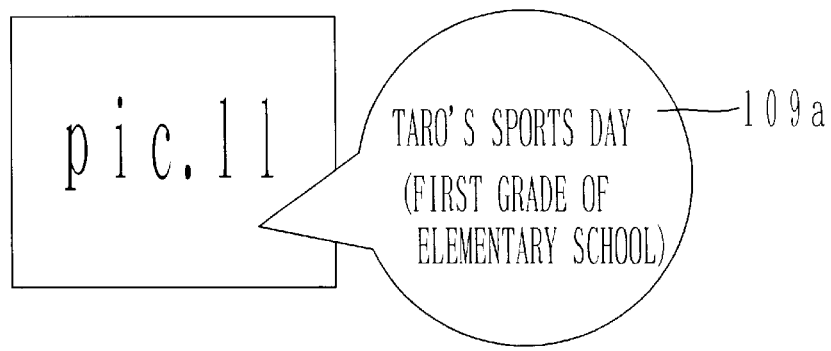
FIGS. 19A, 19B and 19C are explanatory diagrams illustrating three variations of how a character caption is displayed in association with an image in the play mode.
Figure 19B:
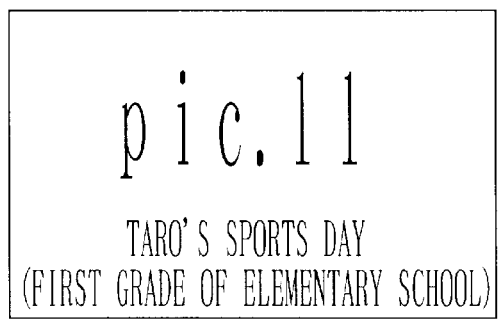
Figure 19C:
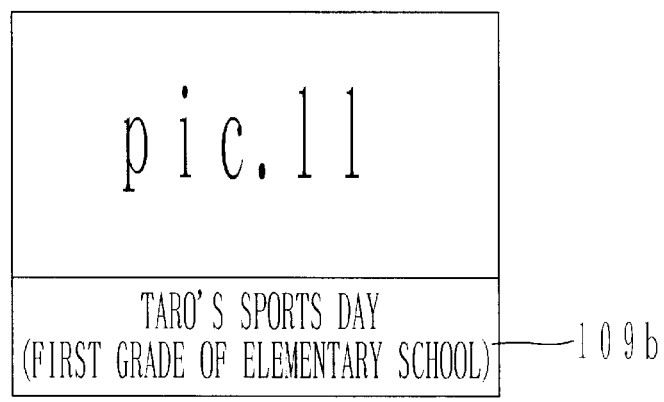

FIGS. 19A to 19C show three variations of displaying the character caption. In the variation shown in FIG. 19A, the character caption is displayed in a caption display frame 109a that pops up from the displayed image when the image is selected. The shape of the popup caption display frame 109a is not limited to the illustrated example. In FIG. 19B, the character caption is displayed inside the selected image. In FIG. 19C, the character caption is displayed in a caption display frame 109b that is located in a predetermined position adjacent each of the displayed still images.

Figure 20:
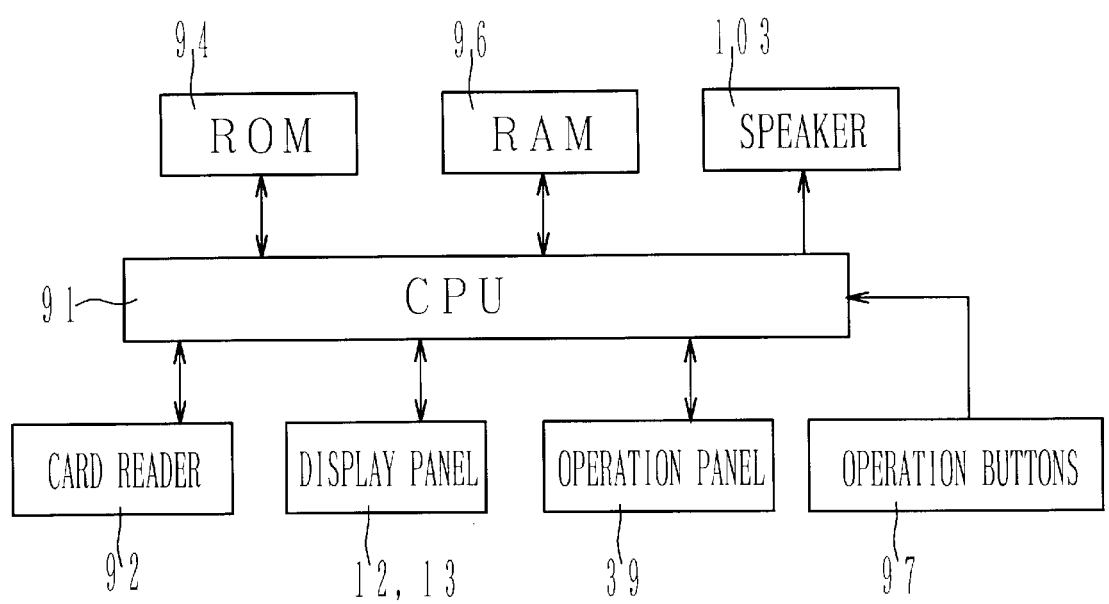
FIG. 20 is a block diagram illustrating an electric structure of the album type electronic image display device of the third embodiment.

FIG. 20 schematically shows an electric structure of the electronic album display device 102. The display panels 12 and 13, the speaker 103, a card reader 92, a ROM 94, a RAM 96, the operation panel 39, and other operation buttons 97, including the automatic play button 105 and the stop button 106, are connected to a CPU 91. As described above, the display panels 12 and 13 not only serve as display devices, but also serve as touch panels through which commands may be input in the CPU 91. The CPU 91 controls the overall operation of the electronic album display device 102 in accordance with commands entered through the operation panel 39, the display panels 12 and 13 and other operation button 97. The ROM 94 previously stores programs necessary for displaying images in a manner similar to an album. The RAM 96 temporarily stores the album manager files and the image files as they are read out from the memory card 101, and also functions as a work memory used for executing the programs. The CPU 91 revises the album data as stored in the RAM 96 in accordance with editions applied to the album. The CPU 91 also processes the image data when some images are inserted from another memory card into the album that is previously read out from the memory card 101.

Figure 21A:
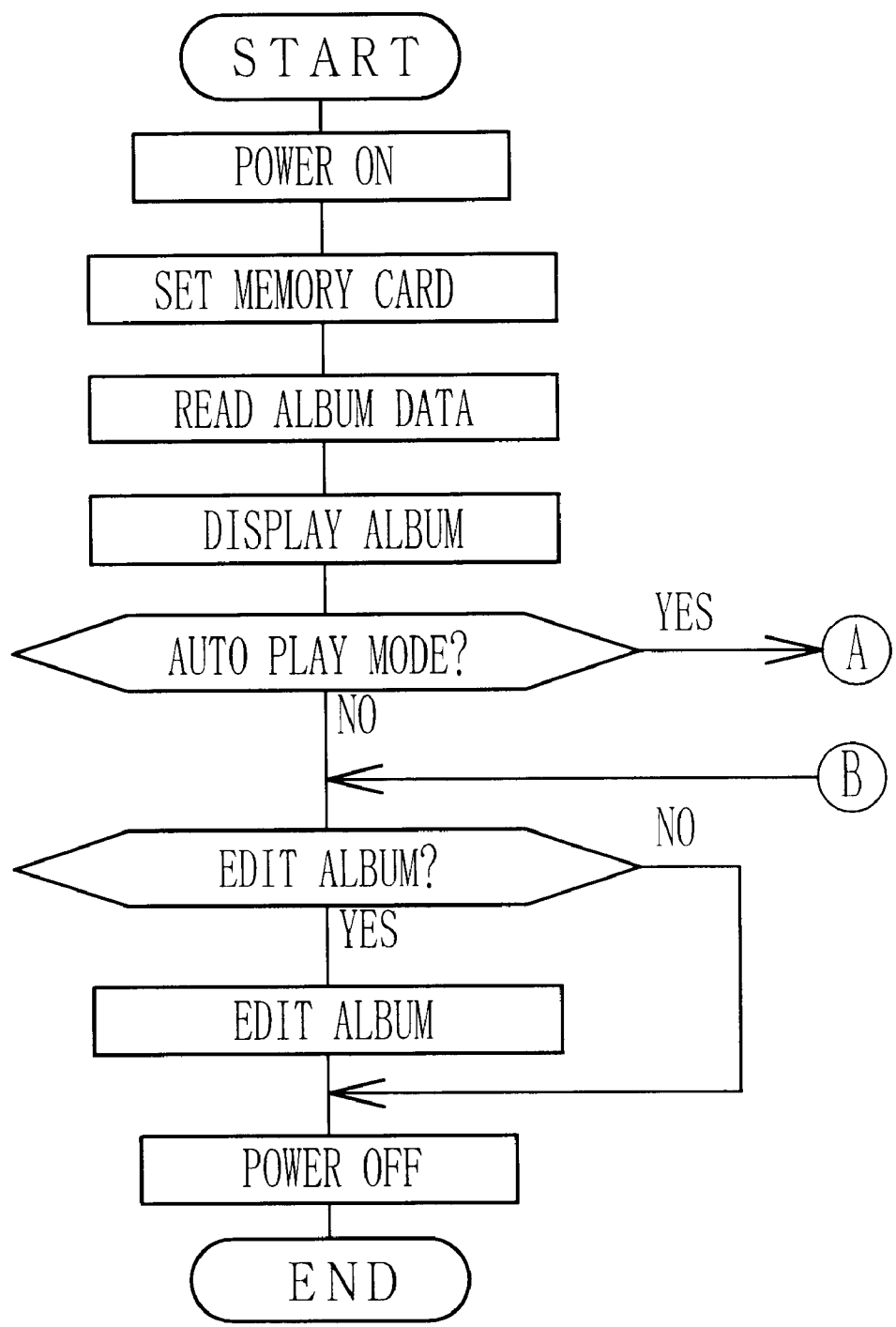
FIG. 21 is a flow chart illustrating the overall operation of the album type electronic image display device of the third embodiment.
Figure 21B:
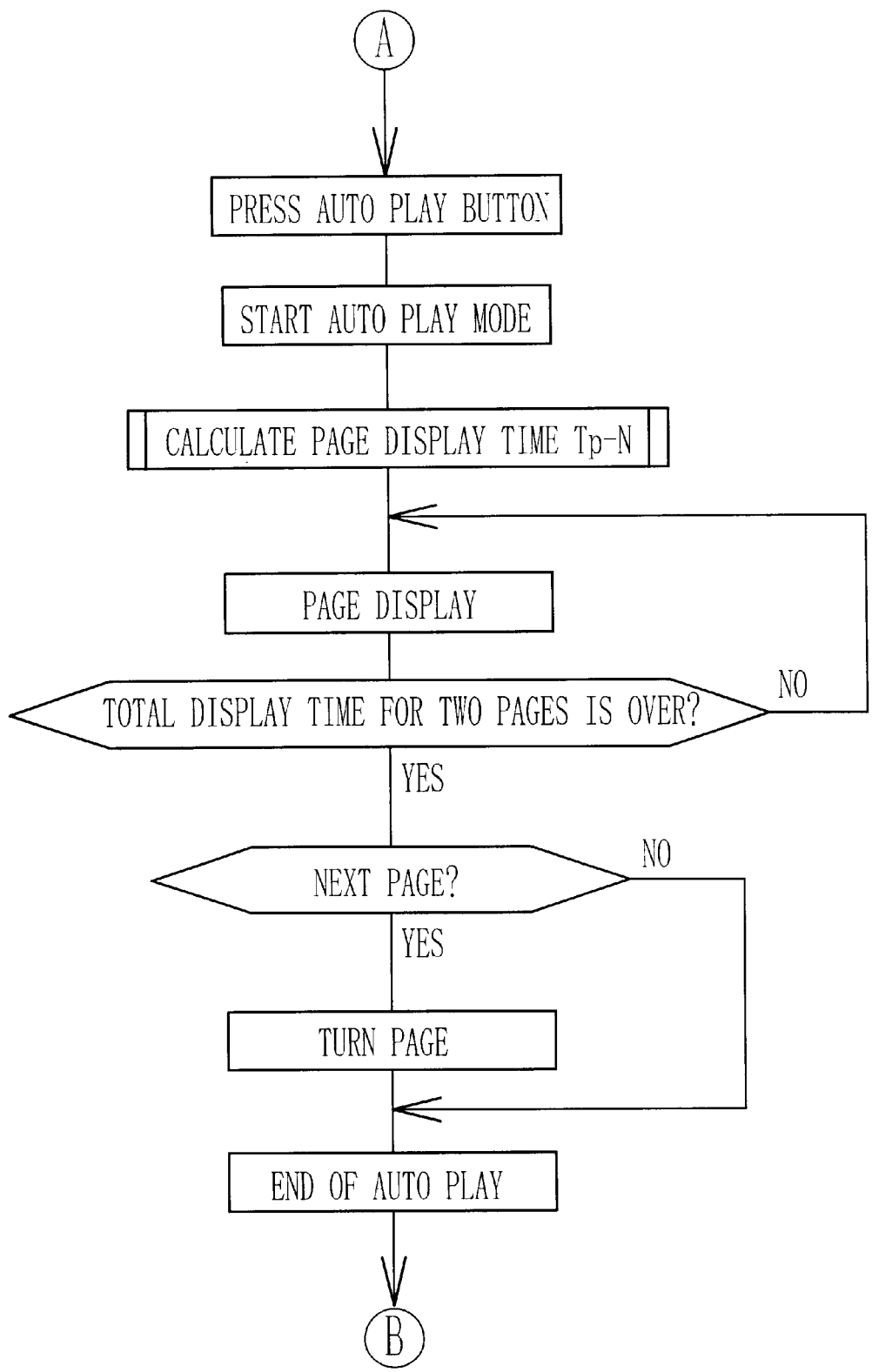
Figure 22:
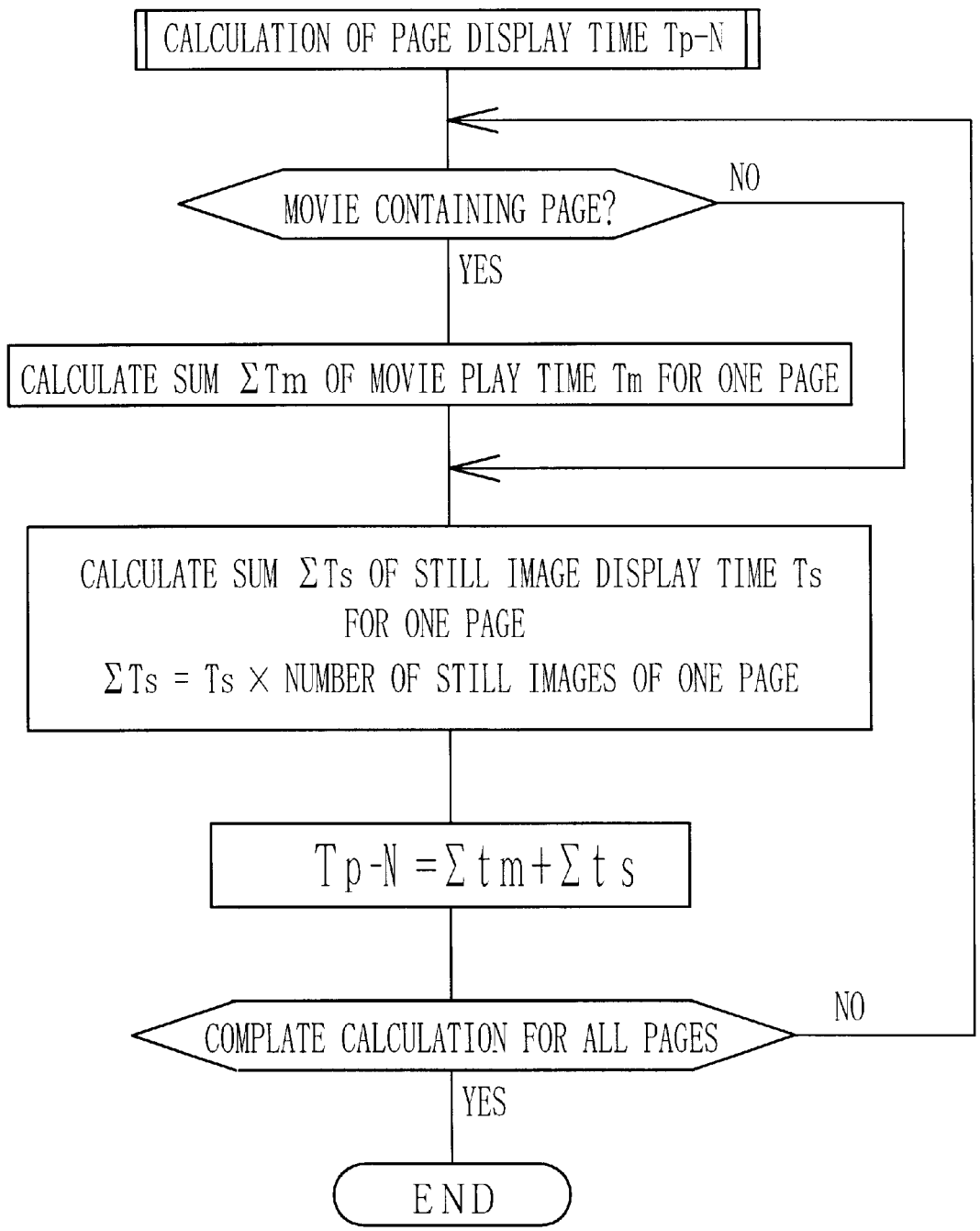
FIG. 22 is a flow chart illustrating a sub routine for calculating page display times in an automatic play mode.

Now the overall operation of the electronic album display device 102 having the above described structures will be described with reference to the flow charts of FIGS. 21 to 23.

The power switch 21 is turned on upon left- and right-hand bodies 10a and 10b being flapped open. By setting the memory card 101 in the card slot 32, the CPU 91 reads out the album data-D including the album manager file-D from the memory card 101 through the card reader 92, and writes the album data-D on the RAM 96.

Then, the images Pic.1 to Pic.N are displayed in the form of respective pages of an album on the display panels 12 and 13 in accordance with the album manager file-D. The electronic album display device 102 is initially set to the standard play mode, so the user may observe the images while operating the page turning buttons 41 to 44, and start the movie playing, or look or listen to the associated caption by touching the image individually on the display panel 12 or 13. The selected image is indicated by the discrimination frame 108.

By pressing the automatic play button 105, the electronic album display device 102 is switched to the automatic play mode. In the automatic play mode, as shown in FIG. 21B, the CPU 91 first calculates a page display time Tp-N for each individual page. For those pages which contain at least a movie, the CPU 91 calculates a sum $\Sigma Tm$ of individual play time lengths Tm of the movies contained in one page, as shown in FIG. 22. Next, a display time length Ts per one still image, that is a constant value, is multiplied by the number of still images contained in that page, to obtain a total display time $\Sigma Ts$ for the still images of that page. The page display time Tp-N of that page is calculated by adding the sum $\Sigma Tm$ to the total display time $\Sigma Ts$ (Tp-N=$\Sigma Tm$+$\Sigma Ts$). For those pages which do not contain a movie, the page display time Tp-N is equal to the total display time $\Sigma Ts$ for the still images of the individual page (Tp-N=$\Sigma Ts$).

Provided that the display time length Ts per one still image is 5 seconds, and the first page contains three still images and does not contain a movie, the page display time Tp-1 for the first page becomes 15 seconds (5 seconds×3). Because the electronic album display device 102 displays successive two pages at once on the display panels 12 and 13, these two pages are displayed for a time that is a sum of the respective page display times for these pages. For example, in a case where each of the third and fourth pages contains a movie and three still images, as shown in FIG. 16, and the play time length Tm for the movie Movie.1 on the third page is 20 seconds, whereas the play time length Tm for the movie Movie. 2 on the fourth page is 30 seconds, the third and fourth pages are displayed together for 15+20+ 15+30=80 seconds. When the total display time for the third and fourth pages has elapsed, the display panels 12 and 13 begin to display the fifth and sixth pages respectively.

In this way, all the pages of one album are displayed sequentially two by two for individually calculated display times. While one of the movies contained in the presently displayed pages is being played, the discrimination frame 108 is displayed around that movie, to attract attention to the played movie. Also in the automatic play mode, the total play time 107c for that movie and the lapse of play time 107b are displayed in association with the played movie, as shown in FIG. 18.

Calculation of the page display time Tp-N may be done for all pages of an album prior to starting displaying these pages. It is alternatively possible to calculate merely the total display time for the first and second pages before the start of displaying, and calculate the total display time for the third and fourth pages while the first and second pages are being displayed, and thereafter calculate the total display time for the following two pages while the former two pages are being displayed.

After the last page is displayed, the electronic album display device 102 is automatically reset to the standard play mode. To stop the automatic play mode before the last page is displayed, the user presses the stop button 46.

To edit the album-D, the edit mode selection button 37 is pressed to switch the electronic album display device 102 to the edit mode. Then, the displayed images may be edited in size, position and so forth by operating on the operation panel 39, and the CPU 91 revises the album manager file-D on the RAM 96 in accordance with the applied edition. To transfer the revised album data-D from the RAM 96 to an external memory, the user presses a storage button 81. If the revised album data is to be written on another memory card, the user removes the memory card 101 and sets the other memory card in the card slot 32, and then presses a enter button 52. By operating on the play mode selection button 36, the edition mode is terminated, and the electronic album display device 102 is switched to the standard play mode. By closing the bodies 10a and 10b to each other, the power switch 21 is turned off.

In the above embodiment, all pages are displayed sequentially from the first to the last page in the automatic play mode, but it is possible to provide a device for selecting pages to display in the automatic play mode and setting the sequence of displaying those pages. It is also possible to start displaying the pages from those pages which are displayed at the time when the automatic play mode is selected. It is preferable to indicate the total display time for the presently displayed two pages and the lapse of present display time on an appropriate position of the display panel 12 or 13. Instead of the present display time, the remaining display time for the presently displayed pages may be indicated in the automatic play mode.

Although the discrimination frame 108 is displayed only around the presently played movie in the automatic play mode, it is possible to display the discrimination frame 108 seriatim around the individual images on the displayed page, e.g. in the sequence from the low numbered image to the higher numbered image. In that case, the time of displaying the discrimination frame 108 per one still image is determined to be equal to the predetermined display time Ts for one still image, whereas the time of displaying the discrimination frame 108 for the movie is determined to be equal to the total play time Tm for that movie. As the discrimination frame 108 is shifted from one image to another in such a time sequential fashion, the lapse of display time of the displayed pages is visually recognizable.

As for those still images having background music or voices recorded therewith, the recorded sound may be reproduced through the speaker 103 in the automatic play mode each time the discrimination frame 108 comes to one of those still images in the automatic play mode. In the same way, concerning those images having a character caption entered thereto, the character caption may be displayed turn by turn in the automatic play mode.

Figure 23:
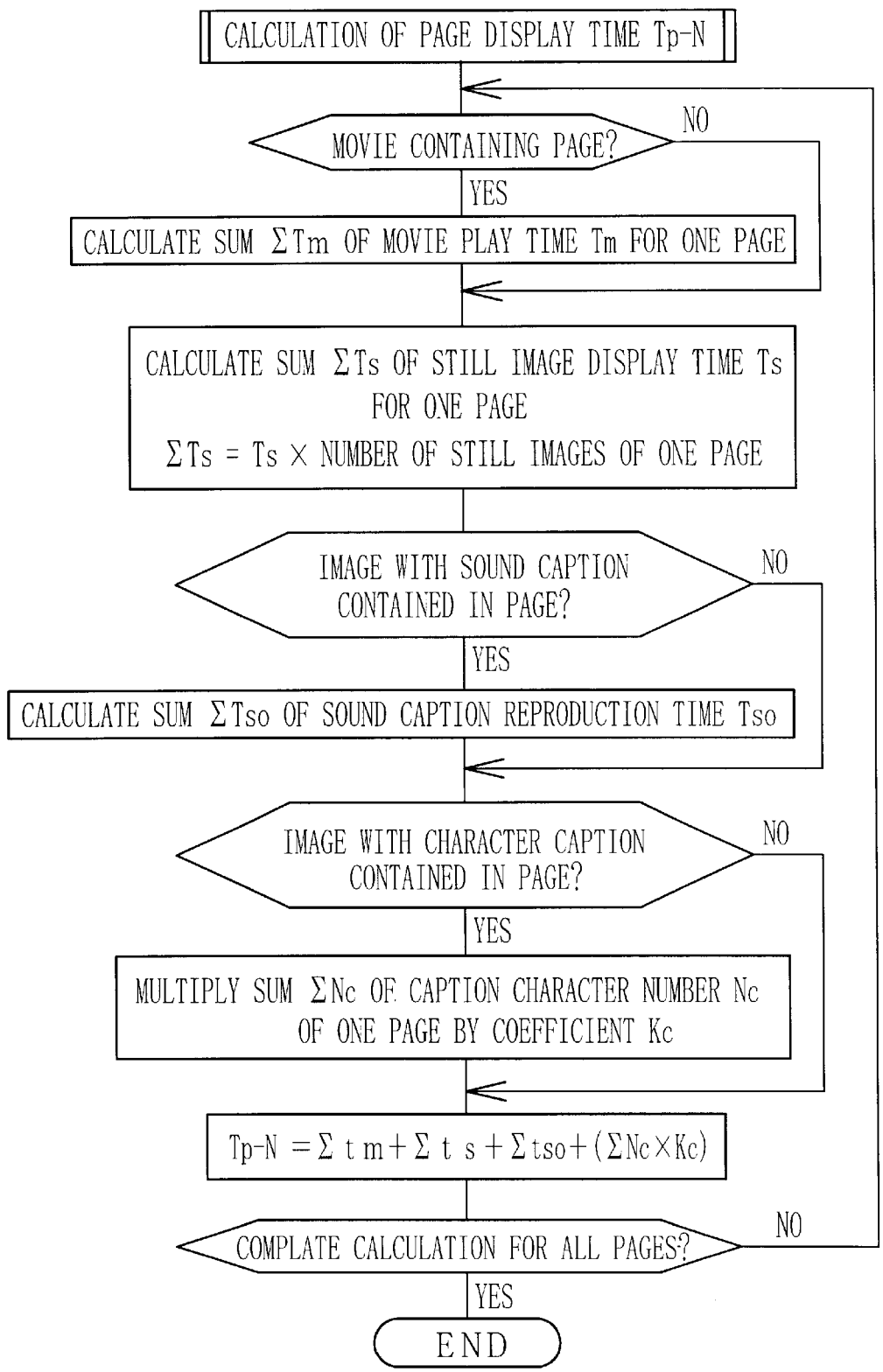
FIG. 23 is a flow chart illustrating a sub routine for calculating page display times in an automatic play mode, according to a modification of the third embodiment.

In that case, the time for reproducing the sound or the time for displaying the caption should be taken into account when calculating the page display time Tp-N, in addition to the still image display time Ts and the movie play time Tm, as shown in the flow chart of FIG. 23. In this embodiment, a total sound reproduction time $\Sigma$Tso for one page is calculated as a sum of respective reproduction times Tso for the voice captions and the background musiks to be reproduced on that page. As for the character captions, a sum $\Sigma$Nc of the number Nc of characters of the character captions to be displayed on that page is calculated, and the sum $\Sigma$Nc is multiplied by a coefficient Kc that is determined by a mean speed of man's reading one character. The page display time Tp-N is calculated by adding up these values $\Sigma$Tm, $\Sigma$Ts, $\Sigma$Tso and $\Sigma$Nc.

In the above embodiment, the pages are displayed in pairs on the display panels 12 and 13, and the next pair of pages are displayed after the total display time for the preceding pair has elapsed. However, it is possible to change the pages one by one after the lapse of respective page display time. Taking the display condition shown in FIG. 16 for instance, the presently displayed third and fourth pages are replaced by the fourth and fifth pages respectively after the page display time Tp-3 for the third page. Thereafter when the page display time Tp-4 for the fourth page has elapsed, the fifth page is displayed on the display panel 12 in place of the fourth page, and the sixth page is displayed on the display panel 13. In this embodiment, each page will be displayed totally for the page display time Tp-N for that page plus the page display time Tp-(N-1) for the preceding page. The page display time for the individual page may be determined in the same way as above.

It is also possible to predetermine the page display time in the automatic play mode to be a constant length for every page regardless of the amount of information contained in each page. In that case, it is preferable to provide a speed selection device for selecting the page display time or the speed of changing the pages from among several options. Furthermore, it is possible to provide an operation device for elongating or shortening the respectively calculated page display times by multiplying a factor.

Figure 24A:
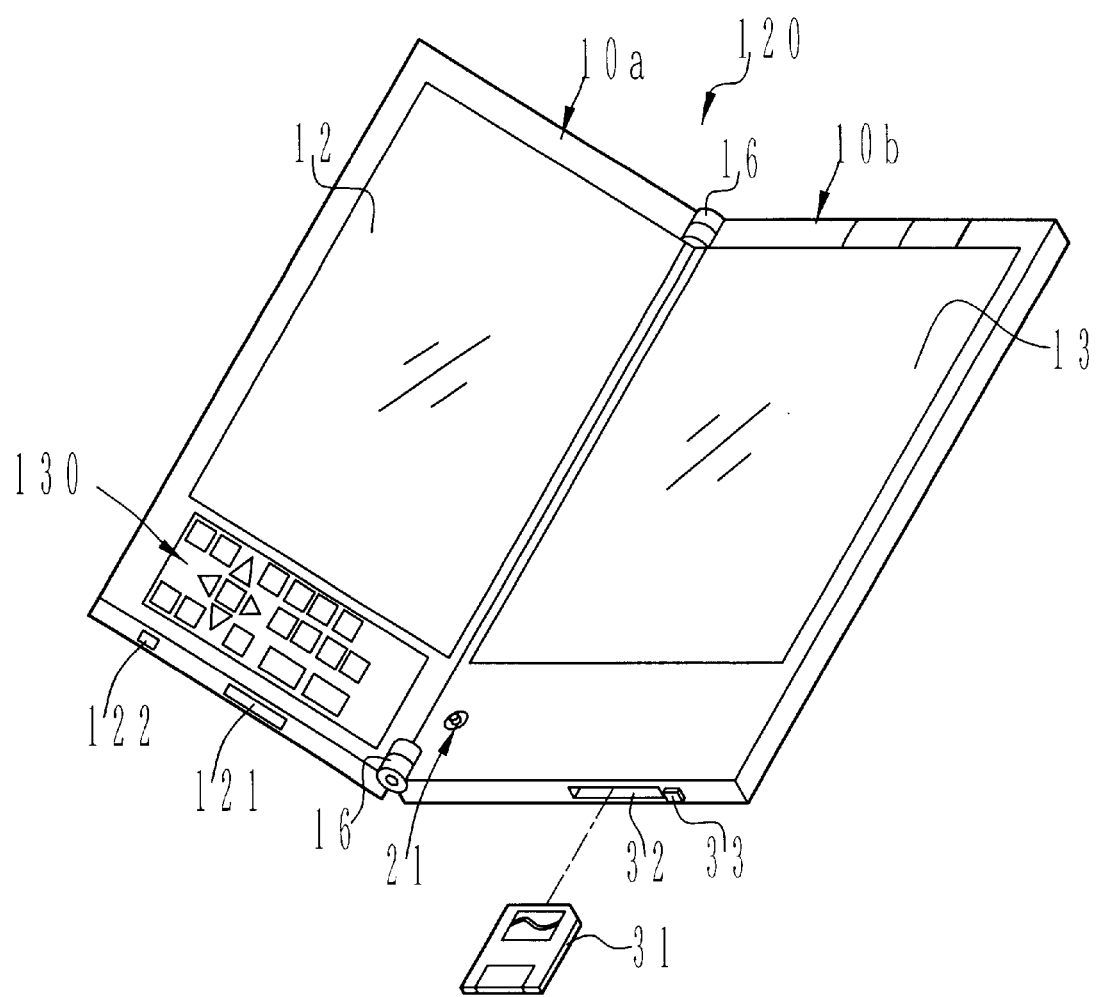
FIG. 24A is a perspective view illustrating an album type electronic image display device according to a fourth embodiment of the present invention.
Figure 24B:
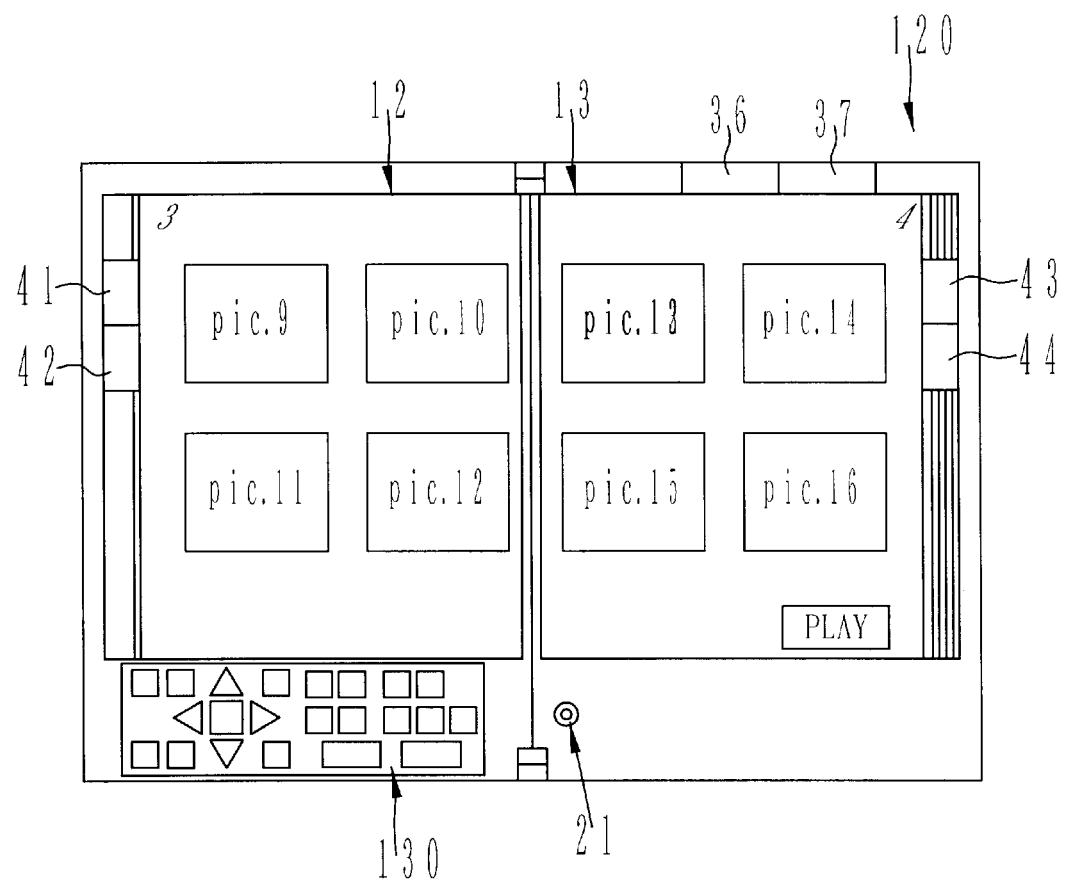
FIG. 24B is an explanatory diagram illustrating an example of a pair of pages displayed in a play mode on display panels of the album type electronic image display device of the fourth embodiment.

FIGS. 24A and 24B show an electronic album display device 120 according to a further embodiment of the present invention. Fundamental structures of the electronic album display device 120 of this embodiment are equivalent to those of the above embodiments, so the same elements are designated by the same reference numerals, and the following description relates only to those features essential for the present embodiment.

A power switch 21 is turned on when left- and right-hand bodies 10a and 10b of the electronic album display device 120 are flapped open. By setting a memory card 31 in a card slot 32, album data is read out from the memory card 31, and respective images contained in the album data are displayed page by page on display panels 12 and 13 in accordance with control data stored in an album manager file of the album data, as shown for example in FIG. 24B.

Figure 25A:
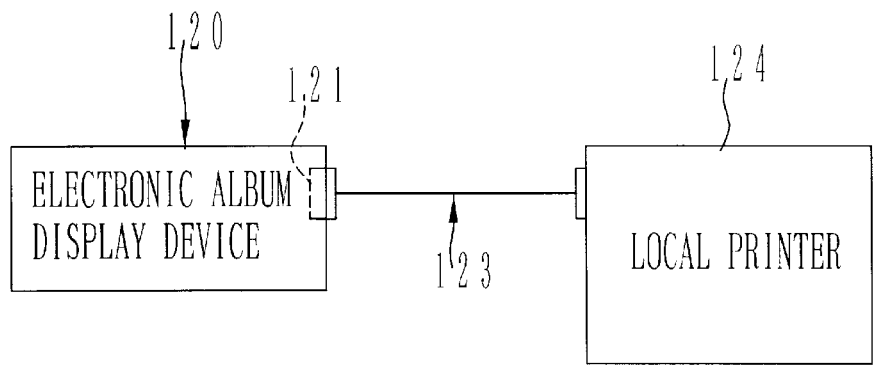
FIG. 25A is an explanatory diagram illustrating the album type electronic image display device of the fourth embodiment, as connected to a local printer.
Figure 25B:
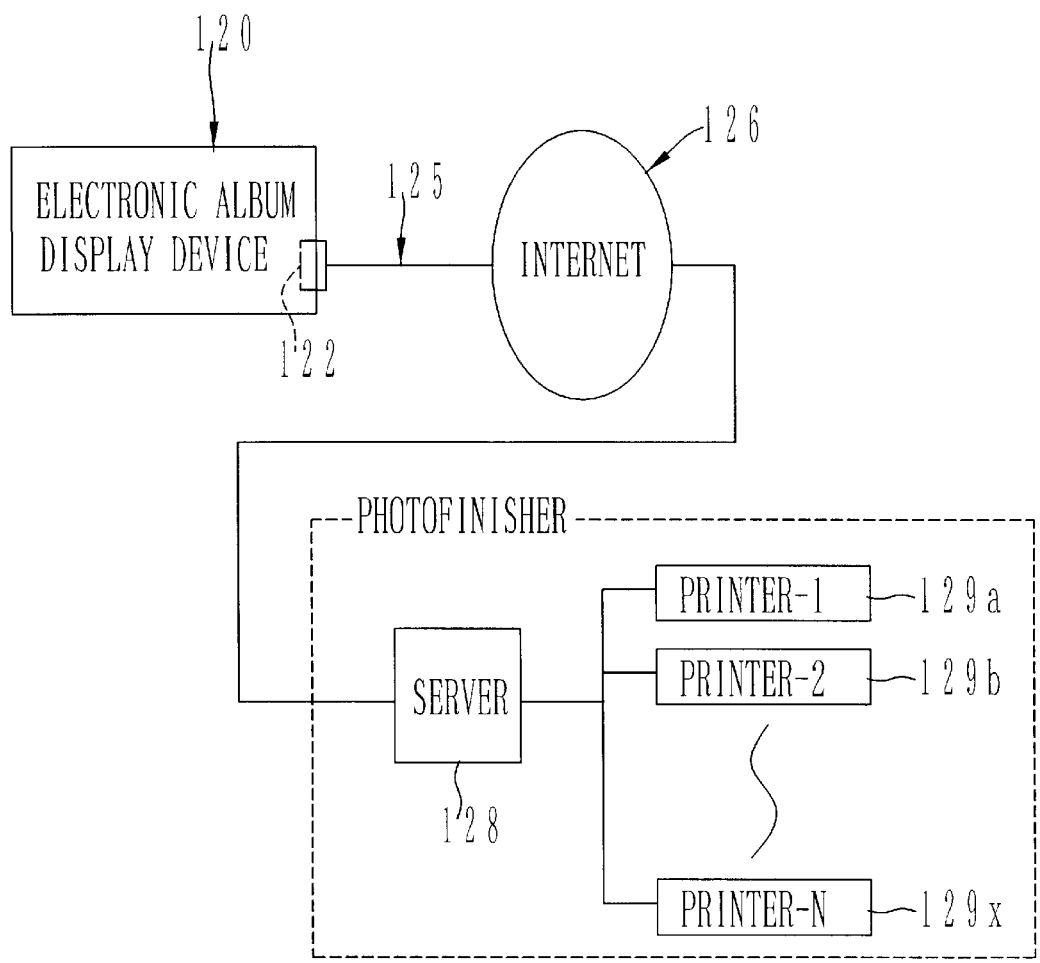
FIG. 25B is an explanatory diagram illustrating the album type electronic image display device of the fourth embodiment, as connected to a server of a photofinisher though a communication line.

The electronic album display device 120 is provided with first and second connectors 121 and 122 as output terminals for outputting print data. The first and second connectors 121 and 122 are disposed on one end face of a left body 10a in the illustrated embodiment. As shown in FIG. 25A, the first connector 121 is for connecting the electronic album display device 120 to a local printer 124 through a printer cable 123. Data of images to print may be sent to the local printer 124 through the printer cable 123, together with print data for these images. The print data designates printing conditions for the associated images. The electronic album display device 120 has a device for setting up the printing conditions, as set forth in detail later. As shown in FIG. 25B, the second connector 122 is for connecting the electronic album display device 120 to an Internet 126 through a communication line 125, like a telephone line. Though the Internet, the electronic album display device 120 may communicate with a remote photofinisher, and send a server 128 of the photofinisher image data of images to print and the print data for these images. The server 128 distributes the received data to one of a plurality of printers 129a, 129b . . . 129x. Then, the photofinisher prints designated images or designated pages of an electronic album on the basis of the image data and the print data.

Figure 26:
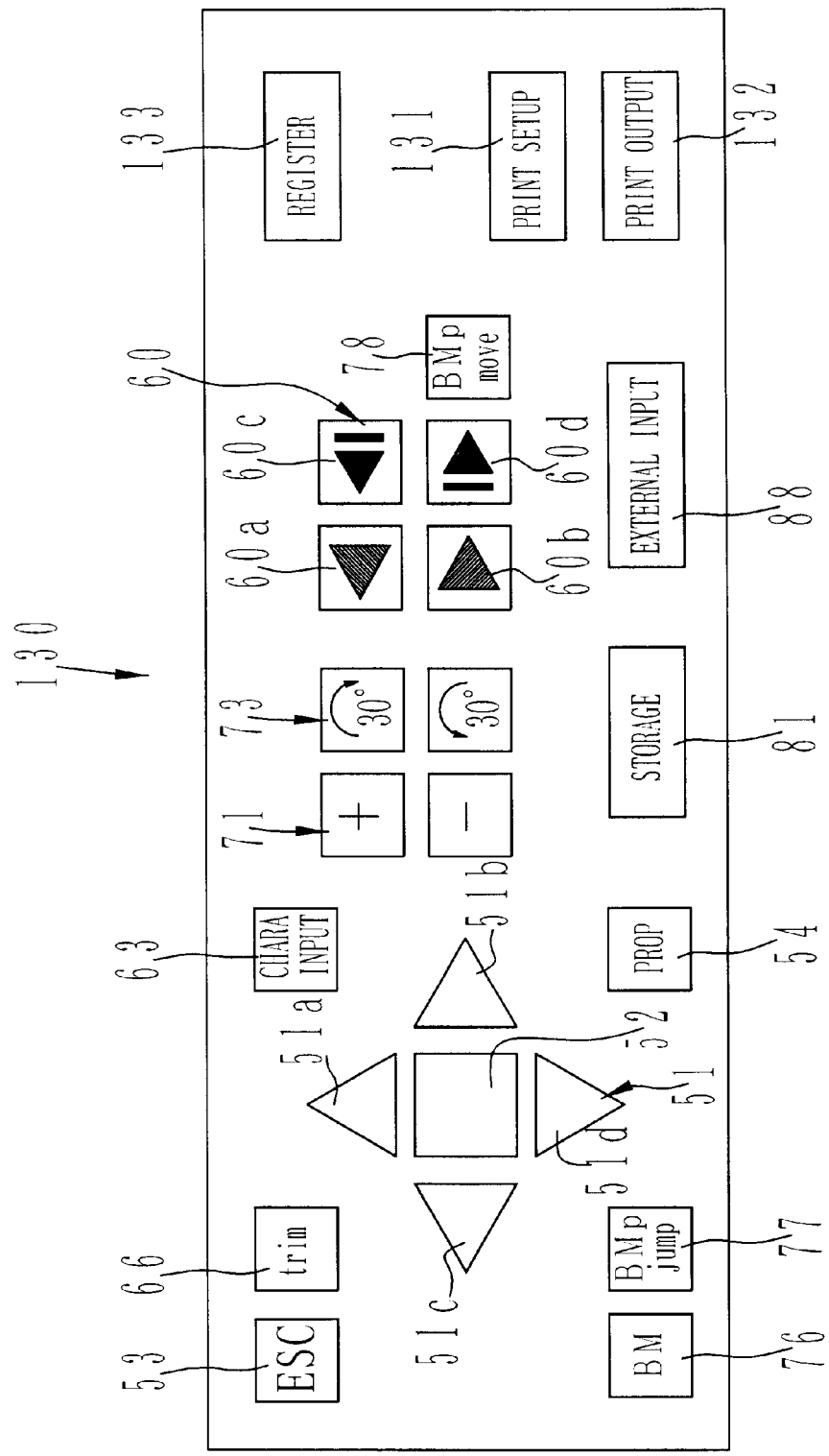
FIG. 26 is an explanatory diagram illustrating an operation panel of the album type electronic image display device of the fourth embodiment.
Figure 27:
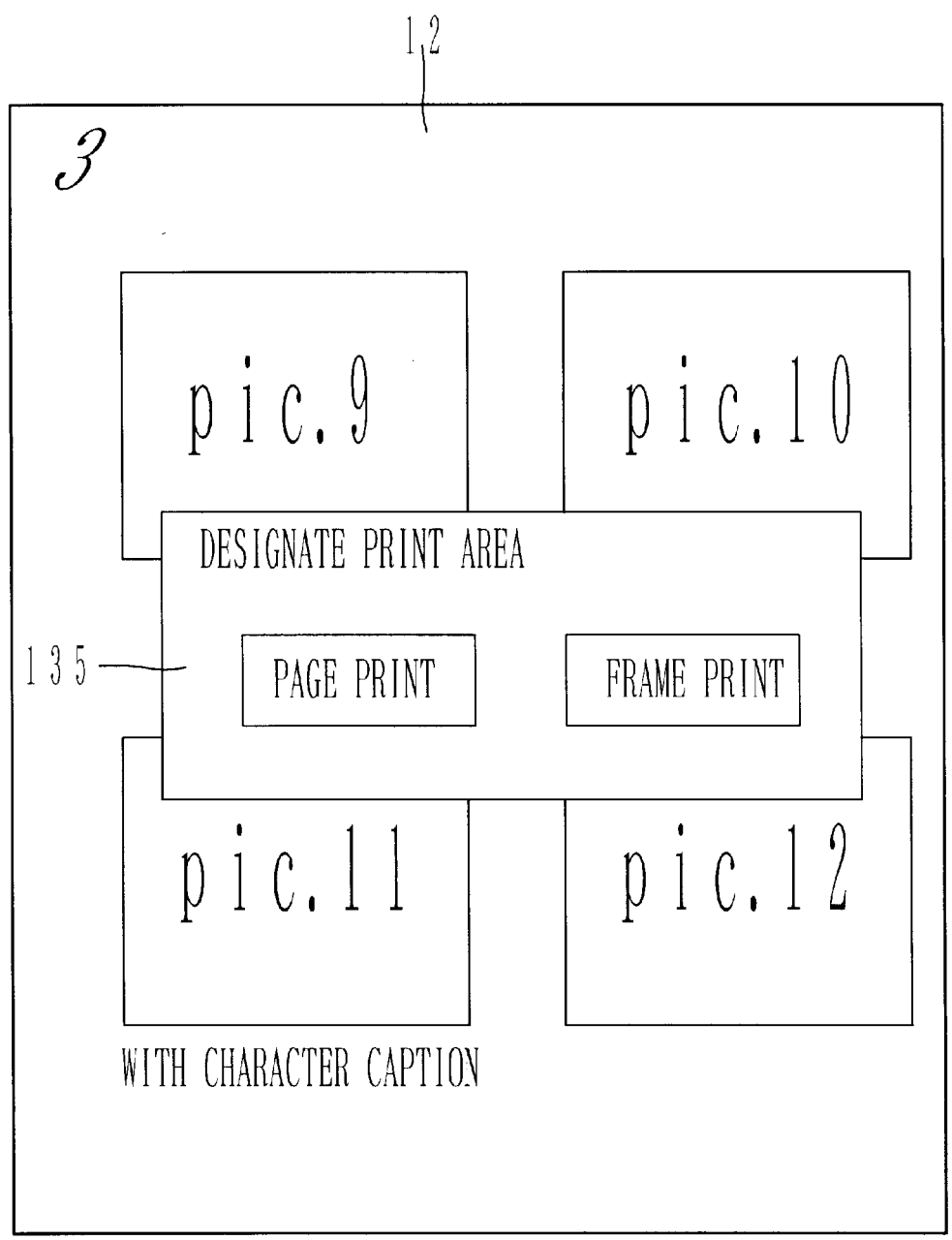
FIG. 27 is an explanatory diagram illustrating a display condition where a print area designation box pops up on the display panel in response to a print setup button of the operation panel.

Referring to FIG. 26 showing an operation panel 130 of the electronic album display device 120, there are provided a print data setup button 131, a print data output button 132 and a photofinisher register button 133 in addition to many other buttons which are operated for selecting an image, placing a bookmark, editing images, entering caption, inputting album data, storing album data and so on, in the same way as described with respect to the first embodiment.

When the print data setup button 131 is pressed, the electronic album display device 120 is switched to a print data setup mode, and a print area designation box 135 pops up on the selected page. The print area designation box 135 is for choosing between page-printing and frame-printing. That is, the user chooses the page-printing for designating printing a selected page. When the user wants to print an image frame on the selected page, the frame-printing should be chosen. In the present embodiment, each page is determined to be printed in a constant size, e.g. A4 size or B5 size, and each image frame is determined to be printed in a conventional photo-print size, e.g. 89 mm×127 mm.

Figure 28:
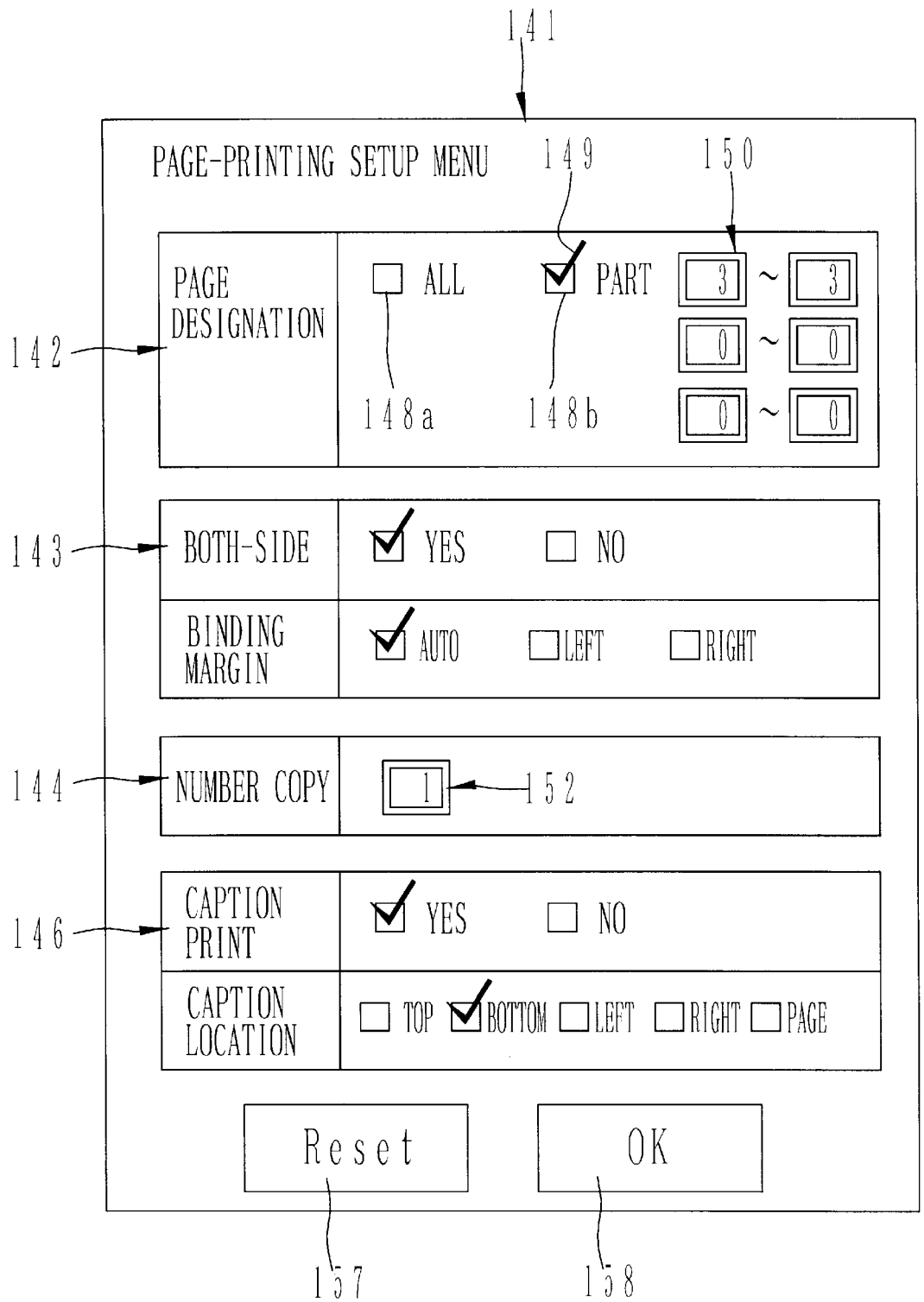
FIG. 28 is an explanatory diagram illustrating a page-printing setup menu box.

When the page-printing is designated in the print area designation box 135, a page-printing setup menu box 141 appears, as shown in FIG. 28. The page-printing setup menu box 141 includes a page designation segment 142, a both-side printing designation segment 143, a print copy number designation segment 144 and a caption print designation segment 146. The page designation segment 142 is for designating a page or pages to print. The user first decides whether to print all pages of an album or some pages of the album, and touches on a corresponding check box 148a or 148b. Then a check mark 149 is displayed on that check box 148a or 148b. When some pages of the album are to be printed, as shown in the example of FIG. 28, the page serial numbers of the pages to print are entered in number input boxes 150.

To enter the page serial numbers, the user touches on one of the number input boxes 150, and thereafter operates shift buttons 51a to 51d of the operation panel 130. For example, the number increases upon the shift button 51a being pressed, and decreases upon the shift button 51d being pressed. Since three pairs of number input boxes 150 are provided, the user may designate a plurality of pages at a time even if these pages are not successive. For example, the user can designate the fourth to sixth pages and the tenth to twelfth pages at the same time. In the example shown in FIG. 28, the third page is designated as a page to print.

Figure 29A:
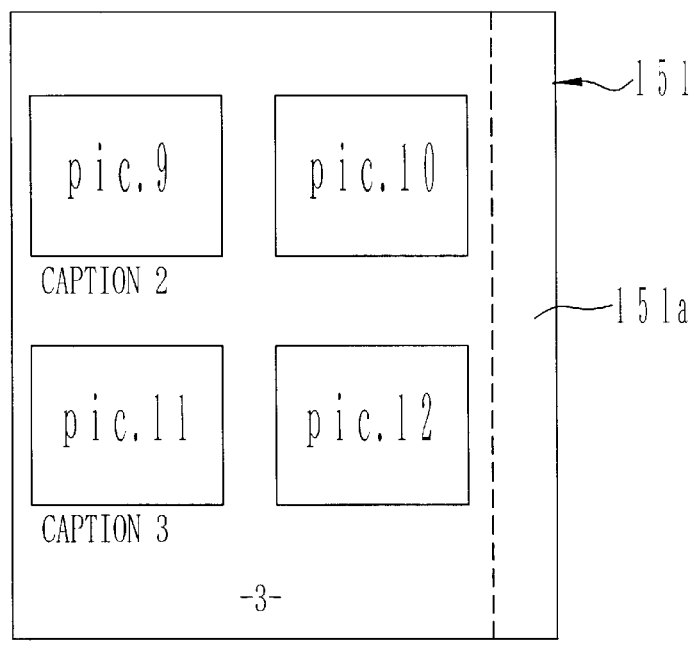
FIGS. 29A and 29B are explanatory diagrams illustrating examples of printing conditions of two successive pages which are printed on opposite sides of a recording sheet, wherein the even page has a gutter margin on the left of the recording sheet and the odd page has a gutter margin on the right of the recording sheet.
Figure 29B:
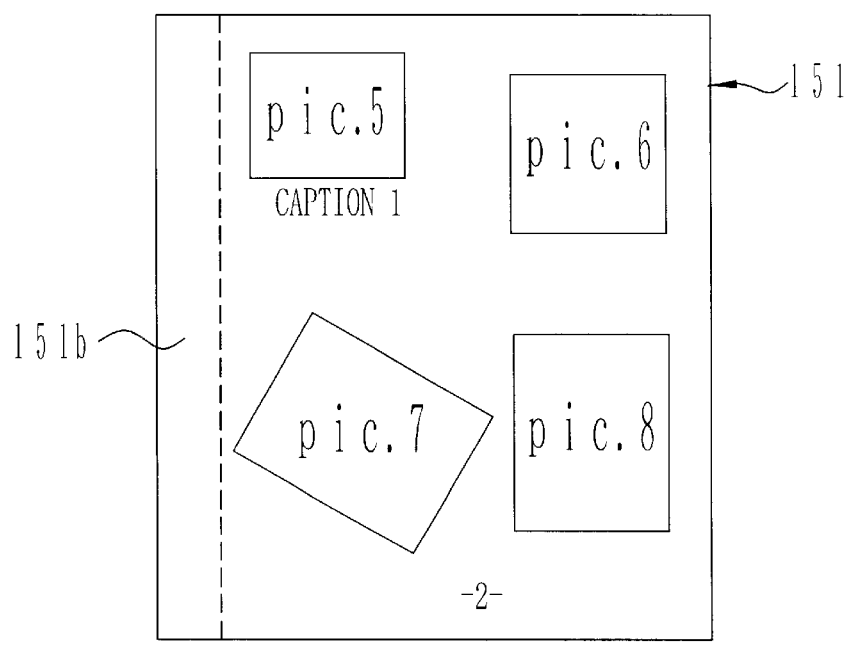

To each of the pages to print, margin position data is automatically allocated such that a binding margin 151a or 151b is located on a suitable side of a recording sheet 151, as shown in FIGS. 29A and 29B, when the designated page is printed on the recording sheet 151. That is, for those pages which are displayed on the display panel 12 of the left-hand body 10a of the electronic album display device 120, the binding margin is located on the right of the recording sheet 151, as shown by 151a in FIG. 29A, whereas for those displayed on the display panel 13 of the right-hand body 10b, the binding margin is located on the left of the recording sheet 151, as shown by 151b in FIG. 29B.

When the both-side printing is designated in the both-side printing designation segment 143 of the page-printing setup menu box 141, as shown in FIG. 28, a counterpart page to be printed on the opposite side of a recording sheet from a designated page is automatically selected. Specifically, if a page displayed on the left-hand display panel 12 is designated for the both-side printing, the preceding page is automatically selected as the counterpart page. On the other hand, if the designated page is displayed on the right-hand display panel 13, the next page is automatically printed on the opposite side of the recording sheet from the designated page. For example, if the both-side printing is designated while merely the third page is designated in the page designation segment 142, as shown in FIG. 28, the second and third pages are printed on the opposite sides of the recording sheet 151 in the way as shown in FIGS. 29A and 29B. Also in the both-side printing, the binding margins 151a and 151b are provided automatically on the suitable position. Thus, a hard copy of the electronic album is produced just by filing the printed sheets, wherein the pages are arranged in spread the same way as displayed on the electronic album display device 120. Although page serial numbers are printed on bottom margins of the recording sheet 151 in the illustrated examples, it is possible not to print the page serial numbers.

Figure 30A:
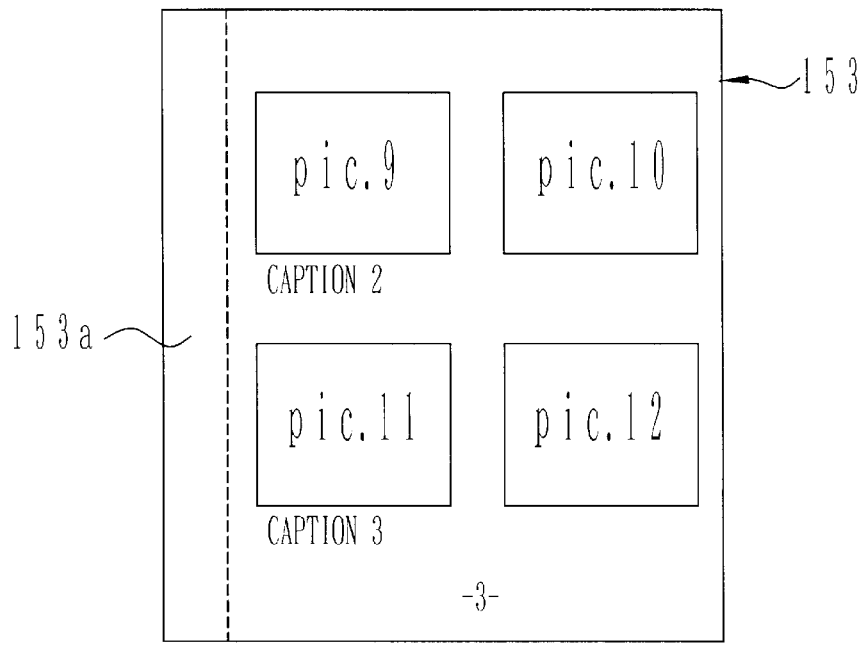
FIG. 30 is an explanatory diagram illustrating an example of an odd page whose gutter margin is located on the left of a recording sheet.
Figure 30B:
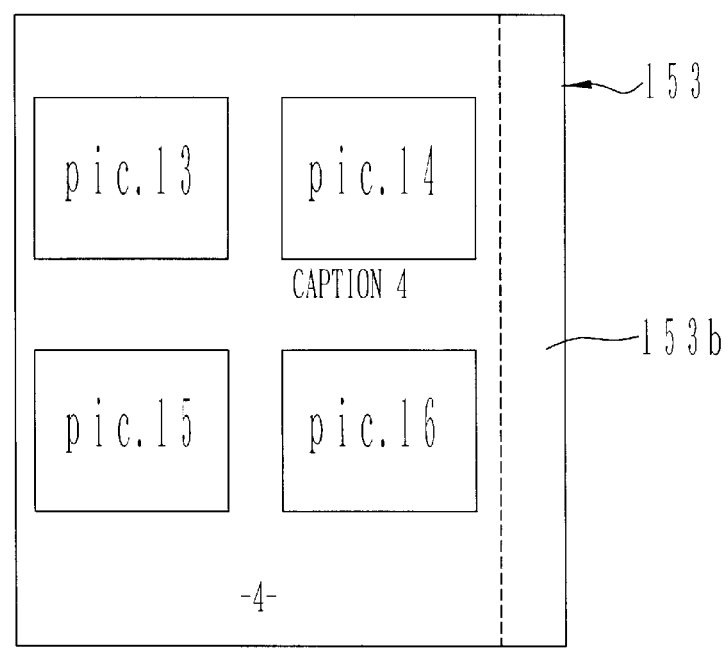

It is also possible to manually designate the location of the binding margin on the respective page independently of whether the page is displayed on the left hand or the right hand of the electronic album display device 120. As shown for example in FIG. 30A, a binding margin 153a is located on the left of a recording sheet 153 though the printed page, i.e. the third page in this instance, is originally displayed on the left-hand display panel 12, as shown in FIG. 24B. If the both-side printing is designated in this condition, the fourth page is printed on the opposite side of the recording sheet 153 with a binding margin 153b on the right, as shown in FIG. 30B.

In a case where the successive two pages displayed on the display panels 12 and 13 may be shifted page by page, it is possible to shift the third page from the left-hand display panel 12 to the right-hand display panel 13 before designating the third page for the both-side printing. Thereby, the image display device 120 displays the pages of the album in the same page arrangement as it would be obtained on the printed sheets, without the need for designating the binding margin location. It may also be possible to designate locating the binding margin on the top margin of the recording sheet.

Figure 31:
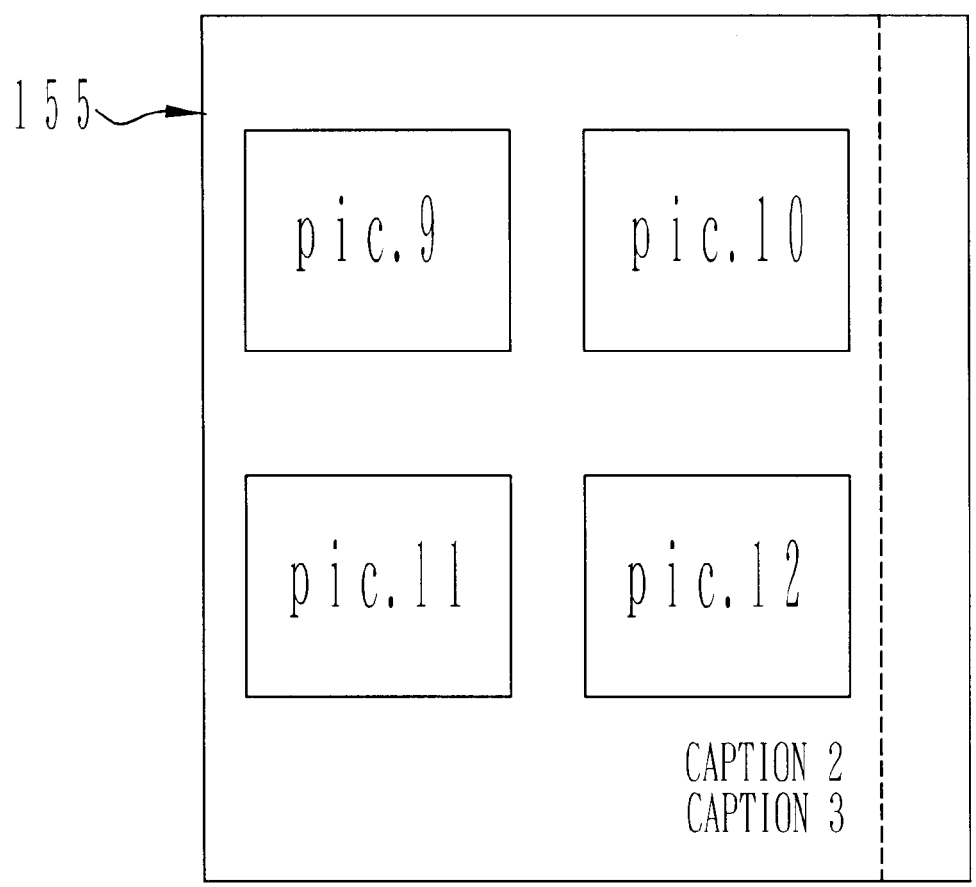
FIG. 31 is an explanatory diagram illustrating an example of a printed page having character captions located in a predetermined section of the recording sheet.

In the print copy number designating segment 144, the user may designate the requisite number of copies to make from the designated pages by entering a numerical value in a number input box 152. The caption print designation segment 146 is for choosing whether to print captions along with the images, and for selecting a printing position of each caption from among five options: top, bottom, left or right of the assigned image, or "page" representative of a predetermined section within a page. For example, if the option "bottom" is selected, the caption is printed on the bottom of the assigned image, as shown in FIGS. 29 and 30. If the option "page" is selected, all the captions assigned to the images on one page are printed in the predetermined section of that page, e.g. a lower right corner on a printed sheet 155, as shown in FIG. 31.

A reset button 157 is for canceling the printing conditions set up on the page-printing setup menu box 141, to reset the printing conditions to default values. An OK button 158 is for entering the printing conditions as print data. Thus, the print data includes page serial numbers, the requisite number of copies to make, margin locations, caption locations and other data necessary for printing the images on recording sheets in the form of respective pages of an album.

Figure 32:
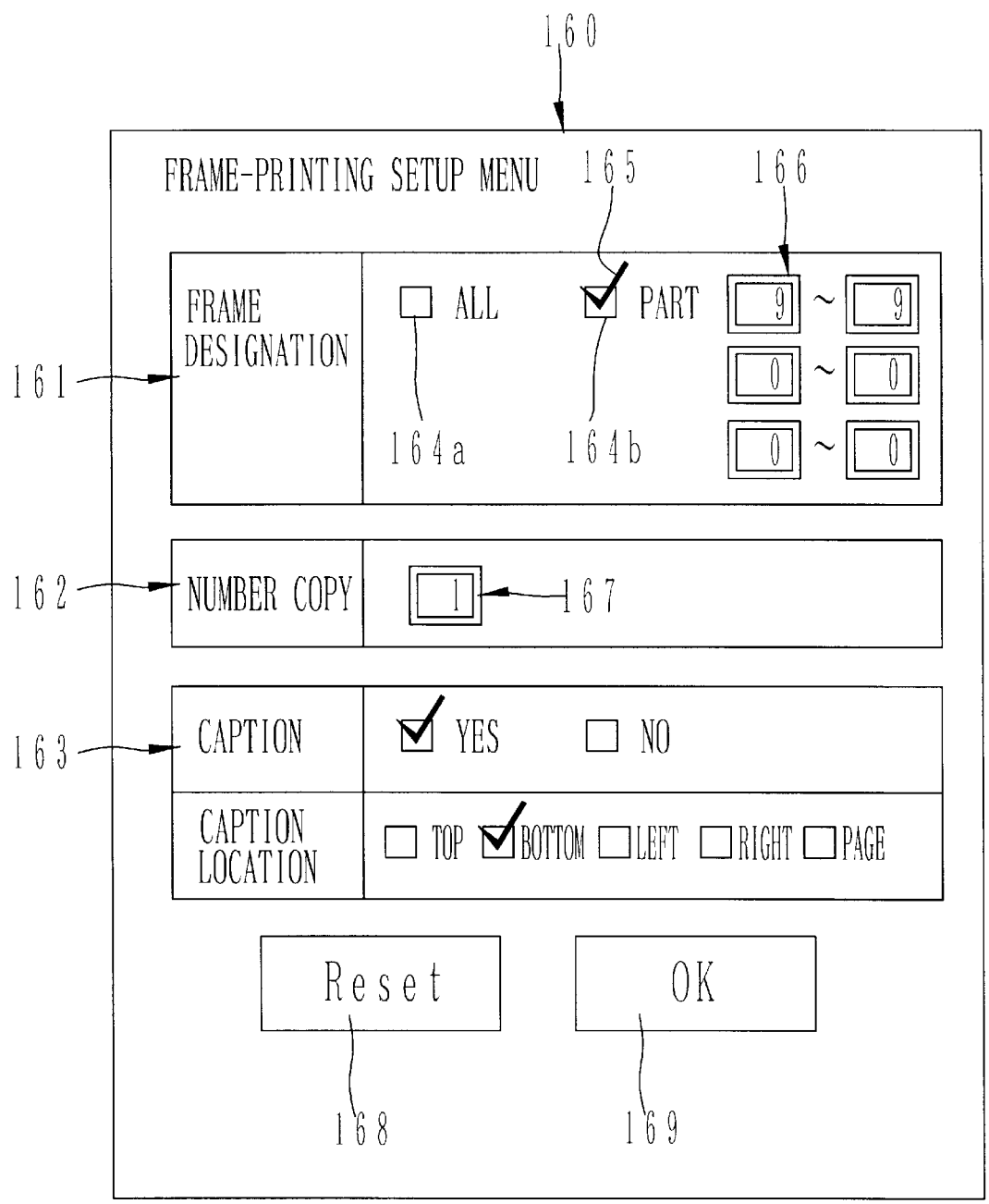
FIG. 32 is an explanatory diagram illustrating a frame-printing setup menu box.

When the frame-printing is designated in the print area designation box 135, a frame-printing setup menu box 160 appears, as shown in FIG. 32. The frame-printing setup menu box 160 includes a frame designation segment 161, a print copy number designation segment 162 and a caption print designation segment 163. The frame designation segment 161 is for designating an image frame or frames to print. The user first decides whether to print all image frames of an album or some image frames of the album, and touches on a corresponding check box 164*a* or 164*b*. Then a check mark 165 is displayed on that check box 164*a* or 164*b*. When some image frames of the album are to be printed, as shown in the example of FIG. 32, the frame serial numbers of the images to print are entered in number input boxes 166.

To enter the frame serial numbers, the user touches on one of the number input boxes 166, and thereafter operates the shift buttons 51*a* to 51*d* of the operation panel 130. In the example shown in FIG. 32, the ninth image is designated as an image frame to print.

Figure 33A:
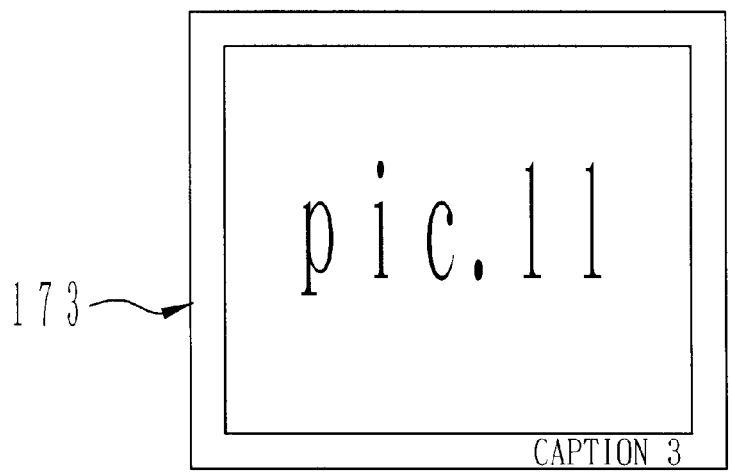
FIGS. 33A and 33B are explanatory diagrams illustrating examples of printed image frames, each having a character caption on a different margin.
Figure 33B:
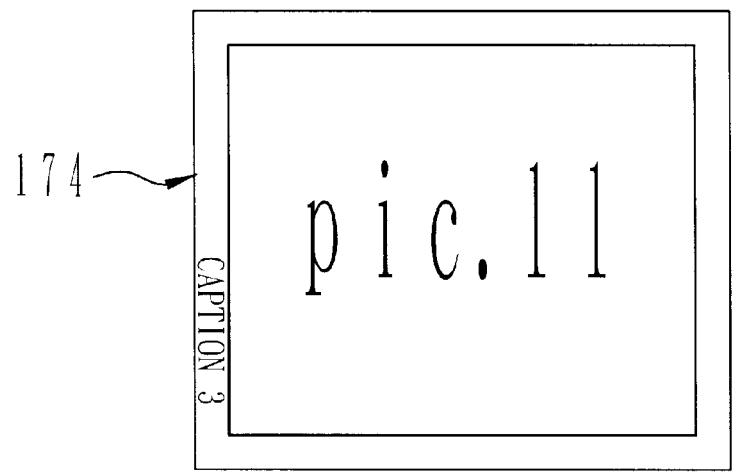

In the print copy number designation segment 162, the user may designate the requisite number of copies to make from the designated images by entering a numerical value in a number input box 167. The caption print designation segment 163 is for choosing whether to print captions along with the images, and for selecting a printing position of each caption from among four options: top, bottom, left or right the assigned image. For example, if the option "bottom" is selected, the caption is printed in a bottom margin of the image on a recording sheet 173, as shown in FIG. 33A. If the option "left" is selected, the caption is printed in the left margin of the image on a recording sheet 174, as shown in FIG. 33B.

A reset button 168 is for canceling the printing conditions set up on the frame-printing setup menu box 160, to reset the printing conditions to default values. An OK button 169 is for entering the printing conditions as print data. In this case, the print data includes frame serial numbers, the requisite number of copies to make, caption locations, and other data necessary for printing the images on recording sheets in the form of individual photo-prints.

Figure 34:
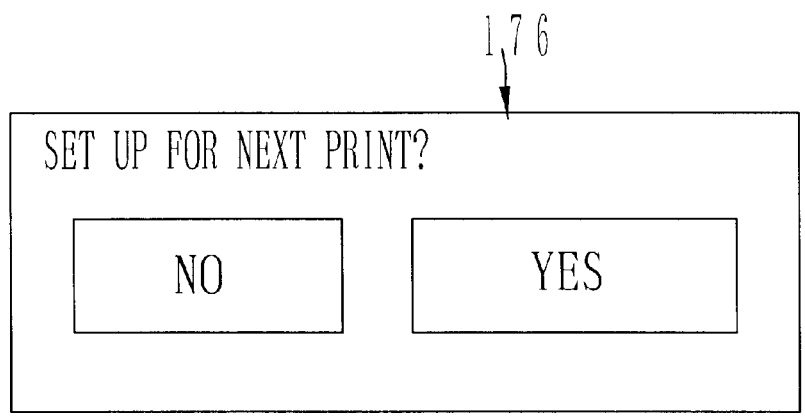
FIG. 34 is an explanatory diagram illustrating a question box for selecting whether to set up the next print data or not.
Figure 35:
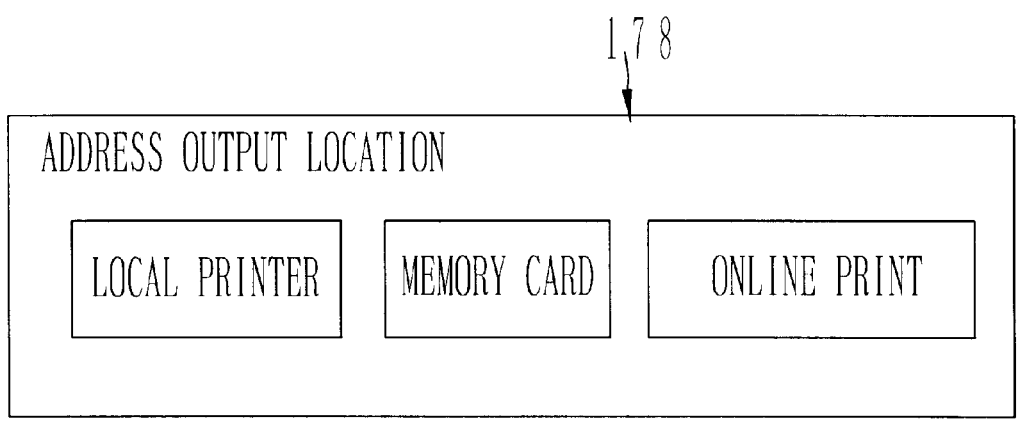
FIG. 35 is an explanatory diagram illustrating an output location addressing box for addressing a data output location.

When the OK button 158 of the page-printing setup menu box 141 or the OK button 169 of the frame-printing setup menu box 160 is pressed, a question box 176 appears as shown in FIG. 34, for questioning whether the user wishes to continue setting up printing conditions for other pages or image frames. If the user selects "Yes" in the question box 176, the print area designation box 135 pops up again. Then the user may set up the printing conditions in the same way as above. If the user selects "No", the printing condition setup sequence is concluded. In this way, the user can easily set up the printing conditions in accordance with the guidance sequentially appearing on the screen.

After setting up the printing conditions, the user presses the print output button 132 of the operation panel 130. Then an output location addressing box 178 pops up on the screen, for the user to select a print data output location from among three options: "Local printer", "Memory card", and "Online print".

When the user selects "Local printer", the electronic album display device 120 outputs the image data of those images to print and the print data therefor to the local printer 124, so the local printer 124 prints the images in accordance with the print data. When "Memory card" is selected, the print data set up by the user is written as a print data file on the memory card 31. Assuming that the memory card 31 stores the album data including the image files of the images to print, the user may forward the memory card 31 to a photofinisher, requesting printing the images in accordance with the print data.

When the user selects "Online print", the electronic album display device 120 produces a print data file from the set up print data, and connects through the Internet 126 to the server 128 of a previously registered photofinisher. Then, the print data file is sent to the server 128 of the photofinisher together with the album data.

A photofinisher may be registered by inputting address data of that photofinisher in the electronic album display device 120. First, the user signs up with a photofinisher, to get address data of the photofinisher, for example, as a memory card storing the address data. Then, the user puts the memory card in the card slot 32, and press the photofinisher register button 133. Thereby, the address data of the photofinisher is automatically set up in the electronic album display device 120. The address data may include a telephone number, an address and a password of the server 128 of that photofinisher.

FIG. 36 illustrates an example of print data file sent from the electronic album display device 120 to a photofinisher. First print data designates the page-printing as the print area (S1=1), and does not designate the both-side printing (S4=0). The third page is designated as the page to print (Page=3), and the copy number is 3 (Copy=3). Since all the image frames on the designated page are to be printed in the page-printing, "All" is entered as the frame serial number (Picture 32 All). Although the binding margin location is set to be right (S5=1) in the first print data, the binding margin location is automatically determined depending upon whether the page serial number is odd or even. The captions are designated to be printed (S2=1), and "bottom" is selected as the caption location (S3=2). According to the first print data, three copies of the third page are printed in the way as shown in FIG. 29B.

Second print data designates the frame-printing as the print area (S1=0), and designates the eleventh frame as the image frame to print (Picture=11). The copy number is designated to be 3 (Copy=3). The caption is designated to be printed (S2=1), and "bottom" is selected as the caption location (S3=2). In the frame-printing, the both-side printing (S4), the binding margin location (S5) and the page serial number (Page) are not designated. According to the second print data, three copies of the eleventh frame are printed in the way as shown in FIG. 33A.

Third print data designates the page-printing as the print area (S1=1), and designates the both-side printing (S4=1). The second and third pages are designated as the pages to print (Page=2, 3), and the copy number is 1 (Copy=1). Even if the user designates only one page, if the both-side printing is designated, the other page is automatically entered in the print data. Also the binding margin location (S5) is automatically determined for each page depending upon the page serial number. According to the third print data, the second and third pages are printed on opposite sides of a recording sheet, in the way as shown in FIGS. 29A and 29B.

If all the pages of the album are designated to be printed, "All" is entered as the page serial number, and "Auto" is entered as the binding margin location (S5). Thereby the binding margin location of each individual page is automatically determined. This configuration contributes to reducing data volume of the print data file.

Figure 37:
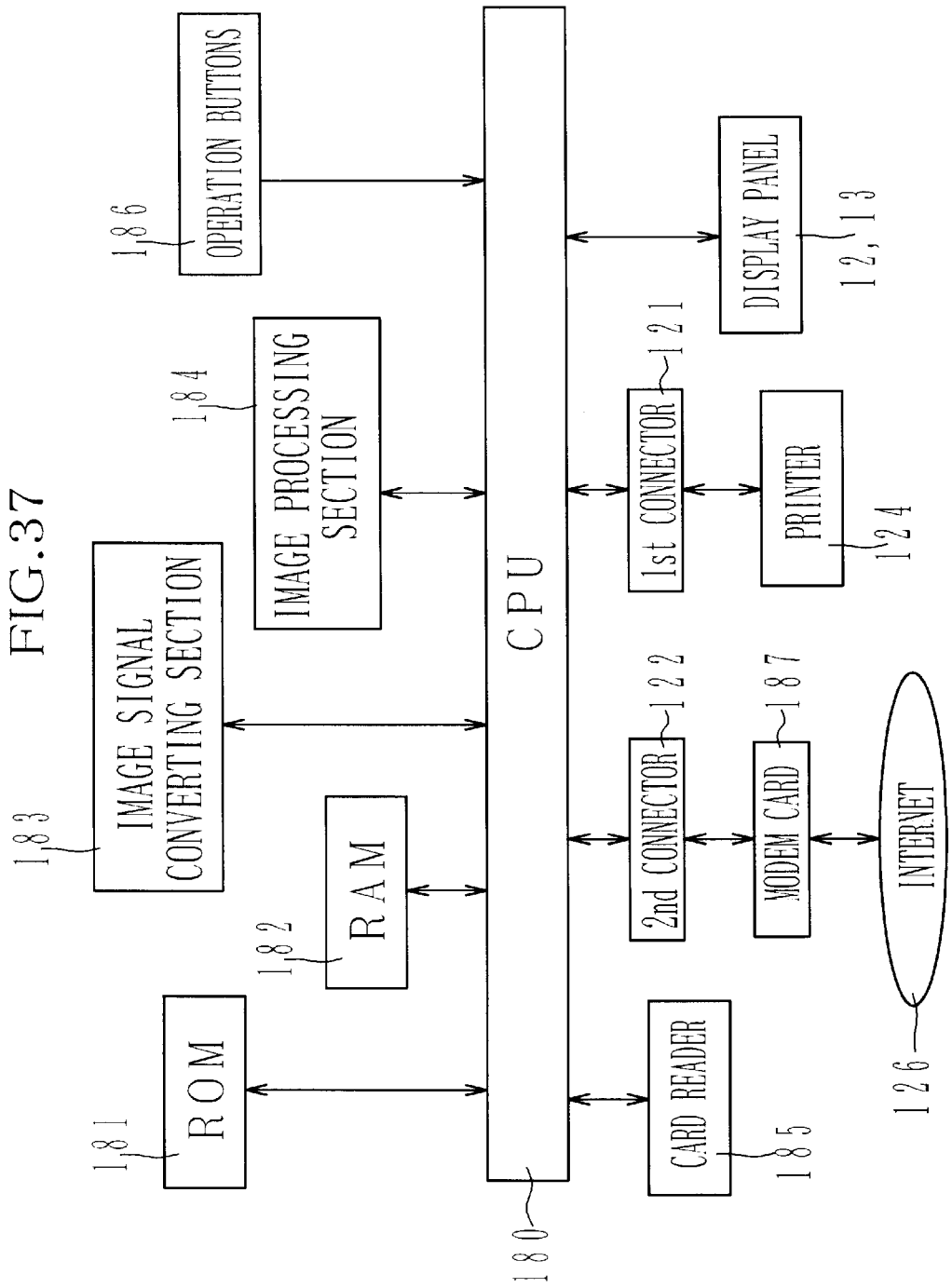
FIG. 37 is a block diagram illustrating an electric structure of the album type electronic image display device of the fourth embodiment.

FIG. 37 schematically shows an electric structure of the electronic album display device 120. To a CPU 180 are connected the display panels 12 and 13, a ROM 181, a RAM 182, an image signal converting section 183, an image processing section 184, a card reader 185, and operation buttons and switches 186 including those of the operation panel 130. The first and second connectors 121 and 122 are also connected to the CPU 180, and a modem card 187 is connectable to the second connector 122 to connect the electronic album display device 120 to the Internet 126. To connect the electronic album display device 120 to a not-shown printer through a LAN (local area network) cable, a LAN card is used in place with the modem card 187.

As described above, the display panels 12 and 13 not only serve as display devices, but also serve as touch panels through which commands may be input in the CPU 180. The CPU 180 controls the overall operation of the electronic album display device 120 in accordance with commands entered through the operation panel 130, the display panels 12 and 13 and other switches. The ROM 181 previously stores programs necessary for displaying images in a manner similar to an album. The RAM 182 temporarily stores the album data read out from the memory card 31, and also functions as a work memory used for executing the programs.

The image signal converting section 183 converts the format of the image data to be suitable for driving the display panels 12 and 13. For example, where the display panels 12 and 13 process the signal according to the NTSC format, the image data is converted into a luminance signal and a chromatic signal. The converted signal is used for driving the display panels 12 and 13. The image processing section 184 processes the image data for enlargement or reduction of the image, pasting the image on the page, and so on.

Figure 38A:
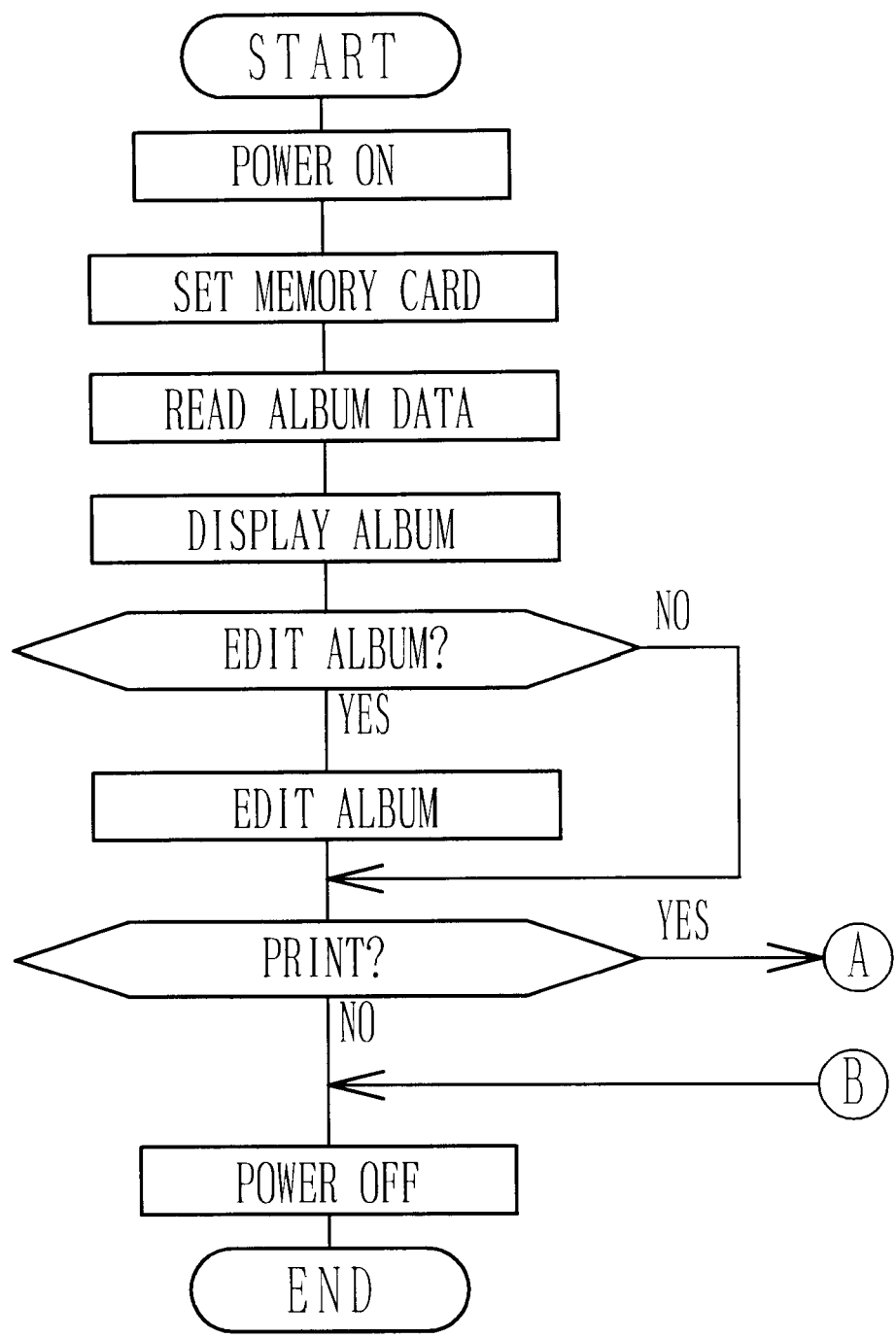
FIG. 38 is a flow chart illustrating the overall operation of the album type electronic image display device of the third embodiment.

Now the overall operation of the electronic album display device 120 having the above described structures will be described with reference to the flow charts of FIG. 38.

The power switch 21 is turned on upon the left- and right-hand bodies 10a and 10b being flapped open. By setting the memory card 31 in the card slot 32, the CPU 180 reads out the album data from the memory card 31, and writes it on the RAM 182. Then, in accordance with an album manager file, the CPU 180 pastes images on respective pages, and display the images page by page. The electronic album display device 120 is initially set to a play mode, so the user may observe the images while operating page turning buttons 41 to 44.

By pressing an edit mode selection button 37, the electronic album display device 120 is switched to an edit mode. Then, the displayed images may be edited in size, position and so forth by operating on the operation panel 39, in a manner as set forth above. The user may add external images to the images of the previously read album data by operating an external input button 88. The CPU 91 revises data of the album manager file by recording data relating to the applied edition on the RAM 182. The user may store the edited album data on a memory card by pressing a storage button 81 and an enter button 52. By pressing a play mode selection button 36, the edition mode is terminated, and the electronic album display device 120 is switched to the play mode.

Figure 38B:
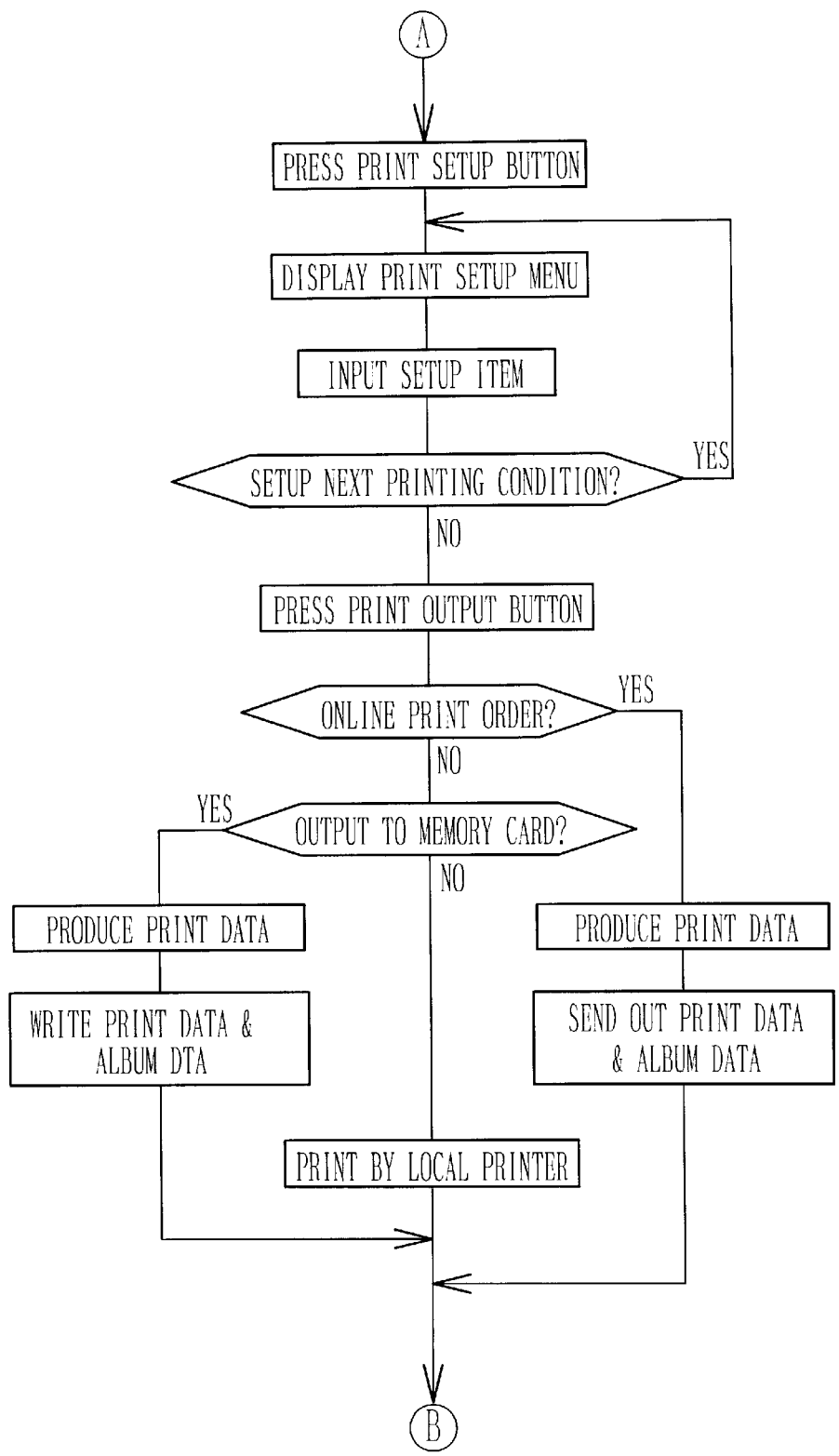

When the user wishes to print out some pages or image frames of the displayed album, the user presses the print data setup button 131 and chooses between the page-printing and the frame-printing on the print area designation box 135, as shown in FIG. 38B. Thereafter, the user designates the printing conditions for the page-printing or the frame-printing on the page-printing setup menu box 141 or the frame-printing setup menu box 160. When the designated printing conditions are entered as print data by pressing the OK button 158 or 169 of the setup menu box 141 or 160, the question box 176 appears. To set up another set of print data, the user chooses "Yes" on the question box 176. Then the print area designation box 135 appears again.

After setting up the print data, the user presses the print output button 132 to select a print data output location on the output location addressing box 178. When "Local printer" is selected, the electronic album display device 120 outputs the image data of those images to print and the print data therefor to the local printer 124, so the local printer 124 prints the images in accordance with the print data. When "Memory card" is selected, the print data is written as a print data file on the memory card 31. Thereafter, the user forwards the memory card 31 to a photofinisher, requesting printing the images in accordance with the print data. When the user selects "Online print", the electronic album display device 120 produces a print data file from the print data, and sends the print data file to the server 128 of the registered photofinisher together with the album data.

Figure 39:
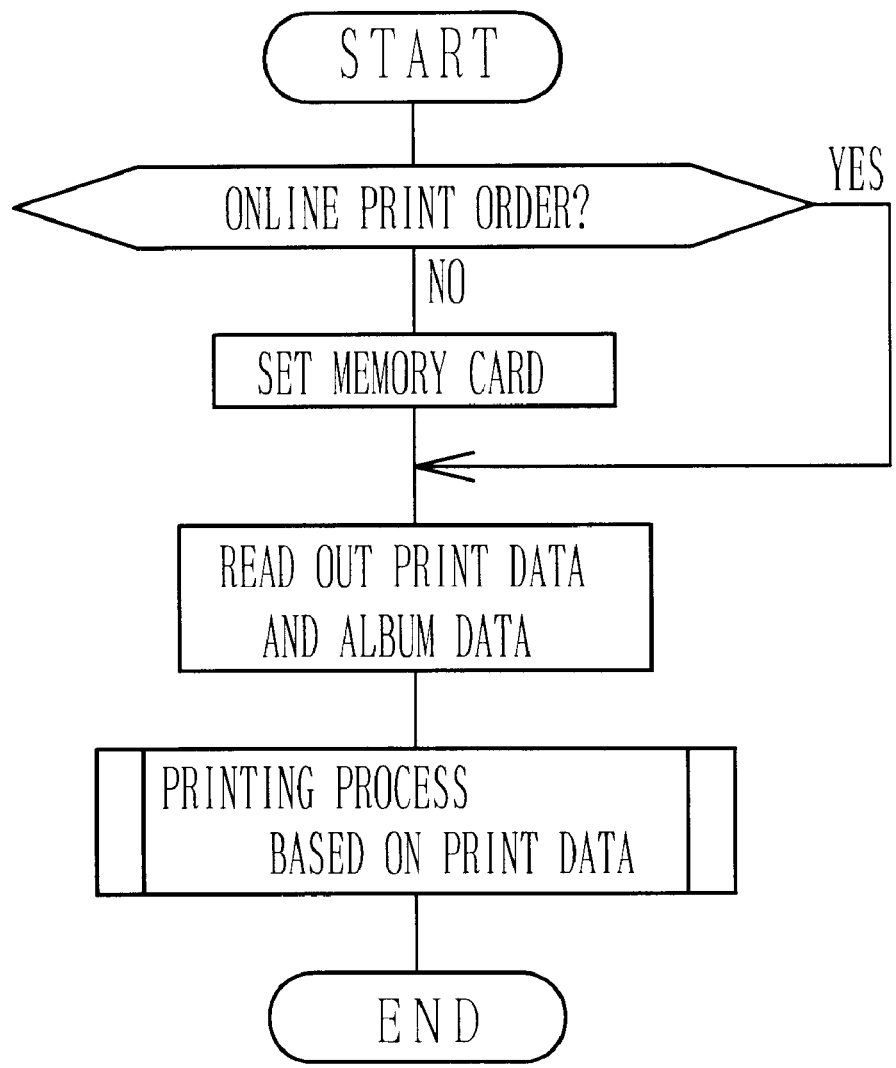
FIG. 39 is a flow chart illustrating a print order reception process in a photofinisher in relation to the album type electronic image display device of the fourth embodiment.
Figure 40:
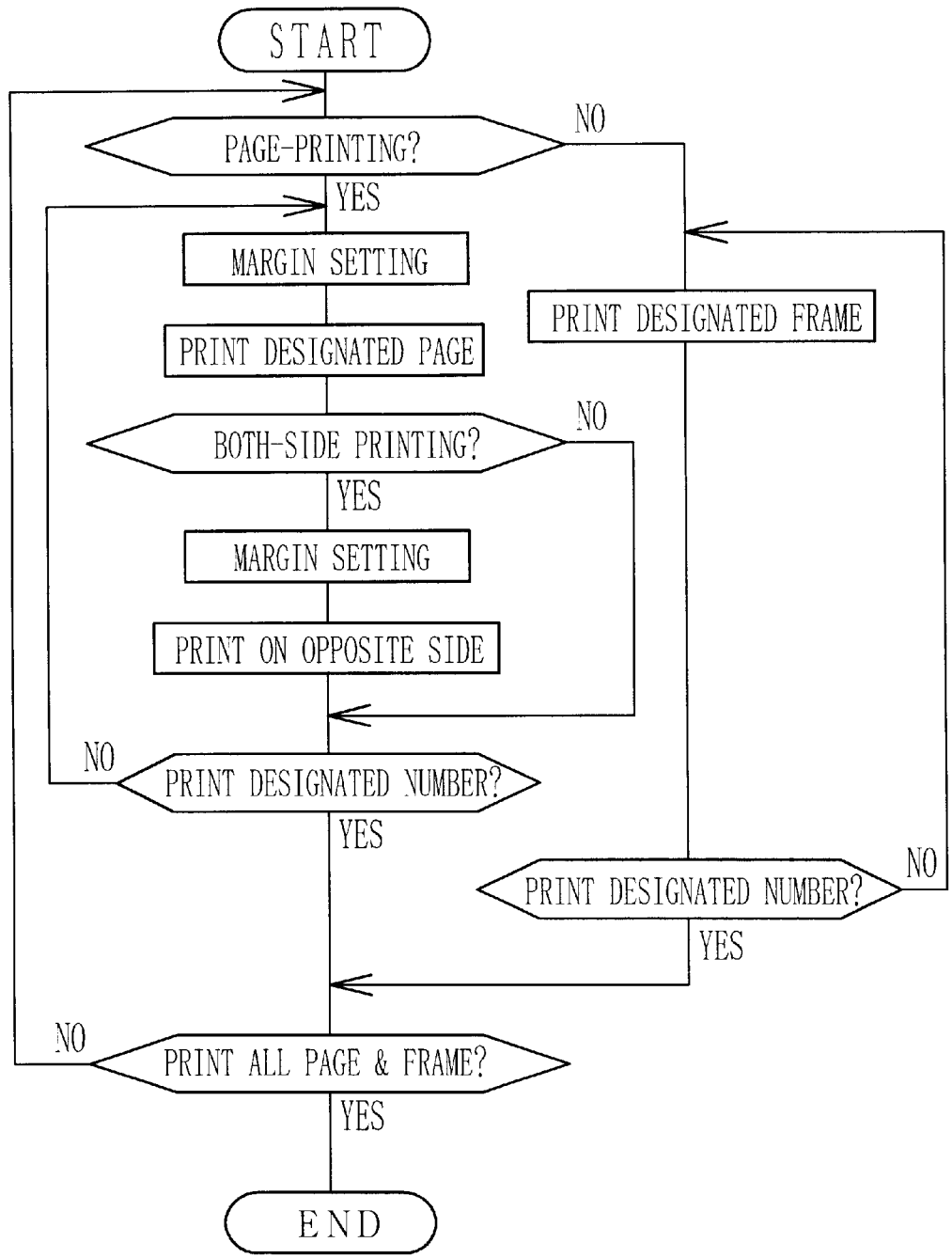
FIG. 40 is a flow chart illustrating a sub routine for controlling printing in accordance with print data.

FIGS. 39 and 40 show a printing sequence executed by the photofinisher upon receipt of the print data file and the album data on the server 128 or upon receipt of the memory card 31 storing the print data file and the album data. The photofinisher lets the print data file and the album data get entered in one of the printers 129a to 129x. Then, the printer prints out a designated number of copies of pages or images of the album in accordance with the print data, including the print area, the page serial number or the frame serial number, the requisite number of copies, the binding margin location, and the choice of both-side printing, as shown in FIG. 40. If there is more than one set of print data in the print data file, as shown for example in FIG. 36, the printer continues printing sequentially in accordance with those print data of the print data file.

Concerning the page-printing, if a color is assigned to the background of the page to print by operating a property button 54 and other buttons of the operation panel 130, in the way as described with respect to FIG. 7A, the printer puts that color on the background area of the recording sheet.

Figure 41:
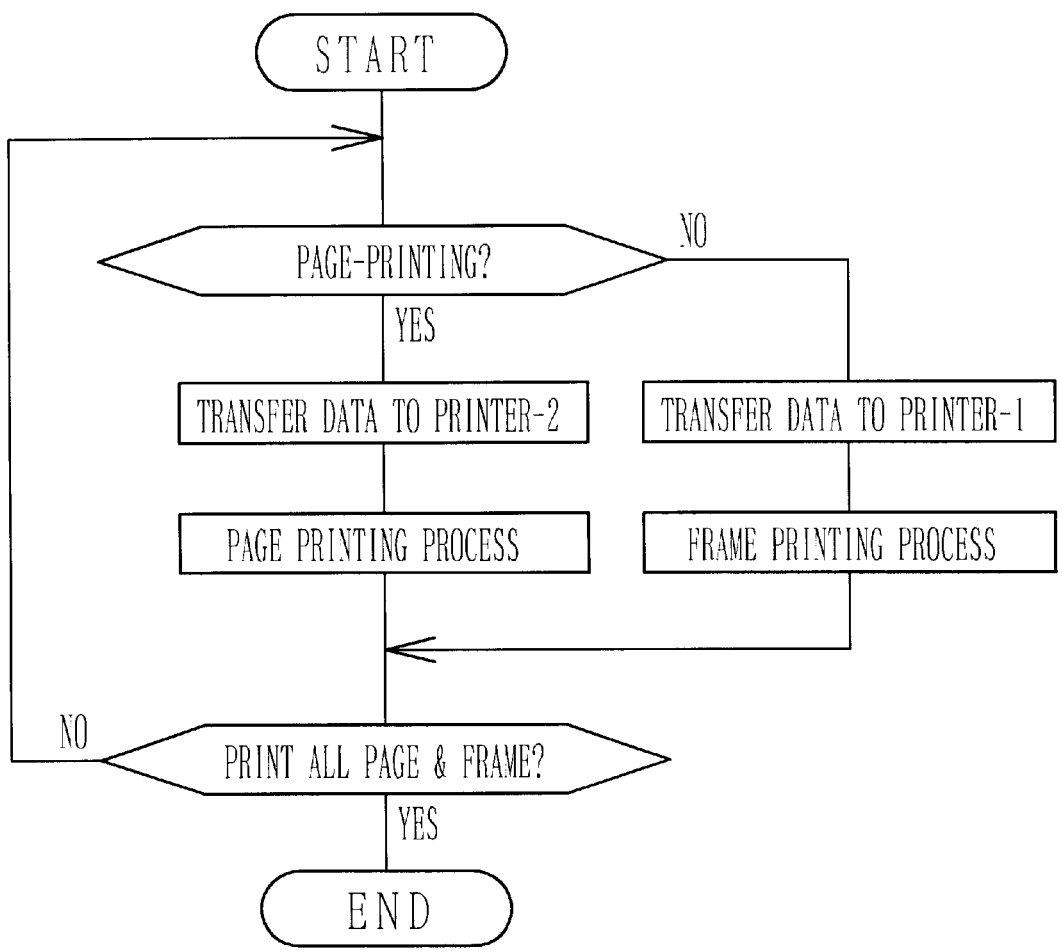
FIG. 41 is a flow chart illustrating a sub routine for allocating print data to different printers depending upon the print size designated by the print data.

Since each page of the album is determined to be printed in a constant size, e.g. A4 size or B5 size, and each image frame is determined to be printed in a conventional photo-print size, e.g. 89 mm×127 mm in the present embodiment, the server 128 preferably distributes the print data and the album data to different printers depending upon the designated print area, as shown in FIG. 41. For example, where the frame-printing is designated, the print data and the album data are transferred from the server 128 to the first printer 129a that prints images on recording paper for the conventional photo-print size. On the other hand, if the page-printing is designated, the print data and the album data are transferred from the server 128 to the second printer 129b that uses A4 size recording sheets. Thereby, the efficiency of printing is improved, and the frequency of changing the recording paper size is reduced to the minimum.

Although the print size is predetermined for each of the page-printing and the frame-printing in the above embodiment, it is possible to add the print size as an item of print data. That is, the print size may be designated by the user in addition to the above mentioned printing conditions.

Although the electronic album display device 120 sends out the entire album data together with the print data in the case of "Online printing", it is possible to send merely those image data files which are necessary for printing the designated pages or frames. Then the data volume is reduced, and thus the communication time is shortened. If the charge for data communication through the Internet varies depending upon the data volume or the communication time, this embodiment also preferable in terms of money.

Although the background of the individual page can only be modified in color in the above embodiment, it is possible to provide the electronic album display device with a variety of templates for the background. It is also possible for the photofinisher to prepare a variety of templates for the page background of the album, so that the user may select one of the templates for an appropriate page of the album along with other printing conditions. In that case, the photofinisher provides the user with a template list where a code is assigned to each of the available templates, so the user may enter the code of an appropriate one of the templates as an item of the print data. Then, the photofinisher synthesizes data of the selected template with the image data of the designated page, and makes printing on the basis of the synthesized data.

In the case where the templates for the background are managed by the photofinisher, the photofinisher can widen the variety of printing services, and the user can select a template from among a wider variety of options. Furthermore, the photofinisher can offer the latest template options to the users, and the users do not need to store a large volume of template data by themselves.

The electronic image display device of the present invention may be provided with a microphone for recording voice captions through the microphone. The voice captions recorded on the side of the electronic image display device may be stored in the voice caption folder when the album data is written on a memory card. It is not always necessary to store caption data together with the image data.

Although image layout data of each image frame of an album is stored in an album manager file, the image layout data may be stored in the individual image file along with each image data.

Although the above embodiments is provided with a RAM that doubles as a memory for storing the album data temporarily and a work memory, it is possible provide specific memories for these functions. It is also possible to provide the electronic image display device of the present invention with a large capacity memory, like a hard disk drive (HDD), for storing a plurality of sets of album data. Thus, the album data management becomes easier than the above described embodiments where the different album data should be stored separately in a plurality of memory cards. As a storage medium for storing the album data, floppy disc (FD), compact disc (CD), mini optical disc (MD), digital video disc (DVD) or other type of storage medium is usable, besides the memory card or the hard disc drive. In that case, an appropriate data input/output device should be used in place of the card reader.

Although there are regular format pages and free format pages in the electronic album display devices of the above embodiments, the electronic image display device of the present invention may have only the regular format page or the free format page.

Although the electronic album display devices of the above embodiments are provided with two display panels for displaying two successive pages in spread, the electronic image display device of the present invention may have a single display panel. In that case, the display panel may display a single page or two successive pages at a time. Furthermore, the electronic image display device of the present invention is not limited to the portable album type, but may be a note type personal computer or a desk top type personal computer. In that case, a program for executing the above described operations of the electronic album display device is installed in a hard disk of the personal computer.

Thus, the present invention is not to be limited to the illustrated embodiments but, on the contrary, various modifications will be possible to those skilled in the art without departing from the scope of claims attached hereto.

What is claimed is:

1. An electronic image display device for displaying images in a style of an album, said image display device comprising:

an image input device for reading out first electronic images from a first external memory;

an image processing device for pasting said first electronic images on respective pages of an electronic album;

a display section for displaying said electronic album at least one page at a time;

an internal memory for storing said electronic album containing said electronic images; and a mode selection device for setting said image display device to a data holding mode, said internal memory holding previously stored first electronic images while second electronic images are read out from a second external memory and written on said internal memory, such that said second electronic images are insertable into said electronic album in said data holding mode.

2. An electronic image display device as recited in claim 1, wherein said image processing device pastes said first and second electronic images on the respective pages in accordance with album manager data, and a combination of said first and second electronic images and said album manager data constitute said electronic album.

3. An electronic image display device as recited in claim 2, wherein if electronic images are read out from an external memory without album manager data, said image processing device pastes said first and second electronic images on said respective pages in accordance with a predetermined format for an electronic album, and produces album manager data according to said predetermined format.

4. An electronic image display device as recited in claim 2, wherein said image display device revises said album manager data on said internal memory each time said electronic album is modified.

5. An electronic image display device as recited in claim 4, wherein if said second electronic images are accompanied by second album manager data when being read out from said second external memory, said album manager data of said previously stored electronic album is revised on the basis of said second album manager data.

6. An electronic image display device as recited in claim 5, further comprising:
    at least one memory slot,
    wherein said data input device automatically reads out data from an external memory when said external memory is put in said memory slot.

7. An electronic image display device as recited in claim 6, further comprising:
    a data output device for writing data on an external memory as set in said memory slot,
    wherein when said revised album manager data is being written on an external memory through said data output device, if said external memory stores album manager data having the same title as said revised album manager data, a warning is given to notify that said stored album manager data will be replaced by said revised album manager data.

8. An electronic image display device as recited in claim 1, wherein said display section is able to display two successive pages of said electronic album at a time.

9. An electronic image display device as recited in claim 8, wherein said image display device comprises a left-hand body and a right-hand body hinged to each other, and said display section comprises left and right display panels formed on said left-hand and right-hand bodies.

10. An electronic image display device as recited in claim 8, wherein said second electronic images are interposed as additional pages between two successive pages which are displayed on said display section when said second electronic images are read out from said second external memory in said data holding mode.

11. An electronic image display device for displaying images in a style of an album, said image display device comprising:
    an image processing device for pasting electronic images on respective pages of an electronic album;
    a display section for displaying said electronic album at least one page at a time; and
    a manually operated mode selection device for setting said image display device at an automatic play mode wherein the pages displayed on said display section are automatically turned over in a predetermined sequence, a display time for said respective pages being based on an amount of data on said respective pages.

12. An electronic image display device as recited in claim 11, further comprising:
    a device for calculating an individual page display time for a respective page of said electronic album on the basis of a data volume of the respective page, and making the respective page displayed for a time determined based on said individual page display time in said automatic play mode.

13. An electronic image display device as recited in claim 12, wherein said data volume is calculated based on the number of images contained in the respective page.

14. An electronic image display device as recited in claim 13, wherein said first and second electronic images include still images and movies, and a respective one of said movies is automatically played while the page containing said movie is displayed in said automatic play mode, and
    wherein play times for those movies contained in the respective page are taken into account as said data volume.

15. An electronic image display device as recited in claim 13, wherein additional data are assigned to selected ones of said first and second electronic images, and said additional data are automatically reproduced while said selected electronic images are displayed in said automatic play mode, and
    wherein a time for reproducing said additional data on said respective page is taken into account as said data volume.

16. An electronic image display device as recited in claim 11, wherein said display section is able to display two successive pages of said electronic album at a time.

17. An electronic image display device as recited in claim 16, wherein said image display device comprises a left-hand body and a right-hand body which are hinged to each other, and said display section comprises left and right display panels formed on said left-hand and right-hand bodies.

18. An electronic image display device as recited in claim 16, wherein said respective page of said electronic album is displayed for a total display time in said automatic play mode, said total display time is a sum of a page display time for said respective page and a second page display time for a next page or a preceding page.

19. An electronic image display device as recited in claim 11, wherein said image display device includes a computer installed with a program for pasting electronic images on respective pages of an electronic album and displaying said electronic album at least one page at a time.

20. An electronic image display device for displaying images in a style of an album, said image display device comprising:
    an image processing device for pasting electronic images on respective pages of an electronic album;
    a display section for displaying said electronic album at least one page at a time;
    a device for causing said display section to display characters in addition to selected ones of said electronic images, said characters being previously assigned to said selected electronic images;
    a reproduction device for reproducing sounds that are previously recorded in association with selected ones of said electronic images; and
    a discrimination device for discriminating one electronic image from others among those displayed concurrently on said display section, such that one of said characters and said sounds relating to said one electronic image are displayed or reproduced.

21. An electronic image display device as recited in claim 20, wherein said display section serves as a touch panel for permitting designating an appropriate electronic image among those displayed on said display section by touching said appropriate electronic image, and
    wherein characters or sounds relating to the designated electronic image are displayed or reproduced while the designated electronic image is discriminated by said discrimination device.

22. An electronic image display device as recited in claim 21, wherein said first and second electronic images include movies, and when one of the movies is designated, the designated movie is discriminated by said discrimination device and starts being played.

23. An electronic image display device as recited in claim 22, further comprising:
  a mode selection device for setting said image display device at an automatic play mode wherein the pages are displayed automatically turn by turn in a predetermined sequence, and at least one of said characters, said sounds and said movies are automatically sequentially reproduced when the displayed page includes said movies or those electronic images to which said characters or sounds are assigned.

24. An electronic image display device as recited in claim 20, wherein data representing said characters or sounds is written in association with said electronic images on an external memory, and is read out from said external memory into said image display device along with said electronic images.

25. An electronic image display device as recited in claim 20, further comprising:
  a device for entering characters or sounds in association with an appropriate one of said electronic images while designating said appropriate electronic image on said display section.

26. An electronic image display device as recited in claim 20, wherein said image display device includes a computer installed with a program for pasting electronic images on respective pages of an electronic album, displaying said electronic album at least one page at a time, causing said display section to display said characters in addition to said selected electronic images, reproducing said sounds in association with said selected electronic images, and discriminating one electronic image from others among those displayed concurrently on said display section, while said characters or sounds relating to said one electronic image are being displayed or reproduced.

27. An electronic image display device for displaying images in a style of an album, said image display device comprising:
  an image processing device for pasting electronic images on respective pages of an electronic album;
  a display section for displaying said electronic album at least one page at a time;
  a manual operation device for designating printing conditions for said electronic images, said printing conditions including at least a page serial number of a designated page, a print area to print from the designated page, and the requisite number of copies to make from the print area; and
  a print data setup device that automatically sets up margin conditions for the designated page when an entire area of the designated page is selected as the print area, such that a binding margin is located on an appropriate side of the designated page, and produces print data representative of said printing conditions and said margin conditions.

28. An electronic image display device as recited in claim 27, wherein both-side printing to print two successive pages on opposite sides of a respective recording sheet may be designated as one of said printing conditions through said manual operation device, and if the both-side printing is designated, said print data setup device produces print data, and sets up said margin conditions such that a binding margin of a first page is located back to back with a binding margin of a second page that is to be printed on the opposite side to said first page.

29. An electronic image display device as recited in claim 28, wherein said display section displays two successive pages of said electronic album at a time.

30. An electronic image display device as recited in claim 29, wherein if a page displayed on the left hand of said display section is designated for the both-side printing, a binding margin is located on the right of the designated page on a recording sheet, and a preceding page to said designated page is automatically printed on the opposite side from the designated page, and
  wherein if a page displayed on the right hand of said display section is designated for the both-side printing, a binding margin is located on the left of the designated page on a recording sheet, and a next page to said designated page is automatically printed on the opposite side from the designated page.

31. An electronic image display device as recited in claim 28, wherein a binding margin location may be designated as one of said printing conditions through said manually operable device, and if the binding margin location is designated for a selected page concurrently with the both-side printing, said print data setup device selects the preceding page or the next page to said selected page as a page to be printed on the opposite side, depending upon whether the binding margin is located left or right of said selected page.

32. An electronic image display device as recited in claim 27, wherein if a character caption is previously assigned to a selected one of said electronic images, said printing conditions include whether to print said character caption, and a location to print said character caption on the same recording sheet as said selected electronic image.

33. An electronic image display device as recited in claim 27, wherein said display section serves as a touch panel that constitutes a member of said manual operation device, and displays setup menus for setting up said printing conditions.

34. An electronic image display device as recited in claim 27, further comprising:
  at least one output terminal for outputting said print data and album data of said electronic album to a printer or a communication line.

35. An electronic image display device as recited in claim 27, further comprising:
  at least one memory slot and a data output device for writing said print data and album data of said electronic album on an external memory as put in said memory slot.

36. A printing system comprising:
  an electronic image display device for displaying images in a style of an album; and
  a printer for making hard copies of images as displayed on said image display device,
  wherein said image display device comprises:
    an image processing device for pasting electronic images on respective pages of an electronic album;
    a display section for displaying said electronic album at least one page at a time;

a manual operation device for designating printing conditions for said electronic images, said printing conditions including at least a page serial number of a designated page, a print area to print from the designated page, and the requisite number of copies to make from the print area;

a print data setup device that automatically sets up margin conditions for the designated page when an entire area of the designated page is selected as the print area, such that a binding margin is located on an appropriate side of the designated page, and produces print data representative of said printing conditions and said margin conditions; and a data output device for outputting said print data and album data of said electronic album, wherein said printer prints an individual image frame or the entire area of the designated page on a recording sheet in accordance with said print data, while providing a binding margin in the case where the entire area of the designated page is printed.

37. A printing system as recited in claim 36, wherein both-side printing to print two successive pages on opposite sides of a respective recording sheet may be designated as one of said printing conditions through said manual operation device, and if the both-side printing is designated, said print data setup device sets up said margin conditions such that a binding margin of a first page is located back to back with a binding margin of a second page that is to be printed on the opposite side to said first page, and wherein said printer prints the respective pages on the opposite sides of respective recording sheets in accordance with said print data.

38. A printing system as recited in claim 36, further comprising:

a data distribution device for selecting a said printer from among a plurality of printers with reference to said print data, and distributing said print data and said album data to said selected printer.

39. A printing system as recited in claim 38, wherein said image display device is connectable to said printer or said data distribution device through a communication line, to output said print data and said album data through said communication line.

40. A printing system as recited in claim 39, further comprising:

at least one memory slot and a data output device for writing said print data and said album data on an external memory as put in said memory slot.

41. A printing system as recited in claim 40, wherein said image display device further comprises a device for designating an output location to output said print data and said album data.

42. A printing system as recited in claim 38, wherein said plurality of printers includes at least a first printer and a second printer that can make a print in a larger size than said first printer, and said data distribution device distributes said print data and said album data to said first printer when an individual image frame of the designated page is designated as said print area, or to said second printer when the entire area of the designated page is designated as said print area.

* * * * *